(12) United States Patent
Zhang et al.

(10) Patent No.: US 10,433,309 B2
(45) Date of Patent: Oct. 1, 2019

(54) ORTHOGONAL FREQUENCY DIVISION MULTIPLE ACCESS FOR WIRELESS LOCAL AREA NETWORK

(71) Applicant: Marvell World Trade Ltd., St. Michael (BB)

(72) Inventors: Hongyuan Zhang, Fremont, CA (US); Yakun Sun, San Jose, CA (US); Hui-Ling Lou, Sunnyvale, CA (US); Liwen Chu, San Ramon, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/983,524

(22) Filed: May 18, 2018

(65) Prior Publication Data

US 2018/0270826 A1    Sep. 20, 2018

Related U.S. Application Data

(60) Continuation of application No. 15/658,070, filed on Jul. 24, 2017, now Pat. No. 9,980,268, which is a
(Continued)

(51) Int. Cl.
*H04B 7/204* (2006.01)
*H04W 72/04* (2009.01)
(Continued)

(52) U.S. Cl.
CPC ....... *H04W 72/0453* (2013.01); *H04L 5/0007* (2013.01); *H04L 5/0041* (2013.01);
(Continued)

(58) Field of Classification Search
CPC ........... H04W 72/0453; H04L 27/2613; H04L 27/2627
See application file for complete search history.

(56) References Cited

U.S. PATENT DOCUMENTS

| 7,599,332 B2 | 10/2009 | Zelst et al. |
| 7,742,390 B2 | 6/2010 | Mujtaba |

(Continued)

FOREIGN PATENT DOCUMENTS

| CN | 103053123 A | 4/2013 |
| EP | 3039808 A1 | 7/2016 |

(Continued)

OTHER PUBLICATIONS

Office Action in U.S. Appl. No. 16/016,781, dated Sep. 10, 2018 (4 pages).

(Continued)

*Primary Examiner* — Bo Hui A Zhu

(57) ABSTRACT

A communication device assigns i) a first orthogonal frequency division multiplex (OFDM) tone block for a communication channel to a first communication device, and ii) a second OFDM tone block to a second communication device. The first OFDM tone block and the second OFDM block each span less than or equal to 10 MHz, and are both within a subchannel that spans a 20 MHz. The communication device generates an orthogonal frequency division multiple access (OFDMA) physical layer (PHY) data unit for transmission in the communication channel. The OFDMA PHY data unit is generated to include: a legacy preamble portion having legacy signal field that spans the subchannel; and a data portion that includes i) first data for the first communication device modulated to the first OFDM tone block, and second data for the second communication device modulated to the second OFDM tone block.

22 Claims, 28 Drawing Sheets

Related U.S. Application Data continuation of application No. 14/553,974, filed on Nov. 25, 2014, now Pat. No. 9,717,086, and a continuation of application No. 14/955,017, filed on Nov. 30, 2015, now Pat. No. 10,009,894, which is a division of application No. 14/553,974, filed on Nov. 25, 2014, now Pat. No. 9,717,086.

(60) Provisional application No. 61/987,778, filed on May 2, 2014, provisional application No. 61/909,616, filed on Nov. 27, 2013.

(51) Int. Cl.
    *H04L 5/00*     (2006.01)
    *H04L 27/26*     (2006.01)
    *H04W 84/12*     (2009.01)

(52) U.S. Cl.
    CPC ...... *H04L 27/2602* (2013.01); *H04L 27/2613* (2013.01); *H04L 27/2627* (2013.01); *H04L 5/006* (2013.01); *H04L 5/0044* (2013.01); *H04W 84/12* (2013.01)

(56) References Cited

U.S. PATENT DOCUMENTS

| | | | |
|---|---|---|---|
| 7,756,002 | B2 | 7/2010 | Batra et al. |
| 8,144,647 | B2 | 3/2012 | Nabar et al. |
| 8,149,811 | B2 | 4/2012 | Nabar et al. |
| 8,270,909 | B2 | 9/2012 | Zhang et al. |
| 8,289,869 | B2 | 10/2012 | Sawai |
| 8,363,578 | B1 | 1/2013 | Ramamurthy et al. |
| 8,472,383 | B1 | 6/2013 | Banerjea et al. |
| 8,599,803 | B1 | 12/2013 | Zhang et al. |
| 8,619,907 | B2 | 12/2013 | Mujtaba et al. |
| 8,660,497 | B1 | 2/2014 | Zhang et al. |
| 8,670,399 | B2 | 3/2014 | Liu et al. |
| 8,737,405 | B2 | 5/2014 | Liu et al. |
| 8,787,338 | B2 | 7/2014 | Liu et al. |
| 8,787,385 | B2 | 7/2014 | Liu et al. |
| 8,811,203 | B1 | 8/2014 | Liu et al. |
| 8,886,755 | B1 | 11/2014 | Liu et al. |
| 8,923,118 | B1 | 12/2014 | Liu et al. |
| 8,971,350 | B1 | 3/2015 | Liu |
| 9,131,528 | B2 | 9/2015 | Zhang et al. |
| 9,166,660 | B2 | 10/2015 | Chu et al. |
| 9,215,055 | B2 | 12/2015 | Chu et al. |
| 9,391,742 | B2 | 7/2016 | Srinivasa et al. |
| 9,473,341 | B2 | 10/2016 | Zhang et al. |
| 9,712,358 | B2 | 7/2017 | Zhang et al. |
| 9,717,086 | B2 | 7/2017 | Zhang et al. |
| 9,924,512 | B1 | 3/2018 | Zhang et al. |
| 9,980,268 | B2 | 5/2018 | Zhang et al. |
| 2008/0075058 | A1 | 3/2008 | Mundarath et al. |
| 2008/0192644 | A1 | 8/2008 | Utsunomiya et al. |
| 2008/0299962 | A1 | 12/2008 | Kasher |
| 2009/0185632 | A1* | 7/2009 | Cai ........................ H04L 5/0044 375/260 |
| 2009/0196163 | A1 | 8/2009 | Du |
| 2010/0046358 | A1 | 2/2010 | van Nee |
| 2010/0091675 | A1 | 4/2010 | Sawai |
| 2010/0091919 | A1 | 4/2010 | Xu et al. |
| 2010/0250159 | A1 | 9/2010 | Hall |
| 2010/0260159 | A1 | 10/2010 | Zhang et al. |
| 2010/0309834 | A1 | 12/2010 | Fischer et al. |
| 2011/0002219 | A1 | 1/2011 | Kim et al. |
| 2011/0038332 | A1 | 2/2011 | Liu et al. |
| 2011/0096796 | A1 | 4/2011 | Zhang et al. |
| 2011/0096797 | A1 | 4/2011 | Zhang et al. |
| 2011/0128929 | A1 | 6/2011 | Liu et al. |
| 2011/0128947 | A1 | 6/2011 | Liu et al. |
| 2011/0305296 | A1* | 12/2011 | Van Nee ............... H04L 5/0053 375/295 |
| 2011/0310827 | A1 | 12/2011 | Srinivasa et al. |
| 2012/0201315 | A1 | 8/2012 | Zhang et al. |
| 2013/0208822 | A1 | 8/2013 | Zhang et al. |
| 2013/0229996 | A1 | 9/2013 | Wang et al. |
| 2013/0259017 | A1 | 10/2013 | Zhang et al. |
| 2015/0023315 | A1 | 1/2015 | Yerramalli et al. |
| 2015/0063190 | A1 | 3/2015 | Merlin et al. |
| 2015/0063255 | A1* | 3/2015 | Tandra ................ H04J 11/0023 370/329 |
| 2015/0117227 | A1 | 4/2015 | Zhang et al. |
| 2015/0131517 | A1 | 5/2015 | Chu et al. |
| 2015/0146653 | A1 | 5/2015 | Zhang et al. |
| 2015/0146807 | A1 | 5/2015 | Zhang et al. |
| 2016/0072654 | A1 | 3/2016 | Choi et al. |
| 2016/0088628 | A1 | 3/2016 | Zhang et al. |
| 2017/0325233 | A1 | 11/2017 | Zhang et al. |

FOREIGN PATENT DOCUMENTS

| | | |
|---|---|---|
| JP | 2012-523774 A | 10/2012 |
| WO | WO-2012/051319 | 4/2012 |
| WO | WO-2013/165582 A1 | 11/2013 |

OTHER PUBLICATIONS

First Office Action in Chinese Patent Application No. 201480074063, dated Sep. 21, 2018, with English translation (4 pages).

Cariou et al., "Multi-channel Transmissions," Doc. No. IEEE 802. 11-09/1022r0, The Institute of Electrical and Electronics Engineers, Inc., pp. 1-13 (Sep. 2009).

Chen, "Home Network Basis: Transmission Environments and Wired/Wireless Protocols," Prentice Hall, pp. 1-26 (Jul. 2003).

Chun et al., "Legacy Support on HEW frame structure," doc: IEEE 11-13/1057r0, The Institute of Electrical and Electronics Engineers, Inc., pp. 1-8 (Sep. 2013).

Hiertz et al., "The IEEE 802.11 Universe," IEEE Communications Magazine, pp. 62-70, (Jan. 2010).

IEEE P802.11n™D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std 802.11-2007 (revision of IEEE Std. 802.11 1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

(56) References Cited

OTHER PUBLICATIONS

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan areanetworks—Specific requirements, Part 11: Wireless LAN Medium Access Control (MAC) and Physical Layer (PHY) specifications: Further Higher Data Rate Extension in the 2.4 GHz Band," The Institute of Electrical and Electronics Engineers, Inc., pp. 1-69(Apr. 2003).

IEEE Std 802.11™2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std P802.11-REVma/06.0, (Revision of IEEE Std 802.11 1999) "Unapproved Draft Standard for Information Technology—Telecommunications and information exchange between systems—Local and metropolitan area network—Specific requirements Part 11:Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma.sub.—D7.0), pp. 1-1212 (2006).

IEEE Std. 802.11n™"IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

International Preliminary Report on Patentability in International Application No. PCT/US2014/067483, dated Jun. 9, 2016 (8 pages).

International Search Report and Written Opinion for International Application No. PCT/US2014/067483, dated Mar. 30, 2015 (9 pages).

International Standard, ISO/IEC 8802-11, ANSI/IEEE Std 802.11, "Information technology—Telecommunications and information exchange between systems—localand metropolitan area networks—specific requirements" Part 11: Wireless LAN Medium Access Control (MAC) and Physical Layer (PHY) specifications, The Institute of Electrical and Electronics Engineers, Inc., pp. 1-512 (1999).

Liu et al., "VHT BSS Channel Selection," Institute of Electrical and Electronics Engineers, Inc., doc. No. IEEE 802.11-11/1433r0, pp. 1-10 (Nov. 2011).

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Noh et al., "Channel Selection and Management for 11ac," Doc. No. IEEE 802.11-10/0593r1, *The Institute of Electrical and Electronics Engineers, Inc.*, pp. 1-21 (May 20, 2010).

Non-Final Office Action for U.S. Appl. No. 14/955,017 dated Oct. 19, 2017 (7 pages).

Notice of Allowability in U.S. Appl. No. 15/658,070 dated Nov. 22, 2017 (9 pages).

Notice of Allowance in U.S. Appl. No. 14/553,974, dated Mar. 17, 2017 (6 pages).

Notice of Allowance in U.S. Appl. No. 15/658,070, dated Jan. 23, 2018 (7 pages).

Notice of Allowance in U.S. Appl. No. 15/658,070, dated Oct. 11, 2017 (8 pages).

Office Action in U.S. Appl. No. 14/553,974, dated Oct. 20, 2016 (13 pages).

Park, "IEEE 802.11ac: Dynamic Bandwidth Channel Access," 2011 IEEE Int'l Conf. on Communications (ICC), pp. 1-5 (Jun. 2011).

Pedersen et al., "Carrier Aggregation for LTE-Advanced: Functionality and Performance Aspects," IEEE Communications Magazine, vol. 49, No. 6, pp. 89-95, (Jun. 1, 2011).

(56) References Cited

OTHER PUBLICATIONS

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Redieteab et al., "Cross-Layer Multichannel Aggregation for Future WLAN Systems," 2010 IEEE Int'l Conf. on Communication Systems (ICCS), pp. 740-756 (Nov. 2010).

Seok et al., "HEW PPDU Format for Supporting MIMO-OFDMA," IEEE 802.11-14/1210r0, 16 pages, (Sep. 14, 2014).

Stacey et al., "IEEE P802.11, Wireless LANs, Proposed TGac Draft Amendment," Institute of Electrical and Electronics Engineers, doc. No. IEEE 802.11-10, 1361r3 pp. 1-154 (Jan. 2011).

Stacey et al., "Specification Framework for TGac," document No. IEEE 802.11-09/0992r20, Institute for Electrical and Electronics Engineers, pp. 1-49, (Jan. 18, 2011).

Tandai et al., "An efficient uplink multiuser MIMO protocol in IEEE 802.11 WLANs," IEEE 20th International Symposium on Personal, Indoor and Mobile Radio Communications (PIMRC 2009), pp. 1153-1157 (Sep. 13, 2009).

Van Nee et al., "The 802.11n MIMO-OFDM Standard for Wireless LAN and Beyond," Wireless Personal Communications, vol. 37, pp. 445-453 (Jun. 2006).

Wannstrom, "Carrier Aggregation explained," pp. 1-6 (May 2012).

Yuan et al., "Carrier Aggregation for LTE-Advanced Mobile Communication Systems," IEEE Communications Magazine, pp. 88-93 (Feb. 2010).

Notice of Allowance in U.S. Appl. No. 16/016,781, dated Feb. 27, 2019 (23 pages).

Notice of Allowance in U.S. Appl. No. 14/955,017, dated Feb. 28, 2018 (18 pages).

Notice of Reasons for Rejection in Japanese Patent Application No. 2016-534934, dated Jun. 30, 2018, with English translation (5 pages).

U.S. Appl. No. 16/016,781, Zhang et al., "Orthogonal Frequency Division Multiple Access for Wireless Local Area Network," filed Jun. 25, 2018.

Office Action in Chinese Patent Application No. 201480074063, dated Jun. 21, 2019, with English translation (7 pages).

Search Report in Chinese Patent Application No. 201480074063, sent with Office Action dated Jun. 21, 2019 (2 pages).

Communication pursuant to Article 94(3) EPC in European Patent Application No. 14820983.6, dated Jul. 2, 2019 (6 pages).

\* cited by examiner

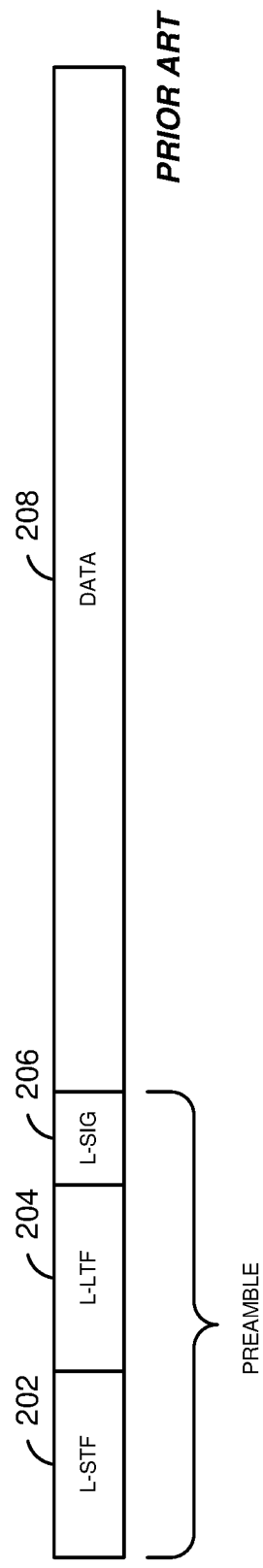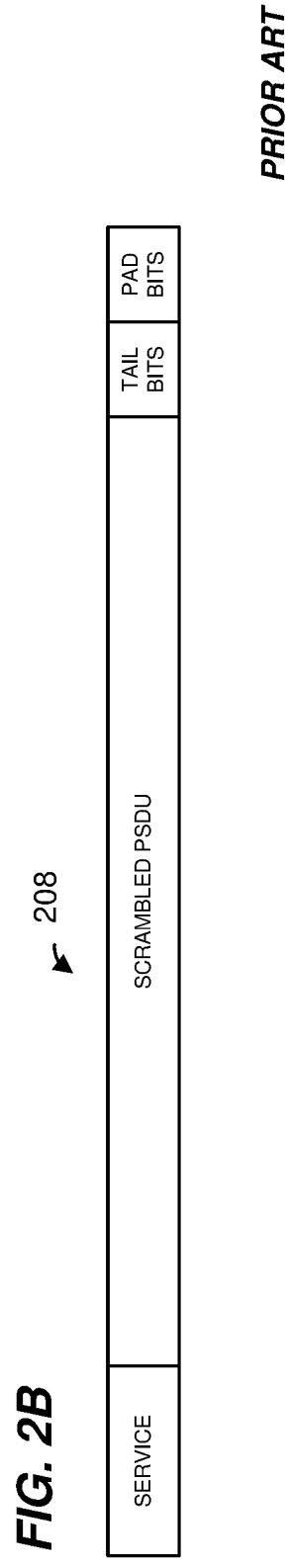

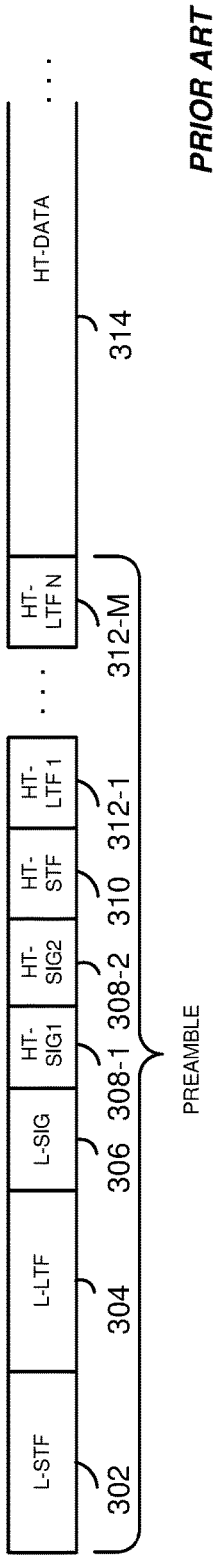
FIG. 3 *PRIOR ART*
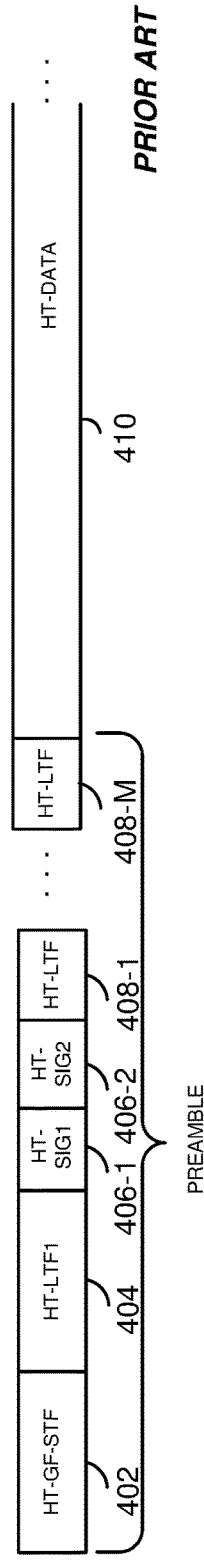
FIG. 4 *PRIOR ART*
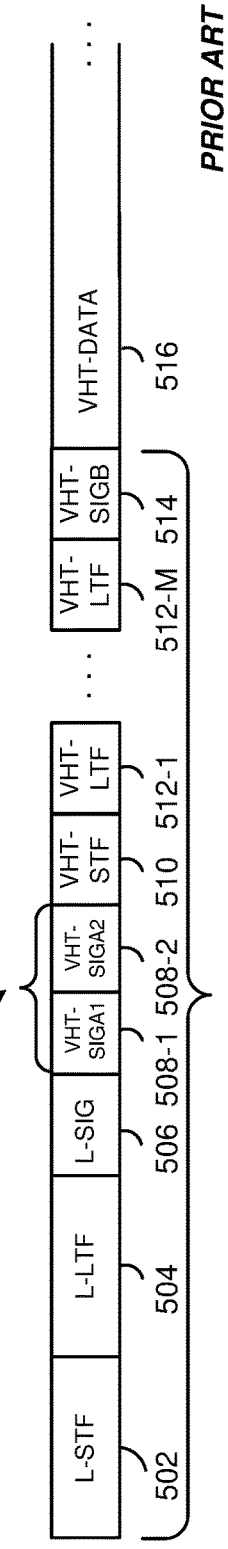
FIG. 5 *PRIOR ART*

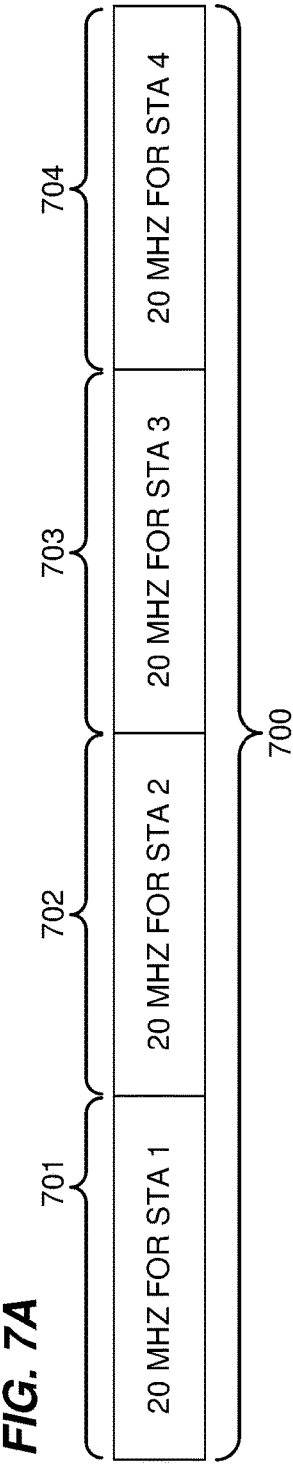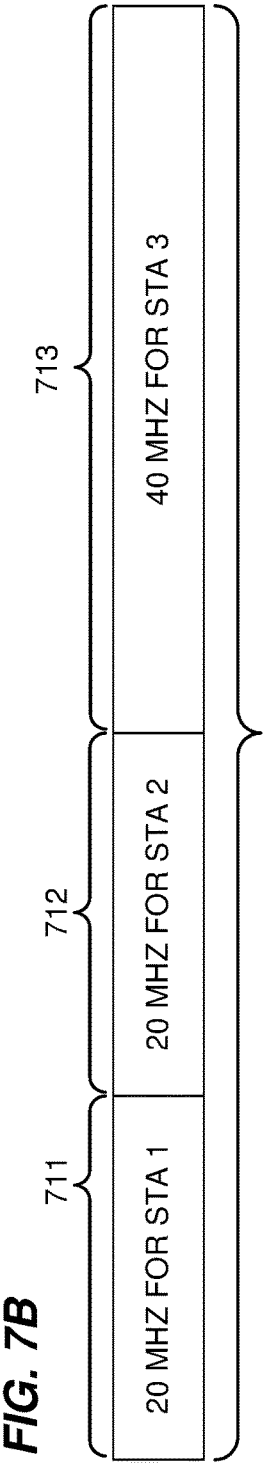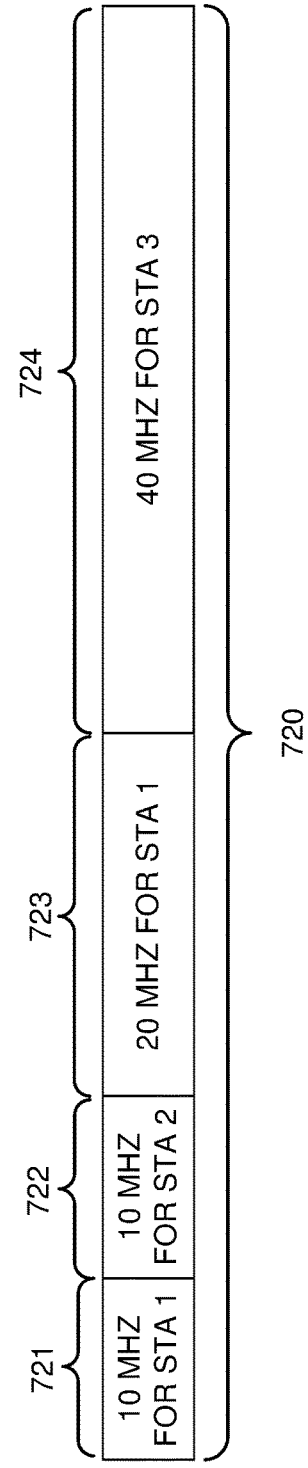

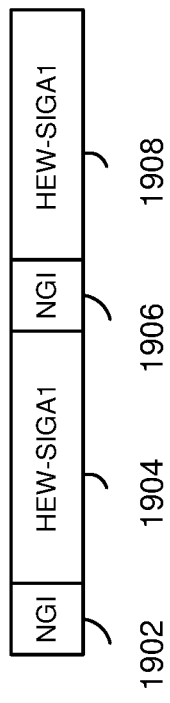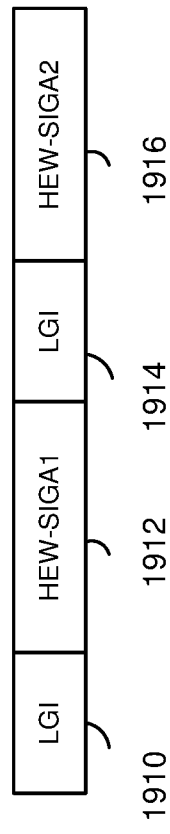
FIG. 19A
FIG. 19B

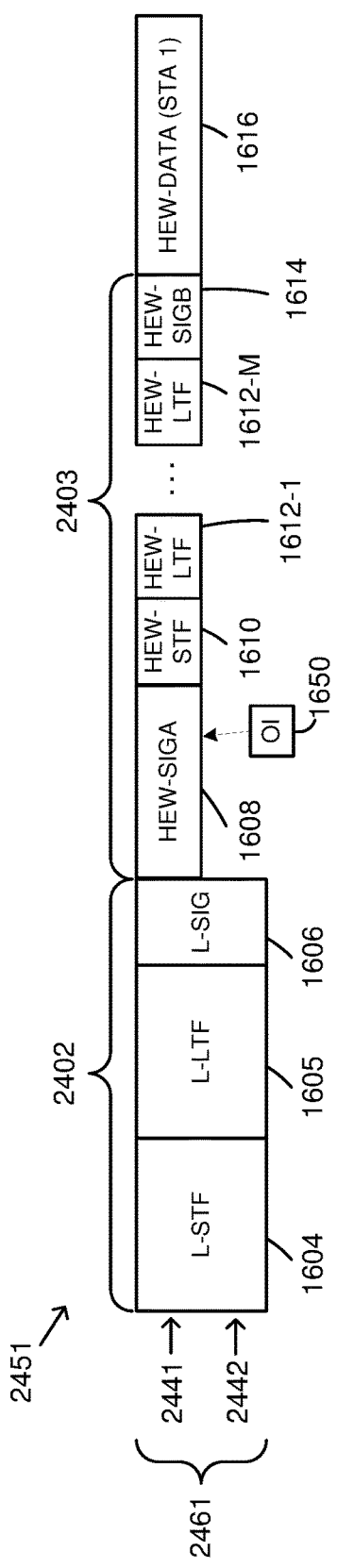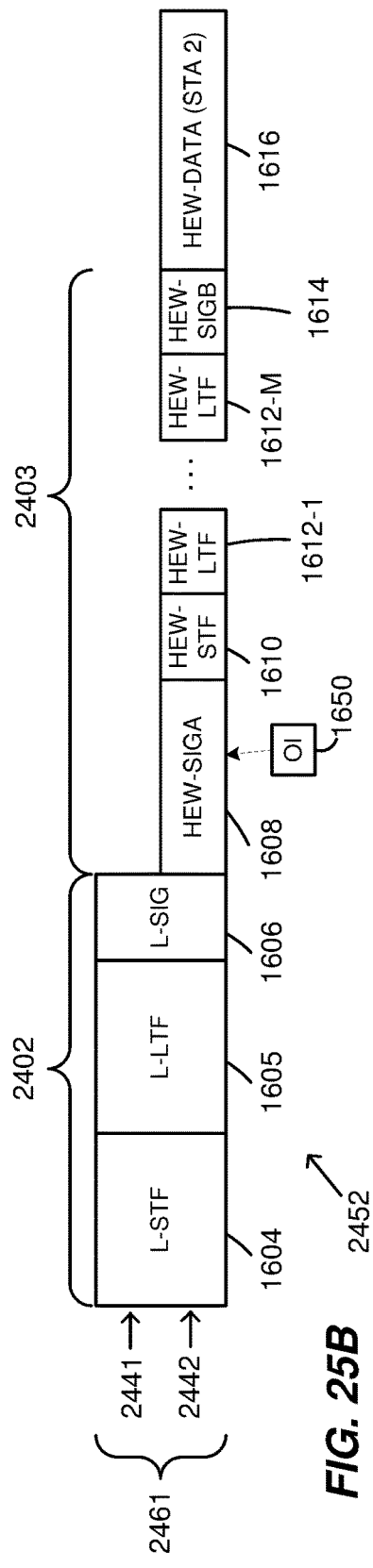

FIG. 27A 2701

$HTS_{-28,28} = \sqrt{1/2}$
$\{0, 0, 0, 0, 1+j, 0, 0, 0, -1-j, 0, 0, 0, 1+j, 0, 0, 0, -1-j, 0, 0, 0, -1-j, 0, 0, 0, 1+j, 0, 0, 0,$
$0, 0, 0, 0, -1-j, 0, 0, 0, -1-j, 0, 0, 0, 1+j, 0, 0, 0, 1+j, 0, 0, 0, 1+j, 0, 0, 0, 1+j, 0, 0, 0\}$

FIG. 27B 2702

$HTS_{-58,58} = \sqrt{1/2}$
$\{0, 0, 1+j, 0, 0, 0, -1-j, 0, 0, 0, 1+j, 0, 0, 0, -1-j, 0, 0, 0, -1-j, 0, 0, 0, 1+j, 0, 0, 0,$
$0, 0, 0, -1-j, 0, 0, 0, 1+j, 0, 0, 0, 1+j, 0, 0, 0, 1+j, 0, 0, 0, 1+j, 0, 0, 0, 0, 0,$
$0, 0, 0, 0, 0, 0, 0, 1+j, 0, 0, 0, 1+j, 0, 0, 0, -1-j, 0, 0, 0, 1+j, 0, 0, 0, 1+j,$
$0, 0, 0, 0, 0, -1-j, 0, 0, 0, -1-j, 0, 0, 0, 1+j, 0, 0, 0, 1+j, 0, 0, 0, 1+j, 0, 0\}$

FIG. 27C 2703

$VHTS_{-122,122} = \{VHTS_{-58,58}, 0, 0, 0, 0, 0, 0, 0 | 0, 0, 0, 0, 0, 0, 0, VHTS_{-58,58}\}$

FIG. 27D 2704

$VHTS_{-250,250} = \{VHTS_{-122,122}, 0, 0, 0, 0, 0, 0, 0, 0, 0, 0, 0, VHTS_{-122,122}\}$

ORTHOGONAL FREQUENCY DIVISION MULTIPLE ACCESS FOR WIRELESS LOCAL AREA NETWORK

CROSS-REFERENCES TO RELATED APPLICATIONS

This application is a continuation of U.S. patent application Ser. No. 15/658,070, entitled "Orthogonal Frequency Division Multiple Access for Wireless Local Area Network," filed Jul. 24, 2017, which is a continuation of U.S. patent application Ser. No. 14/553,974, entitled "Orthogonal Frequency Division Multiple Access for Wireless Local Area Network," filed Nov. 25, 2014, which claims the benefit of U.S. Provisional Patent Application No. 61/987,778, entitled "Range Extension PHY," filed May 2, 2014 and U.S. Provisional Patent Application No. 61/909,616, entitled "OFDMA for WLAN: PHY Formats," filed Nov. 27, 2013. U.S. patent application Ser. No. 15/658,070 is also a continuation of U.S. patent application Ser. No. 14/955,017, entitled "Orthogonal Frequency Division Multiple Access for Wireless Local Area Network," filed Nov. 30, 2015, which is a divisional of U.S. patent application Ser. No. 14/553,974. All of the applications referenced above are incorporated herein by reference in their entireties.

FIELD OF THE DISCLOSURE

The present disclosure relates generally to communication networks and, more particularly, to wireless local area networks that utilize orthogonal frequency division multiple access.

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method includes: assigning, at a communication device, a plurality of different orthogonal frequency division multiplex (OFDM) tone blocks for a wireless local area network (WLAN) communication channel to a plurality of communication devices, including assigning a first OFDM tone block to a first communication device, and assigning a second OFDM tone block to a second communication device, wherein: the first OFDM tone block spans a first frequency bandwidth less than or equal to 10 MHz, the first OFDM tone block is within a subchannel that spans a frequency bandwidth of 20 MHz, and the second OFDM tone block spans a second frequency bandwidth less than or equal to 10 MHz, and the second OFDM tone block is within the subchannel. The method also includes generating, at the communication device, an orthogonal frequency division multiple access (OFDMA) physical layer (PHY) data unit for transmission in the WLAN communication channel. Generating the OFDMA PHY data unit comprises: generating a PHY preamble portion of the OFDMA PHY data unit that spans at least the subchannel, the PHY preamble portion including a legacy preamble portion that spans at least the subchannel, wherein the legacy preamble portion includes a legacy signal field that spans the subchannel, and generating a data portion of the OFDMA PHY data unit, the data portion including respective independent data for the plurality of devices modulated to respective OFDM tone blocks, including i) first data for the first communication device modulated to the first OFDM tone block within the subchannel, and second data for the second communication device modulated to the second OFDM tone block within the subchannel.

In another embodiment, an apparatus comprises a wireless network interface device having one or more integrated circuit (IC) devices. The network interface device includes a media access control layer (MAC) processing unit implemented on the one or more IC devices. The MAC processing unit is configured to: assign a plurality of different orthogonal frequency division multiplex (OFDM) tone blocks for a wireless local area network (WLAN) communication channel to a plurality of communication devices, including assigning a first OFDM tone block to a first communication device, and assigning a second OFDM tone block to a second communication device, wherein: the first OFDM tone block spans a first frequency bandwidth less than or equal to 10 MHz, the first OFDM tone block is within a subchannel that spans a frequency bandwidth of 20 MHz, and the second OFDM tone block spans a second frequency bandwidth less than or equal to 10 MHz, the second OFDM tone block is within the subchannel. The wireless network interface device further comprises a physical layer (PHY) processing unit implemented on the one or more IC devices. The PHY processing unit is coupled to the MAC processing unit, and is configured to generate an orthogonal frequency division multiple access (OFDMA) PHY data unit for transmission in the WLAN communication channel. Generating the OFDMA PHY data unit comprises: generating a PHY preamble portion of the OFDMA PHY data unit that spans at least the subchannel, the PHY preamble portion including a legacy preamble portion that spans at least the subchannel, wherein the legacy preamble portion includes a legacy signal field that spans the subchannel, and generating a data portion of the OFDMA PHY data unit, the data portion including respective independent data for the plurality of devices modulated to respective OFDM tone blocks, including i) first data for the first communication device modulated to the first OFDM tone block within the subchannel, and second data for the second communication device modulated to the second OFDM tone block within the subchannel.

In yet another embodiment, a method includes: determining, at a first communication device, an assignment of a first orthogonal frequency division multiplex (OFDM) tone block within a wireless local area network (WLAN) communication channel to the first communication device for an uplink orthogonal frequency division multiple access (OFDMA) transmission, wherein: the first OFDM tone block spans a first frequency bandwidth less than or equal to 10 MHz, and the first OFDM tone block is within a subchannel that spans a second frequency bandwidth of 20 MHz. The method also includes generating, at the first communication device, a first physical layer (PHY) data unit for transmission on the WLAN communication channel using data tones and pilot tones within the first OFDM tone block. Generating the first PHY data unit comprises: generating a preamble portion of the first PHY data unit, the preamble portion including a legacy signal field spanning the second frequency bandwidth, and generating a data portion of the first PHY data unit, the data portion including data modulated to the first OFDM tone block, the data portion of the first PHY data unit spanning the first frequency bandwidth. The first PHY data unit is for simultaneous transmission in the WLAN communication channel with a transmission of a second PHY data unit in the WLAN communication channel by a second communication device as part of the uplink OFDMA transmission, wherein a preamble portion of the second PHY data unit spans the subchannel, and wherein a data portion of the second PHY data unit spans a bandwidth of a second OFDM tone block within the subchannel.

In still another embodiment, an apparatus comprises a WLAN network interface device having one or more IC devices. The WLAN network interface device is associated with a first communication device, and includes a media access control layer (MAC) processing unit implemented on the one or more IC devices. The MAC processing unit is configured to determine an assignment of a first orthogonal frequency division multiplex (OFDM) tone block within a wireless local area network (WLAN) communication channel to the first communication device for an uplink orthogonal frequency division multiple access (OFDMA) transmission, wherein: the first OFDM tone block spans a first frequency bandwidth less than or equal to 10 MHz, and the first OFDM tone block is within a subchannel that spans a second frequency bandwidth of 20 MHz. The wireless network interface device further includes a physical layer (PHY) processing unit implemented on the one or more IC devices and coupled to the MAC processing unit. The PHY processing unit is configured to generate a first PHY data unit for transmission on the WLAN communication channel using data tones and pilot tones within the first OFDM tone block. Generating the first PHY data unit includes: generating a preamble portion of the first PHY data unit, the preamble portion including a legacy signal field spanning the second frequency bandwidth, and generating a data portion of the first PHY data unit, the data portion including data modulated to the first OFDM tone block, the data portion of the first PHY data unit spanning the first frequency bandwidth. The PHY processing unit is further configured to transmit the first PHY data unit simultaneously with a transmission of a second PHY data unit in the WLAN communication channel by a second communication device as part of the uplink OFDMA transmission, wherein a preamble portion of the second PHY data unit spans the subchannel, and wherein a data portion of the second PHY data unit spans a bandwidth of a second OFDM tone block within the subchannel.

BRIEF DESCRIPTION OF THE DRAWINGS

FIGS. 2A and 2B are diagrams of a prior art data unit format.

FIG. 3 is a diagram of another prior art data unit format.
FIG. 4 is a diagram of another prior art data unit format.
FIG. 5 is a diagram of another prior art data unit format.

FIGS. 7A, 7B, and 7C are diagrams illustrating example orthogonal frequency division multiplexing (OFDM) sub-channel blocks of an orthogonal frequency division multiple access (OFDMA) data unit for an 80 MHz communication channel, according to an embodiment.

FIG. 19A is a diagram illustrating a non-legacy signal field of the regular mode data unit of FIG. 17A, according to an embodiment.

FIG. 19B is a diagram illustrating a non-legacy signal field of the multiple access mode data unit of FIG. 17B, according to an embodiment.

FIGS. 25A and 25B are block diagrams of example uplink OFDM signals from different client stations, according to an embodiment.

FIGS. 27A, 27B, 27C, and 27D are example diagrams of short training fields for OFDMA data units, according to various embodiments.

DETAILED DESCRIPTION

Figure 1:
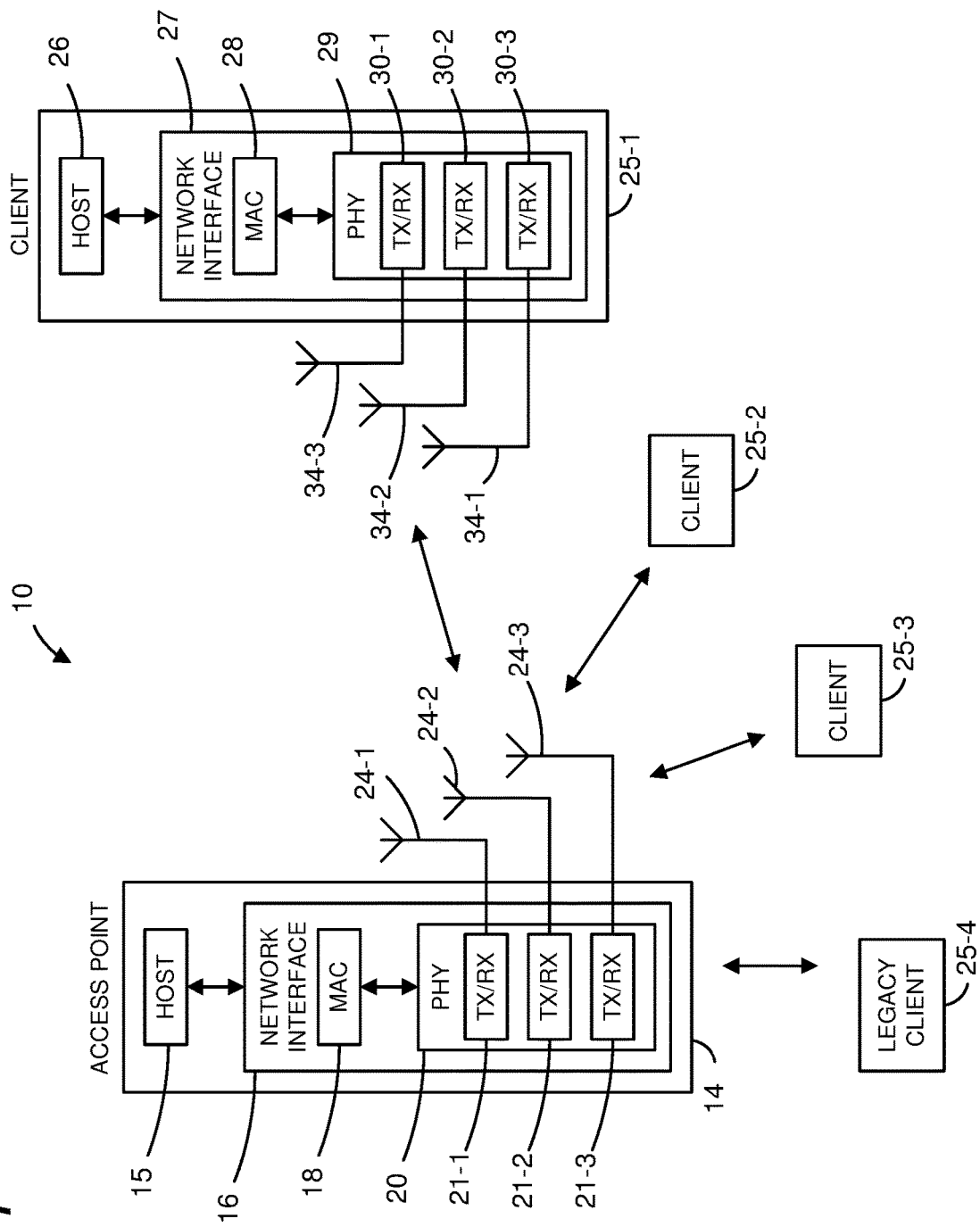
FIG. 1 is a block diagram of an example wireless local area network (WLAN), according to an embodiment.

In embodiments described below, a wireless network device such as an access point (AP) of a wireless local area network (WLAN) transmits data streams to a plurality of client stations. The AP is configured to operate with client stations according to at least a first communication protocol. The first communication protocol is sometimes referred to herein as "high efficiency Wi-Fi," "HEW" communication protocol, or 802.11ax communication protocol. In some embodiments described below, one or more client stations transmit respective data streams to an AP. In some embodiments, different client stations in the vicinity of the AP are configured to operate according to one or more other communication protocols which define operation in the same frequency band as the HEW communication protocol but with generally lower data throughputs. The lower data throughput communication protocols (e.g., IEEE 802.11a, IEEE 802.11n, and/or IEEE 802.11ac) are collectively referred herein as "legacy" communication protocols. In at least some embodiments, the legacy communication protocols are generally deployed in indoor communication channels, and the HEW communication protocol is at least sometimes deployed for outdoor communications.

According to an embodiment, orthogonal frequency division multiplex (OFDM) symbols transmitted by the AP are generated according to a multiple access mode that partitions a WLAN communication channel into OFDM tone blocks for simultaneous communication with multiple client stations. Simultaneous transmission with the client stations provides a reduction in overhead due to non-user data within a data unit, such as training fields and signal fields, in some embodiments. In an embodiment, the HEW communication protocol defines a regular mode and multiple access mode. The regular mode is generally used for a data unit transmitted to a single client station, while the multiple access mode is generally used for data units transmitted to multiple client stations, in an embodiment.

In an embodiment, a plurality of OFDM tone blocks for a WLAN communication channel are assigned to a plurality of devices. An orthogonal frequency division multiple access (OFDMA) data unit is generated for the WLAN communication channel. In some embodiments, the OFDMA unit includes a preamble portion and a data portion, the preamble portion having i) at least a legacy portion that spans the entire WLAN communication channel, ii) a first non-legacy portion that spans the first OFDM tone block, and iii) a second non-legacy portion that spans the second OFDM tone block. In some embodiments, the preamble is used, at least in part, to signal, to a receiving device, various parameters used for transmission of the data portion. In various embodiments, the preamble of a data unit is used to signal, to a receiving device, the mode being utilized for the OFDMA data unit and/or which receiving device is intended to decode a particular portion of the OFDMA data unit. In some embodiments, a same preamble format is used in the regular mode as in the multiple access mode. In one such embodiment, the preamble includes an indication set to indicate whether the regular mode or the multiple access mode is used. In an embodiment, the receiving device determines the mode being utilized based on the indication in the preamble of the data unit, and then decodes an indicated portion of the data unit (e.g., the data portion, or a portion of the preamble and the data portion). In another embodiment, a preamble used in the multiple access mode is formatted differently from a preamble used in the regular mode. For example, the preamble used in the multiple access mode is formatted such that the receiving device can automatically (e.g., prior to decoding) detect that the data unit corresponds to the multiple access mode.

Additionally, in at least some embodiments, a preamble of an OFDMA data unit in the regular mode and/or in the multiple access mode is formatted such that a client station that operates according to a legacy protocol, and not the HEW communication protocol, is able to determine certain information regarding the OFDMA data unit, such as a duration of the data unit, and/or that the data unit does not conform to the legacy protocol. Additionally, a preamble of the data unit is formatted such that a client station that operates according to the HEW protocol is able to determine the data unit conforms to the HEW communication protocol and whether the data unit is formatted according to the regular mode or the multiple access mode, in an embodiment. Similarly, a client station configured to operate according to the HEW communication protocol also transmits data units such as described above, in an embodiment.

In at least some embodiments, data units formatted such as described above are useful, for example, with an AP that is configured to operate with client stations according to a plurality of different communication protocols and/or with WLANs in which a plurality of client stations operate according to a plurality of different communication protocols. Continuing with the example above, a communication device configured to operate according to both the HEW communication protocol (including the regular mode and the multiple access mode) and a legacy communication protocol is able to determine that a given data unit is formatted according to the HEW communication protocol and not the legacy communication protocol, and further, to determine that the data unit is formatted according to the multiple access mode and not the regular mode. Similarly, a communication device configured to operate according to a legacy communication protocol but not the HEW communication protocol is able to determine that the data unit is not formatted according to the legacy communication protocol and/or determine a duration of the data unit.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., HEW communication protocol), including at least a first mode and a second mode of the first communication protocol. In some embodiments, the first mode corresponds to a multiple access mode that partitions a wider communication channel into narrower sub-bands or OFDM sub-channel blocks, and different data streams are transmitted in respective OFDM sub-channel blocks to respective client stations. OFDM sub-channel blocks are sometimes referred to herein as "OFDM tone blocks" (e.g., a block of adjacent tones or sub-carriers). The multiple access mode is configured to provide an orthogonal frequency division multiple access (OFDMA) data unit that includes at least a portion of separate data streams to respective client stations. In another embodiment, the MAC processing unit 18 and the PHY processing unit 20 are also configured to operate according to a second communication protocol (e.g., IEEE 802.11ac Standard). In yet another embodiment, the MAC processing unit 18 and the PHY processing unit 20 are additionally configured to operate according to the second communication protocol, a third communication protocol, and/or a fourth communication protocol (e.g., the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 21 is/are configured to receive data units via the antenna(s) 24. The PHY processing unit 20 of the AP 14 is configured to process received data units conforming to the first communication protocol and having formats described hereinafter and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

FIG. 2A is a diagram of a prior art OFDM data unit 200 that the AP 14 is configured to transmit to the legacy client station 25-4 via orthogonal frequency division multiplexing (OFDM) modulation, according to an embodiment. In an embodiment, the legacy client station 25-4 is also configured to transmit the data unit 200 to the AP 14. The data unit 200 conforms to the IEEE 802.11a Standard and occupies a 20 Megahertz (MHz) band. The data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The data unit 200 also includes a legacy signal field (L-SIG) 206, used to carry certain physical layer (PHY) parameters with the data unit 200, such as modulation type and coding rate used to transmit the data unit, for example. The data unit 200 also includes a data portion 208. FIG. 2B is a diagram of example data portion 208 (not low density parity check encoded), which includes a service field, a scrambled physical layer service data unit (PSDU), tail bits, and padding bits, if needed. The data unit 200 is designed for transmission over one spatial or space-time stream in a single input single output (SISO) channel configuration.

FIG. 3 is a diagram of a prior art OFDM data unit 300 that the AP 14 is configured to transmit to the legacy client station 25-4 via orthogonal frequency domain multiplexing (OFDM) modulation, according to an embodiment. In an embodiment, the legacy client station 25-4 is also configured to transmit the data unit 300 to the AP 14. The data unit 300 conforms to the IEEE 802.11n Standard, occupies a 20 MHz band, and is designed for mixed mode situations, i.e., when the WLAN includes one or more client stations that conform to the IEEE 802.11a Standard but not the IEEE 802.11n Standard. The data unit 300 includes a preamble having an L-STF 302, an L-LTF 304, an L-SIG 306, a high throughput signal field (HT-SIG) 308, a high throughput short training field (HT-STF) 310, and M data high throughput long training fields (HT-LTFs) 312, where M is an integer generally determined by the number of spatial streams ($N_{sts}$) used to transmit the data unit 300 in a multiple input multiple output (MIMO) channel configuration. In particular, according to the IEEE 802.11n Standard, the data unit 300 includes two HT-LTFs 312 if the data unit 300 is transmitted using two spatial streams, and four HT-LTFs 312 is the data unit 300 is transmitted using three or four spatial streams. An indication of the particular number of spatial streams being utilized is included in the HT-SIG field 308. The data unit 300 also includes a data portion 314.

FIG. 4 is a diagram of a prior art OFDM data unit 400 that the AP 14 is configured to transmit to the legacy client station 25-4 via orthogonal frequency domain multiplexing (OFDM) modulation, according to an embodiment. In an embodiment, the legacy client station 25-4 is also configured to transmit the data unit 400 to the AP 14. The data unit 400 conforms to the IEEE 802.11n Standard, occupies a 20 MHz band, and is designed for "Greenfield" situations, i.e., when the WLAN does not include any client stations that conform to the IEEE 802.11a Standard, and only includes client stations that conform to the IEEE 802.11n Standard. The data unit 400 includes a preamble having a high throughput Greenfield short training field (HT-GF-STF) 402, a first high throughput long training field (HT-LTF1) 404, a HT-SIG 406, and M data HT-LTFs 408, where M is an integer which generally corresponds to a number of spatial streams used to transmit the data unit 400 in a multiple input multiple output (MIMO) channel configuration. The data unit 400 also includes a data portion 410.

FIG. 5 is a diagram of a prior art OFDM data unit 500 that the AP 14 is configured to transmit to the legacy client station 25-4 via orthogonal frequency domain multiplexing (OFDM) modulation, according to an embodiment. In an embodiment, the legacy client station 25-4 is also configured to transmit the data unit 500 to the AP 14. The data unit 500 conforms to the IEEE 802.11ac Standard and is designed for "Mixed field" situations. The data unit 500 occupies a 20 MHz bandwidth. In other embodiments or scenarios, a data unit similar to the data unit 500 occupies a different bandwidth, such as a 40 MHz, an 80 MHz, or a 160 MHz bandwidth. The data unit 500 includes a preamble having an L-STF 502, an L-LTF 504, an L-SIG 506, two first very high throughput signal fields (VHT-SIGAs) 508 including a first very high throughput signal field (VHT-SIGA1) 508-1 and a second very high throughput signal field (VHT-SIGA2) 508-2, a very high throughput short training field (VHT-STF) 510, M very high throughput long training fields (VHT-LTFs) 512, where M is an integer, and a second very high throughput signal field (VHT-SIG-B) 514. The data unit 500 also includes a data portion 516.

Figure 6A:
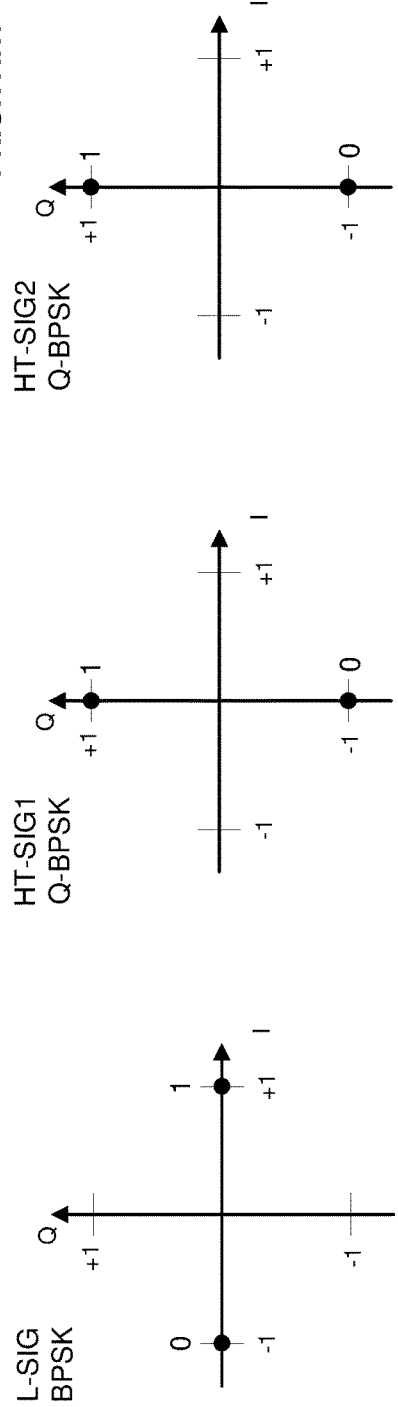
FIG. 6A is a group of diagrams of modulations used to modulate symbols in a prior art data unit.

FIG. 6A is a set of diagrams illustrating modulation of the L-SIG, HT-SIG1, and HT-SIG2 fields of the data unit 300 of FIG. 3, as defined by the IEEE 802.11n Standard. The L-SIG field is modulated according to binary phase shift keying (BPSK), whereas the HT-SIG1 and HT-SIG2 fields are modulated according to BPSK, but on the quadrature axis (Q-BPSK). In other words, the modulation of the HT-SIG1 and HT-SIG2 fields is rotated by 90 degrees as compared to the modulation of the L-SIG field.

Figure 6B:
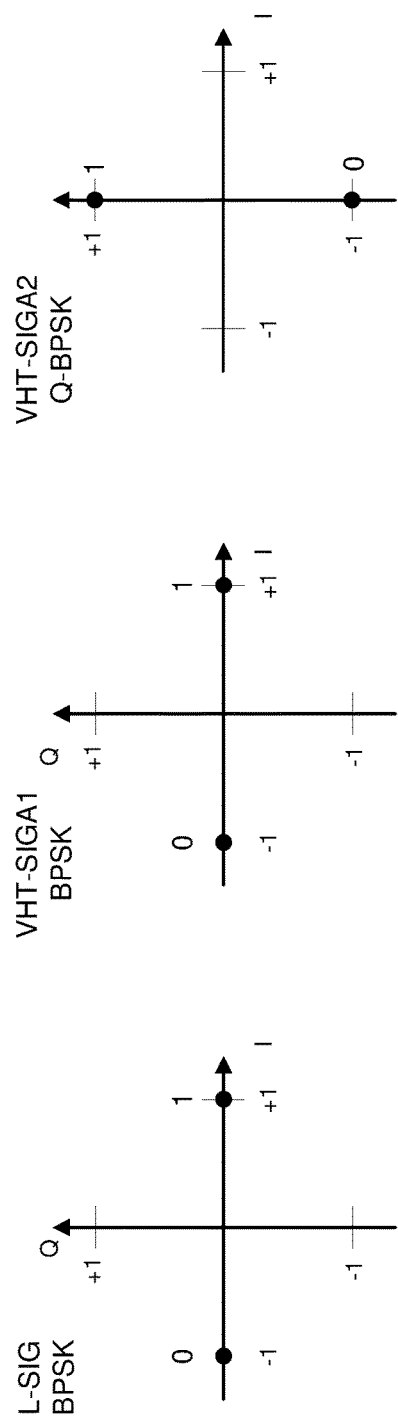
FIG. 6B is a group of diagrams of modulations used to modulate symbols in an example data unit, according to an embodiment.

FIG. 6B is a set of diagrams illustrating modulation of the L-SIG, VHT-SIGA1, and VHT-SIGA2 fields of the data unit 500 of FIG. 5, as defined by the IEEE 802.11ac Standard. Unlike the HT-SIG1 field in FIG. 6A, the VHT-SIGA1 field is modulated according to BPSK, same as the modulation of the L-SIG field. On the other hand, the VHT-SIGA2 field is rotated by 90 degrees as compared to the modulation of the L-SIG field.

FIGS. 7A, 7B, and 7C are diagrams illustrating example OFDM sub-channel blocks (or OFDM tone blocks) for an 80 MHz communication channel, according to an embodiment. In various embodiments, the communication channel is partitioned by an AP, such as the AP 14, into a plurality of OFDM tone blocks. In an embodiment, the AP assigns the plurality of OFDM tone blocks to one or more client stations, such as the client stations 25-1, 25-2, 25-3, or 25-4. In a downlink direction, the AP generates and transmits an OFDMA data unit that spans the communication channel and includes an OFDM data unit for one or more client stations, in an embodiment. In this embodiment, the OFDMA data unit includes an OFDM data unit for each client station which has been assigned an OFDM tone block via the corresponding tone block. In an embodiment, the OFDMA data unit omits an OFDM data unit for a client station, for example, if no data is to be transmitted to an idle client station. In this embodiment, the corresponding OFDM tone block for the idle client station is set to zero or the OFDMA data unit omits the corresponding OFDM tone block.

In FIG. 7A, a communication channel 700 is partitioned into four contiguous OFDM tone blocks 701, 702, 703, and 704, each having a bandwidth of 20 MHz, according to an embodiment. The OFDM tone blocks 701, 702, 703, and 704 are assigned to one or more client stations, according to various embodiments. In the embodiment shown in FIG. 7A, the OFDM tone blocks 701, 702, 703, and 704 include independent data streams for four client stations STA 1, STA 2, STA 3, and STA 4, respectively. In FIG. 7B, a communication channel 710 is partitioned into three contiguous OFDM tone blocks 711, 712, and 713, according to an embodiment. Two OFDM tone blocks 711 and 712 each have a bandwidth of 20 MHz. The remaining OFDM tone block 713 has a bandwidth of 40 MHz. The OFDM tone blocks 711, 712, and 713 are assigned to, and include independent data streams for, three client stations STA 1, STA 2, and STA 3, respectively. In FIG. 7C, a communication channel 720 is partitioned into four contiguous OFDM tone blocks 721, 722, 723, and 724, according to an embodiment. The OFDM tone blocks 721 and 722 each have a bandwidth of 10 MHz and thus together span a bandwidth equal to a smallest channel bandwidth of a legacy WLAN communication protocol (i.e., 20 MHz). The OFDM tone block 723 has a bandwidth of 20 MHz. The OFDM tone block 724 has a bandwidth of 40 MHz. The OFDM tone blocks 722 and 724 are assigned to, and include independent data streams for, two client stations STA 2 and STA 3, respectively. The OFDM tone blocks 721 and 723, which are separated in frequency by the OFDM tone block 722, are assigned to and include portions of a data stream for client station STA 1 and use a channel bonding technique, as described herein.

Although in FIGS. 7A, 7B, and 7C, the OFDM tone blocks are contiguous across the corresponding communication channel, in other embodiments the OFDM tone blocks are not contiguous across the communication channel (i.e., there are one or more gaps between the OFDM tone blocks). In an embodiment, each gap is at least as wide as one of the OFDM tone blocks. In another embodiment, at least one gap is less than the bandwidth of an OFDM tone block. In another embodiment, at least one gap is at least as wide as 1 MHz. In an embodiment, different OFDM tone blocks are transmitted in different channels defined by the IEEE 802.11a and/or 802.11n Standards. In one embodiment, the AP includes a plurality of radios and different OFDM tone blocks are transmitted using different radios.

In an embodiment, for a plurality of data streams transmitted by an AP in different OFDM tone blocks, different data streams are transmitted at different data rates when, for example, signal strength, SNR, interference power, etc., varies between client devices. Additionally, for a plurality of data streams transmitted by an AP in different OFDM tone blocks, the amount of data in different data streams is often different. Thus, one transmitted data stream can end before another. In such situations, the data in an OFDM tone block corresponding to the data stream that is ended is set to zero or some other suitable predetermined value, according to an embodiment.

An OFDM signal comprising a plurality of OFDM tone blocks to transmit independent data streams as described above is also referred to herein as an orthogonal frequency division multiple access (OFDMA) signals. According to an embodiment, a WLAN utilizes downlink OFDMA data units and uplink OFDMA data units. Downlink OFDMA data units are transmitted synchronously from a single AP to multiple client stations (i.e., point-to-multipoint). An uplink OFDMA data unit is transmitted by multiple clients stations jointly to a single AP (i.e., multipoint-to-point). Frame formats, modulation and coding schemes (MCS), a number of space time streams, tone spacing, and/or signaling schemes for downlink OFDMA and uplink OFDMA are different, according to some embodiments. In some embodiments, OFDM data units within an OFDMA data unit have different MCSs, numbers of space time streams, tone spacing, and/or signaling schemes.

Various embodiments of a PHY frame format for downlink and/or uplink OFDMA data units are described with respect to FIGS. 16, 22, 23, 24, 25A, 25B, 26A, and 26B. In the following embodiments, OFDM tone blocks have a format substantially similar to the PHY format specified in the IEEE 802.11ac Standard. In other embodiments, OFDM tone blocks have a format substantially similar to another communication protocol such as the PHY format specified in the IEEE 802.11a Standard, the IEEE 802.11n Standard, or a communication protocol not yet standardized.

In an embodiment, OFDM data units for OFDM tone blocks that span a bandwidth greater than or equal to 20 MHz are generated using a same MCS and "legacy" tone plan as defined in IEEE 802.11n and/or IEEE 802.11ac. As referred to herein, a tone plan is a predetermined sequence of indices that indicate which OFDM tones, corresponding to a fast Fourier transform (FFT) of suitable size, are designated for data tones, pilot tones, and/or guard tones. For example, in an embodiment, an OFDM tone block that spans 20 MHz uses an FFT of size 64 with a legacy tone plan for IEEE 802.11ac having four pilot tones (at indices −21, −7, +7, and +21), a direct current tone (at index 0), guard tones (at indices −32 to −29 and 29 to 31), and 52 data tones (at the remaining indices). In some embodiments, OFDM tone blocks that span 40 MHz, 80 MHz, or 160 MHz use FFT sizes of 128, 256, and 512, respectively, with corresponding legacy tone plans as defined in IEEE 802.11ac.

Figure 8:
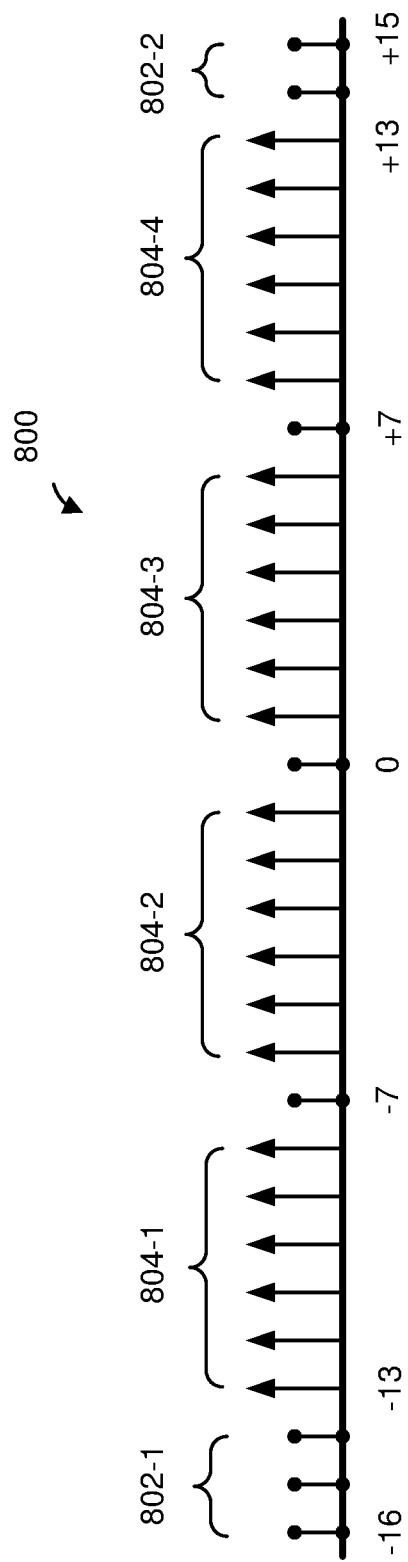
FIG. 8 is a diagram of an example tone plan for a 32-FFT tone plan, according to an embodiment.

In some embodiments, a communication channel is partitioned to include OFDM tone blocks that span a bandwidth smaller than 20 MHz, such as 10 MHz, 5 MHz, or 2.5 MHz. In an embodiment, an OFDM tone block that spans a bandwidth smaller than 20 MHz uses a tone plan different from a legacy tone plan. FIG. 8 is a diagram of an example tone plan 800 for an OFDM tone block that spans a 10 MHz bandwidth and uses an FFT size of 32, according to an embodiment. The tone plan 800 has two pilot tones (at indices −7 and +7), a direct current tone (at index 0), guard tones 802-1 and 802-2 (at indices −16 to −14 and 14 to 15), and 24 data tones 804-1, 804-2, 804-3, and 804-4 (at the remaining indices).

Figures 9A, 9B:
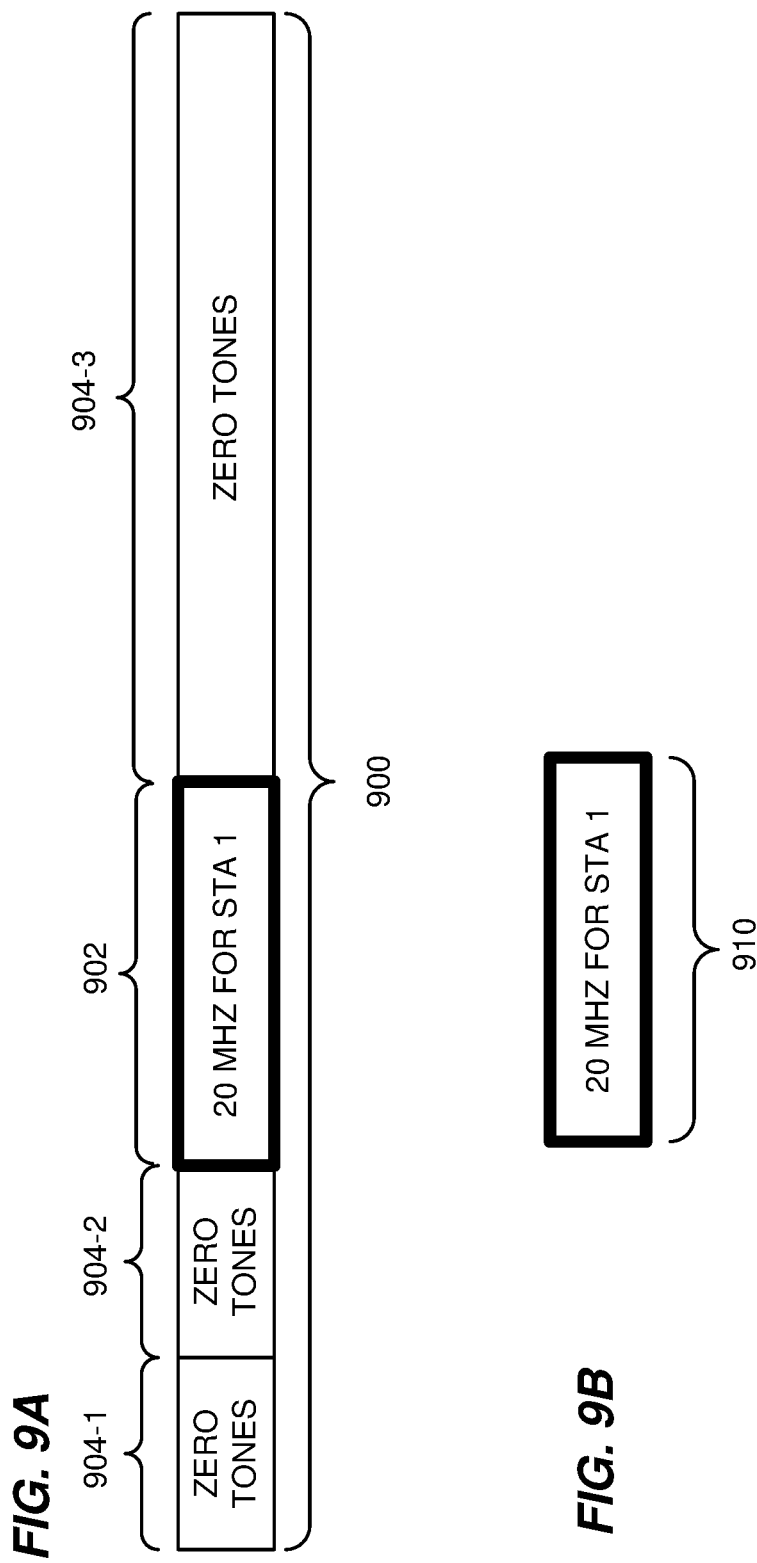
FIG. 9A is a diagram illustrating an example OFDMA data unit, according to an embodiment.
FIG. 9B is a diagram illustrating an example portion of an OFDMA data unit, according to another embodiment.

FIG. 9A is a diagram illustrating an example OFDMA data unit for an 80 MHz communication channel, according to an embodiment. In an uplink direction, a client station, such as the client station 25-1, generates and transmits a portion of an OFDMA data unit 900 that spans the communication channel using an FFT size of 256 (e.g., a "full-size" FFT), in an embodiment. In this embodiment, the OFDMA data unit 900 includes an OFDMA data unit portion 902 that spans the corresponding assigned OFDM tone block and zero tones 904-1, 904-2, and 904-3 inserted into unassigned OFDM tone blocks for the FFT. FIG. 9B is a diagram illustrating an example portion of an OFDMA data unit for an 80 MHz communication channel, according to another embodiment. In this embodiment, the client station generates and transmits an OFDMA data unit portion 910 that spans only the OFDM tone block assigned to the client station using a suitable FFT size (i.e., 64 FFT size for 20 MHz, 128 FFT size for 40 MHz, etc.).

Figure 10:
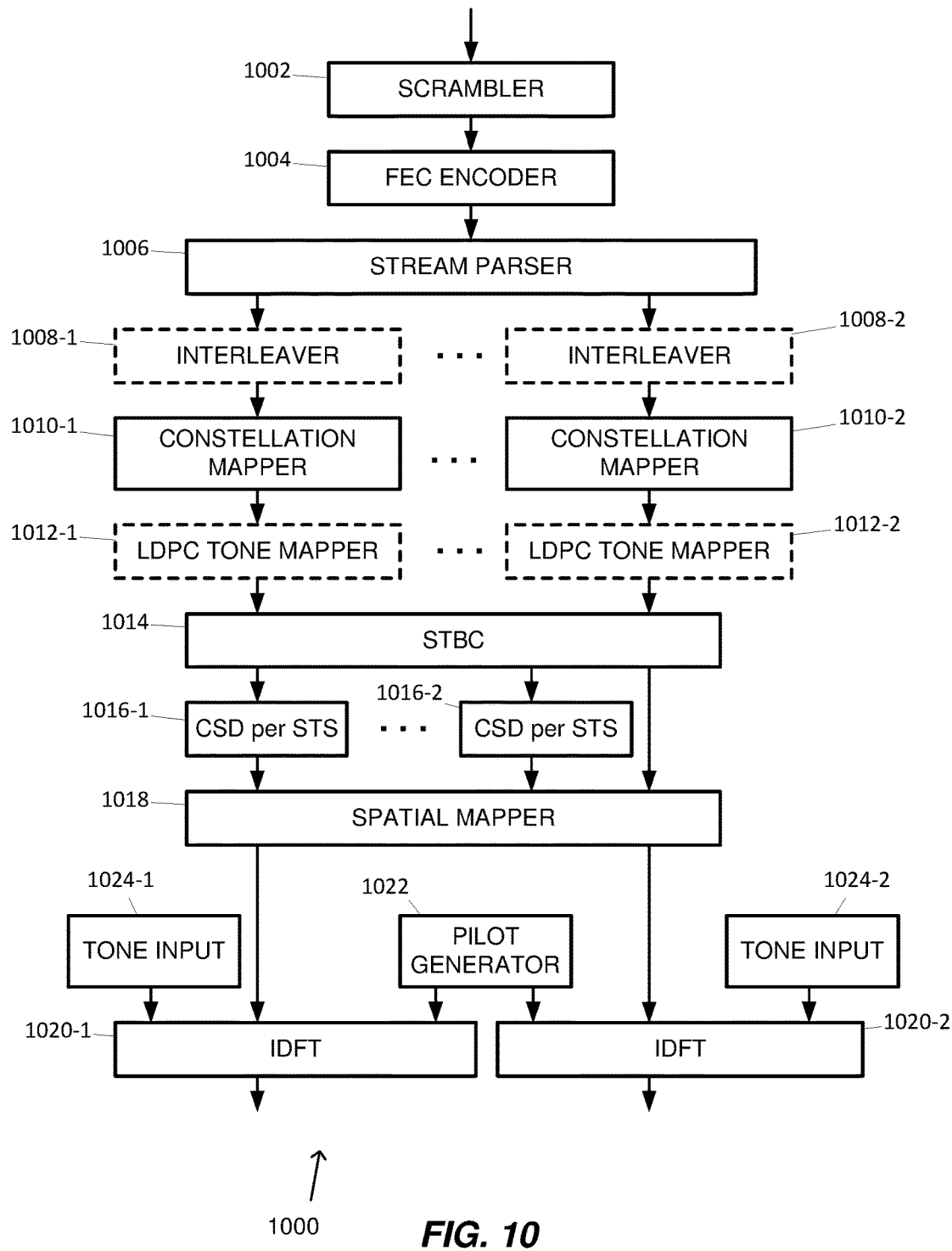
FIG. 10 is a block diagram of an example PHY processing unit for generating OFDMA data units or portions thereof, according to another embodiment.

FIG. 10 is a block diagram of an example PHY processing unit 1000 for generating an OFDMA data unit or an OFDMA data unit portion, according to various embodiments. Referring to FIG. 1, the AP 14 and the client station 25-1, in an embodiment, each include a PHY processing unit such as the PHY processing unit 1000. In various embodiments and/or scenarios, the PHY processing unit 1000 generates OFDM data units such as one of the data units of FIGS. 7A, 7B, 7C, 9A, or 9B, for example. The PHY processing unit 1000 includes a scrambler 1002 that generally scrambles an information bit stream to be transmitted in order to reduce the occurrence of long sequences of ones or zeros. An FEC encoder 1004 encodes scrambled information bits to generate encoded data bits. In one embodiment, the FEC encoder 1004 includes a binary convolutional code (BCC) encoder. In another embodiment, the FEC encoder 1004 includes a binary convolutional encoder followed by a puncturing block. In yet another embodiment, the FEC encoder 1004 includes a low density parity check (LDPC) encoder.

A stream parser 1006 receives and parses the encoded data bits into one or more spatial streams, in an embodiment. For each spatial stream (two spatial streams in the embodiment shown in FIG. 10), a constellation mapper 1010 maps the encoded data bits to constellation points corresponding to different subcarriers of an OFDM symbol. More specifically, for each spatial stream, the constellation mapper 1010 translates every bit sequence of length $\log_2(M)$ into one of M constellation points. In some embodiments, the PHY processing unit 1000 includes a plurality of parallel processing paths, for example, one path for each spatial stream. In other embodiments, a single processing path is used for the spatial streams.

In an embodiment where the FEC encoder 1004 is a BCC encoder, interleavers 1008 receive the encoded data bits and interleave the bits (i.e., changes the order of the bits), prior to the constellation mappers 1010, to prevent long sequences of adjacent noisy bits from entering a decoder at the receiver. In another embodiment, the interleavers 1008 are omitted. In an embodiment where the FEC encoder 1004 is an LDPC encoder, LDPC tone mappers 1012 reorder constellation points according to a tone remapping function. The tone remapping function is generally defined such that consecutive coded information bits or blocks of information bits are mapped onto nonconsecutive tones in the OFDM symbol to facilitate data recovery at the receiver in cases in which consecutive OFDM tones are adversely affected during transmission. In some embodiments, the LDPC tone mappers 1012 are omitted.

The outputs of the constellation mappers 1010 for each stream (or LDPC tone mappers 1012, where included) are operated on by a space time block coder (STBC) 1014, in an embodiment. The space-time block coder 1014 takes a single constellation symbol output and maps it onto multiple transmission chains for transmission by separate radio transmitters, transforming the spatial streams into space-time streams, in an embodiment. In embodiments or situations in which the PHY processing unit 1000 operates to generate data units for transmission via multiple spatial streams, one or more cyclic shift diversity (CSD) units 1016 inserts a cyclic shift into all but one of the spatial streams to prevent unintentional beamforming. A spatial mapper 1018 maps the space-time streams onto a transmission chain, in an embodiment. The PHY processing unit 1000 includes an inverse discrete Fourier transform (IDFT) processor 1020 for each transmission chain, in an embodiment. In an embodiment, the FEC encoder 1004, stream parser 1006, interleavers 1008, constellation mappers 1010, LDPC tone mappers 1012, STBC 1014, CSD units 1016, and spatial mapper 1018 operate according to the IEEE 802.11ac protocol.

The IDFT processor 1020 receives pilot tones from a pilot generator 1022 and spatially mapped constellation points from the spatial mapper 1018, in an embodiment. The IDFT processor 1020 converts a block of the spatially mapped constellation points corresponding to data tones within an OFDM tone block and pilot tones to a time-domain signal, in an embodiment. In some embodiments, the IDFT processor 1020 processes one or more tones from a tone input 1024 to be included in the time-domain signal. For example, in an embodiment, the PHY processing unit 1000 generates an OFDMA data unit having OFDM data units for multiple users to be transmitted from an AP (i.e., a downstream OFDMA data unit). In this embodiment, the tone input 1024 provides data tones and/or pilot tones corresponding to another user which are generated separately. The IDFT processor 1020 thus performs the IDFT jointly for all tones for all users simultaneously.

In another embodiment, the PHY processing unit 1000 generates a portion of an OFDMA data unit to be transmitted from a client station to an AP (i.e., a portion of an uplink OFDMA data unit). In an embodiment, the tone input 1024 provides zero tones for unassigned OFDM tone blocks for generation of the OFDMA data unit using a full-size FFT, as described above with respect to FIG. 9A. In another embodiment, the client station generates and transmits an OFDMA data unit portion that spans only the OFDM tone block assigned to the client station using a suitable FFT size, as described above with respect to FIG. 9B.

Figure 11:
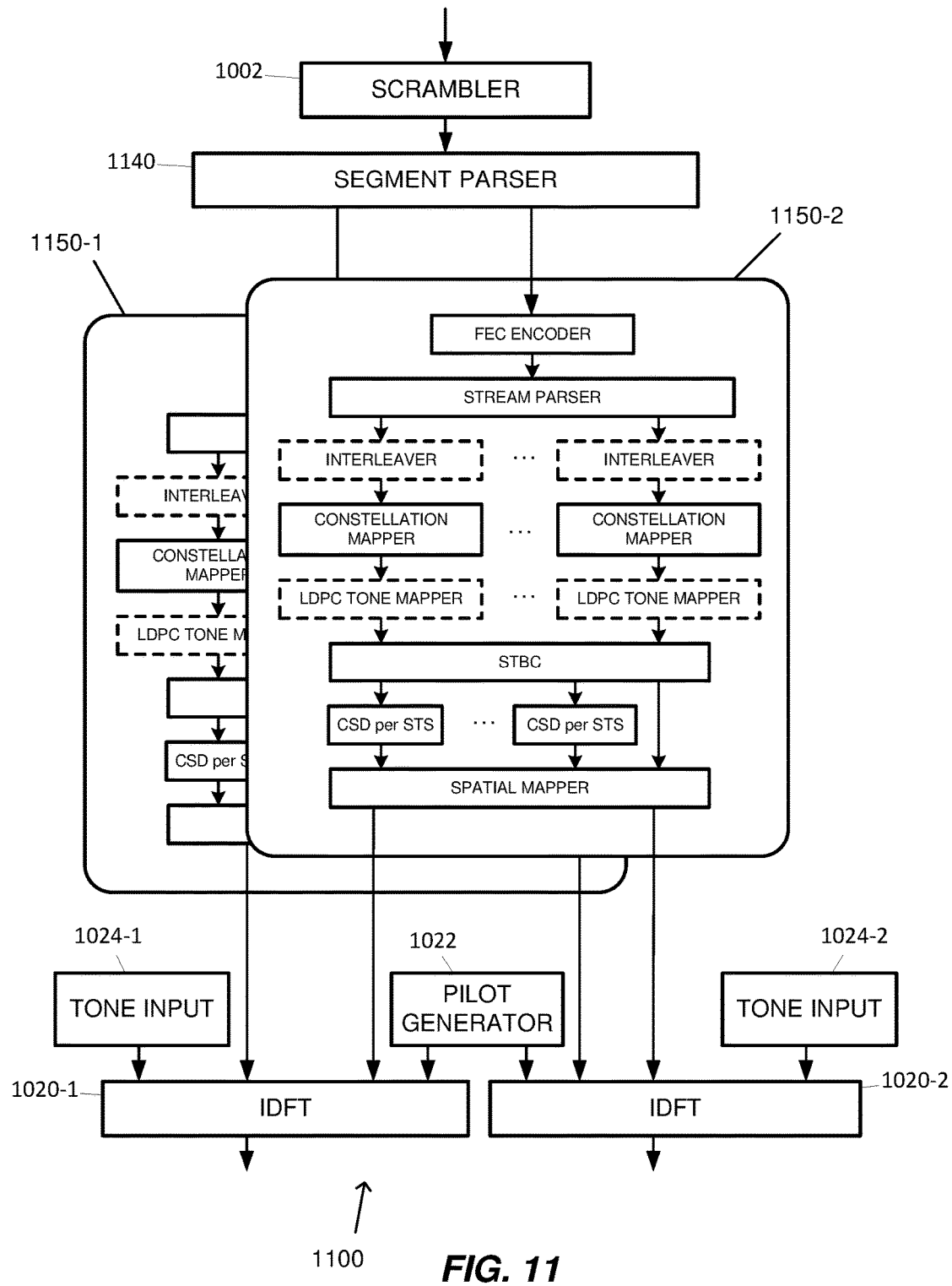
FIG. 11 is a block diagram of an example PHY processing unit for generating OFDMA data units or portions thereof using channel bonding, according to an embodiment.

FIG. 11 is a block diagram of an example PHY processing unit 1100 for generating an OFDMA data unit or an OFDMA data unit portion using channel bonding, according to an embodiment. The PHY processing unit 1100 is configured to provide an OFDMA data unit, or portion thereof, where a client station has been assigned two or more non-contiguous OFDM tone blocks ("bonded channels"). As described above with respect to FIGS. 7A, 7B, 7C, a communication channel is partitioned into a plurality of OFDM tone blocks. As shown in FIG. 7C, the OFDM tone blocks 721 and 723, which are separated in frequency by the OFDM tone block 722, are assigned to and include portions of a data stream for client station STA1 and use a channel bonding technique. In some embodiments, the PHY processing unit 1100 provides a separate encoder and modulator to allow for different MCS values for different OFDM tone blocks. In an embodiment, the PHY processing unit 1100 includes the scrambler 1002, pilot generator 1022, tone inputs 1024, and IDFT processors 1020, as described above with respect to FIG. 10. The PHY processing unit 1100 further includes a plurality of processing paths 1150 that operate substantially in parallel and correspond to the assigned OFDM tone blocks, in an embodiment. In another embodiment, the processing path 1150 is a single processing path. The processing paths 1150 each include the FEC encoder 1004, stream parser 1006, interleavers 1008, constellation mappers 1010, LDPC tone mappers 1012, STBC 1014, CSD units 1016, and spatial mapper 1018, as described above with respect to FIG. 10.

In an embodiment, the scrambler 1002 provides scrambled information bits to a segment parser 1140. The segment parser 1140 separates the scrambled information bits into a plurality of segments and passes each segment to an assigned OFDM tone block, in an embodiment. In an embodiment, the AP assigns same size OFDM tone blocks to a client station, such as 10 MHz+10 MHz, 20 MHz+20 MHz, or other suitable combinations. In another embodiment, the AP assigns different size OFDM tone blocks to a client station, such as 10 MHz+20 MHz+20 MHz, 10 MHz+40 MHz, or other suitable combinations. In other embodiments, additional OFDM tone blocks are bonded together, for example, three or four OFDM tone blocks are bonded together.

In an embodiment, each OFDM tone block that is a bonded channel uses a same tone plan as in a non-bonded channel scenario. For example, in an embodiment, a 10 MHz OFDM tone block corresponds to the tone plan shown in FIG. 8 when bonded with a 20 MHz OFDM tone block that uses an FFT of size 64 with a legacy tone plan for IEEE 802.11ac. In an embodiment, each OFDM tone block assigned to a same client station uses a same MCS value. In some embodiments, each OFDM tone block assigned to a same client station has a different MCS value. In an embodiment, each OFDM tone block assigned to a client station has a same number of space-time streams.

Figure 12:
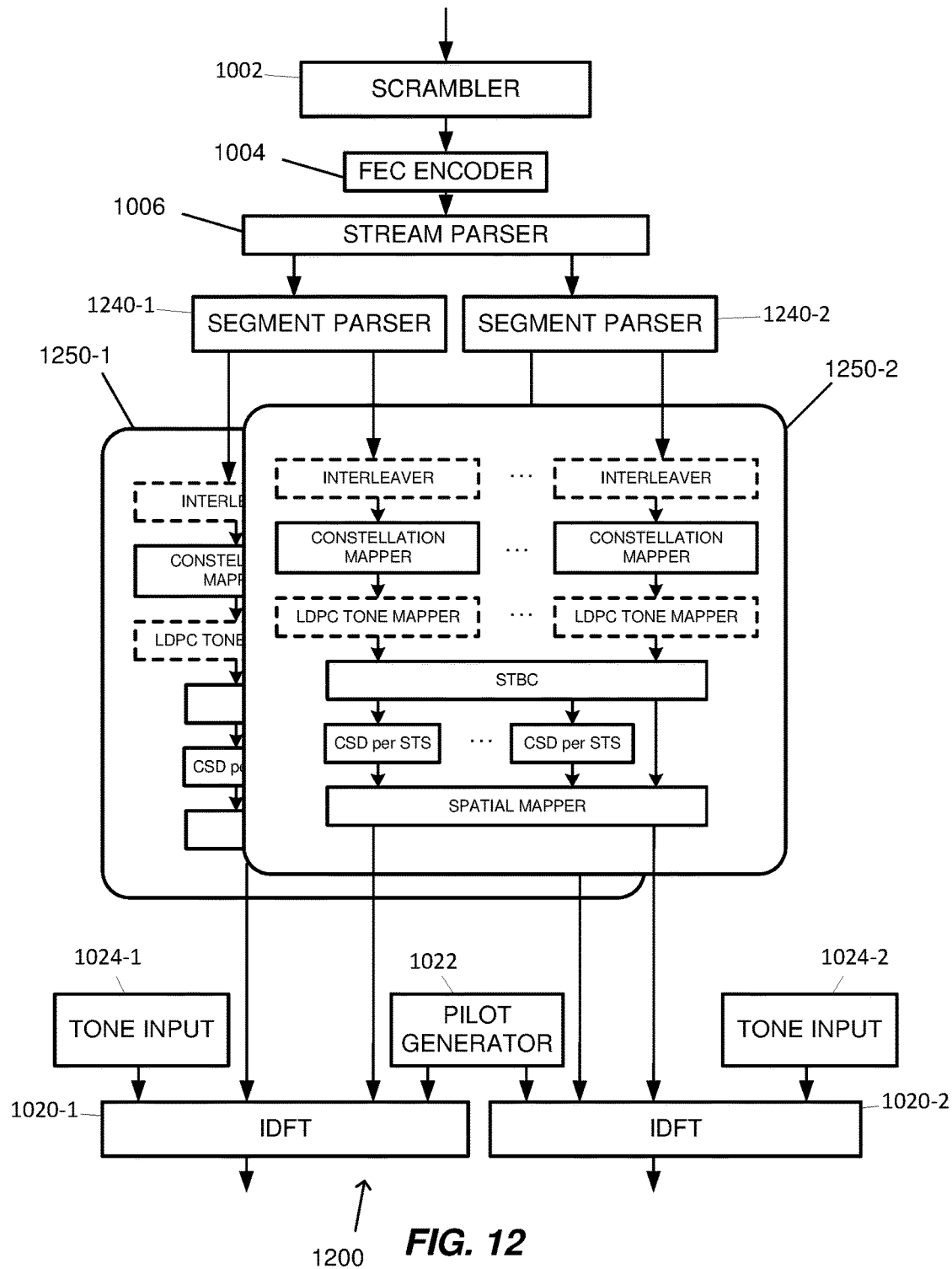
FIG. 12 is a block diagram of an example PHY processing unit for generating OFDMA data units or portions thereof using channel bonding, according to another embodiment.

FIG. 12 is a block diagram of an example PHY processing unit 1200 for generating an OFDMA data unit or an OFDMA data unit portion using channel bonding, according to another embodiment. The PHY processing unit 1200 is configured to provide an OFDMA data unit, or portion thereof, where a client station has been assigned two or more non-contiguous OFDM tone blocks. In an embodiment, the PHY processing unit 1200 includes the scrambler 1002, FEC encoder 1004, stream parser 1006, pilot generator 1022, tone inputs 1024, and IDFT processors 1020 as described above with respect to FIG. 10. In the embodiment shown in FIG. 12, the PHY processing unit 1200 provides a joint encoder for each user, for example, the FEC encoder 1004 performs joint encoding across the OFDM tone blocks assigned to a single user. A segment parser 1240 separates the spatial streams from the stream parser 1006 into a plurality of stream segments. The PHY processing unit 1200 includes a plurality of processing paths 1250 that operate substantially in parallel and correspond to the assigned OFDM tone blocks, in an embodiment. In another embodiment, the processing path 1250 is a single processing path. The processing paths 1250 each include the interleavers 1008, constellation mappers 1010, LDPC tone mappers 1012, STBC 1014, CSD units 1016, and spatial mapper 1018, as described above with respect to FIG. 10. The segment parser 1240 passes a spatial stream for an OFDM tone block from the stream parser 1006 to a corresponding processing path 1250, in an embodiment.

Figure 13:
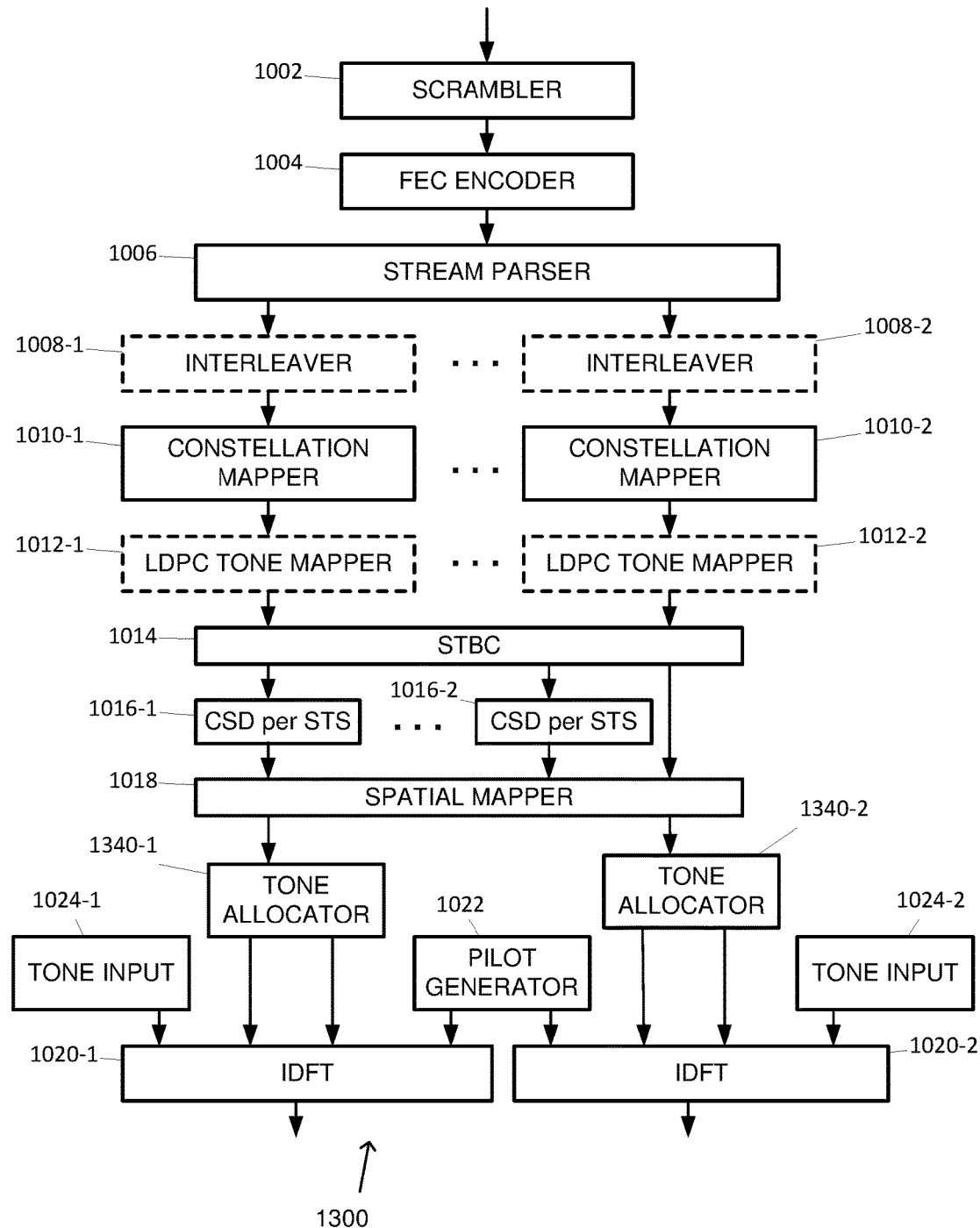
FIG. 13 is a block diagram of an example PHY processing unit for generating OFDMA data units or portions thereof using channel bonding, according to yet another embodiment.

FIG. 13 is a block diagram of an example PHY processing unit 1300 for generating an OFDMA data unit or an OFDMA data unit portion using channel bonding, according to yet another embodiment. The PHY processing unit 1300 is configured to provide an OFDMA data unit, or portion thereof, where a client station has been assigned two or more non-contiguous OFDM tone blocks using a same MCS value for each OFDM tone block. In an embodiment, the PHY processing unit 1300 includes the scrambler 1002, FEC encoder 1004, stream parser 1006, interleavers 1008, constellation mappers 1010, LDPC tone mappers 1012, STBC 1014, CSD units 1016, spatial mapper 1018, pilot generator 1022, tone inputs 1024, and IDFT processors 1020, as described above with respect to FIG. 10, and tone allocators 1340 configured to split spatial streams from the spatial mapper 1018 into the assigned OFDM tone blocks and provide the split spatial streams to the IDFT processors 1020.

Figure 14A:
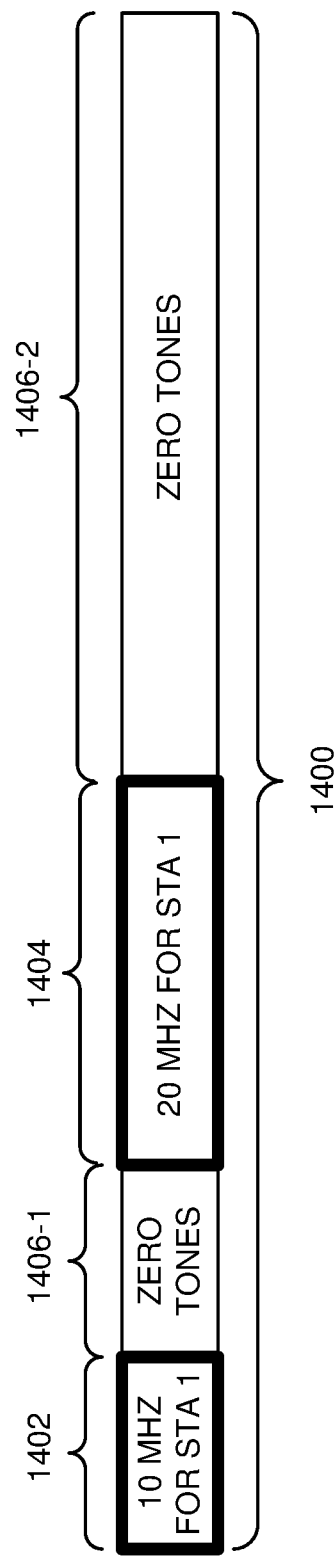
FIG. 14A is a diagram illustrating an example OFDMA data unit for a channel bonding scenario, according to an embodiment.

FIG. 14A is a diagram illustrating an example OFDMA data unit for a channel bonding scenario of an 80 MHz communication channel, according to an embodiment. In an uplink direction, a PHY processing unit, such as the PHY processing units 1100, 1200, or 1300, generates and transmits a portion of an OFDMA data unit 1400 that spans the communication channel using an FFT size of 256 (e.g., a "full-size" FFT), in an embodiment. In this embodiment, the OFDMA data unit 1400 includes a first OFDMA data unit portion 1402 that spans a first assigned OFDM tone block, a second OFDMA data unit portion 1404 that spans a second assigned OFDM tone block, and zero tones 1406-1 and 1406-2 inserted into unassigned OFDM tone blocks for the FFT.

Figure 14B:
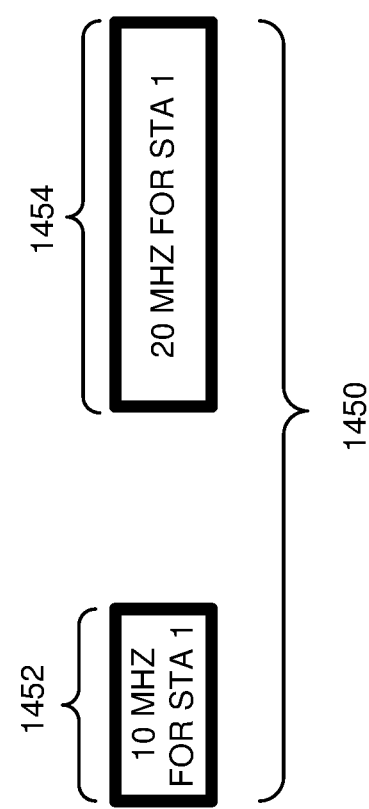
FIG. 14B is a diagram illustrating an example portion of an OFDMA data unit for a channel bonding scenario, according to another embodiment.

FIG. 14B is a diagram illustrating an example portion of an OFDMA data unit for a channel bonding scenario, according to another embodiment. In this embodiment, in an uplink direction, a PHY processing unit generates and transmits an OFDMA data unit portion 1450 that spans only assigned OFDM tone blocks 1452 and 1454. In an embodiment, the PHY processing unit generates and transmits data over the OFDM tone blocks 1452 and 1454 using separate transmission chains using suitable FFT sizes (i.e., 64 FFT size for 20 MHz, 128 FFT size for 40 MHz, etc.).

Figure 15A:
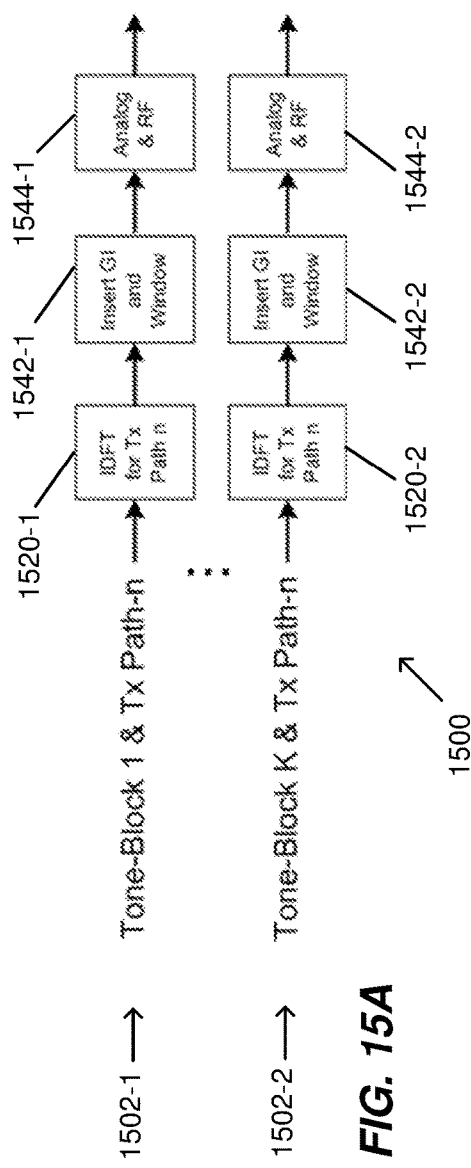
FIG. 15A is a block diagram of an example PHY processing unit for generating OFDMA data units or portions thereof using channel bonding, according to an embodiment.

FIG. 15A is a block diagram of an example PHY processing unit 1500 for generating an OFDMA data unit or an OFDMA data unit portion using channel bonding, according to an embodiment. The PHY processing unit 1500 is configured to generate and transmit an OFDMA data unit portion, such as the OFDMA data unit portion 1450, that spans only OFDM tone blocks assigned to a client station for an uplink transmission, in an embodiment. In some embodiments, the PHY processing unit 1500 includes separate transmission chains 1502 for filtering and transmitting a portion of the OFDMA data unit portion via each assigned OFDM tone block for a client station. In an embodiment, the transmission chain 1502-1 corresponds to the OFDM data unit 1452 and the transmission chain 1502-2 corresponds to the OFDM data unit 1454. Each transmission chain 1502 includes an IDFT processor 1520, such as the IDFT processor 1020 shown in FIG. 10, 11, 12, or 13, in various embodiments. The IDFT processor 1520 performs an IDFT using only those tones within the corresponding assigned OFDM tone block, in an embodiment. A guard interval (GI) insertion and windowing unit 1542 prepends, to an OFDM symbol received from the IDFT processor 1520, a circular extension of the OFDM symbol and smooths the edges of each symbol to increase spectral decay. The output of the GI insertion and windowing unit 1542 is provided to an analog and radio frequency (RF) unit 1544 that converts the signal to analog signal and upconverts the signal to RF frequency for transmission.

Figure 15B:
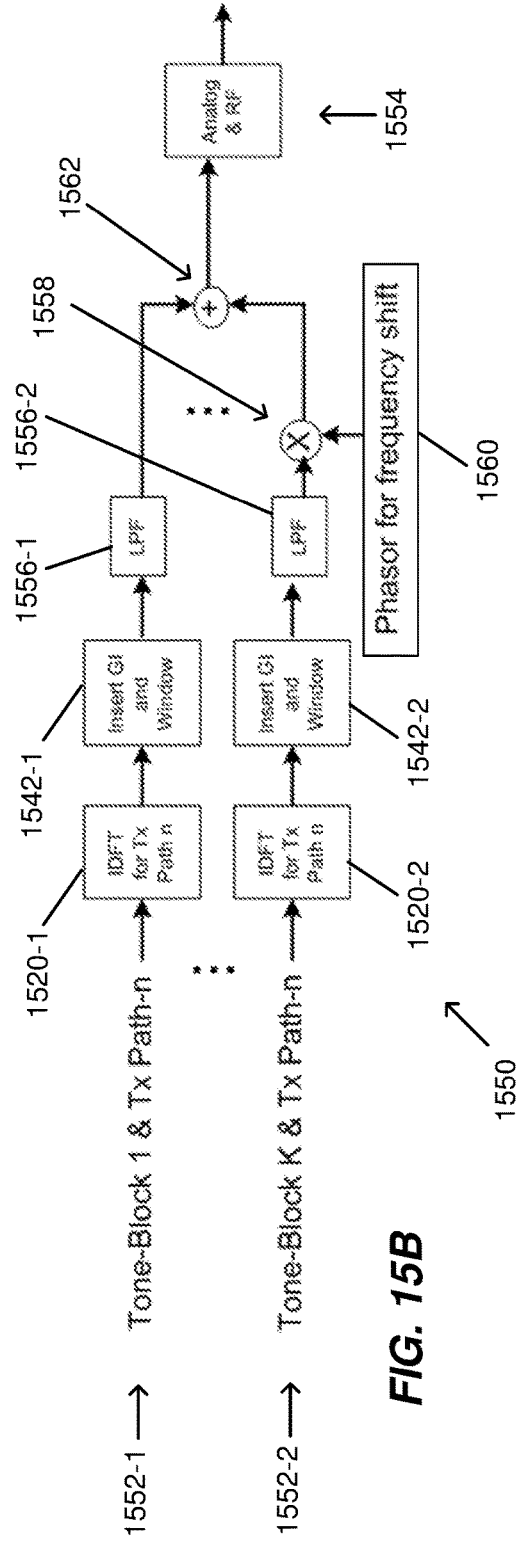
FIG. 15B is a block diagram of an example PHY processing unit for generating OFDMA data units or portions thereof using channel bonding, according to another embodiment.

FIG. 15B is a block diagram of an example PHY processing unit 1550 for generating an OFDMA data unit or an OFDMA data unit portion using channel bonding, according to another embodiment. The PHY processing unit 1550 is configured to generate and transmit an OFDMA data unit portion, such as the OFDMA data unit portion 1450, that spans only OFDM tone blocks assigned to a client station for an uplink transmission, in an embodiment. In some embodiments, the PHY processing unit 1550 includes separate transmission chains 1552 that correspond to each assigned OFDM tone block for a client station. In an embodiment, the transmission chain 1552-1 corresponds to the OFDM data unit 1452 and the transmission chain 1552-2 corresponds to the OFDM data unit 1454. Each transmission chain 1552 includes an IDFT processor 1520 and GI insertion and windowing unit 1542 as described above with respect to FIG. 15A, in various embodiments.

In an embodiment, the PHY processing unit 1550 is configured to filter and combine outputs from each GI insertion and windowing unit 1542 for transmission by a single radio transmitter (i.e., a wideband radio transmitter). For example, in an embodiment, each transmission chain 1552 includes a low pass filter 1556, such as a digital filter, that filters an output from each GI insertion and windowing unit 1542. A signal multiplier 1558 combines a phasor 1560 to provide a frequency shift to all but one of the filtered outputs, in an embodiment. The phasor 1560 is configured to provide a frequency shift that corresponds to the frequency separation between the assigned OFDM tone blocks, in an embodiment. Each filtered and shifted output is combined by a signal combiner 1562 and provided as a single time-domain signal to an analog and RF unit 1554 that converts the signal to an analog signal and upconverts the analog signal to RF frequency for transmission.

Figure 16:
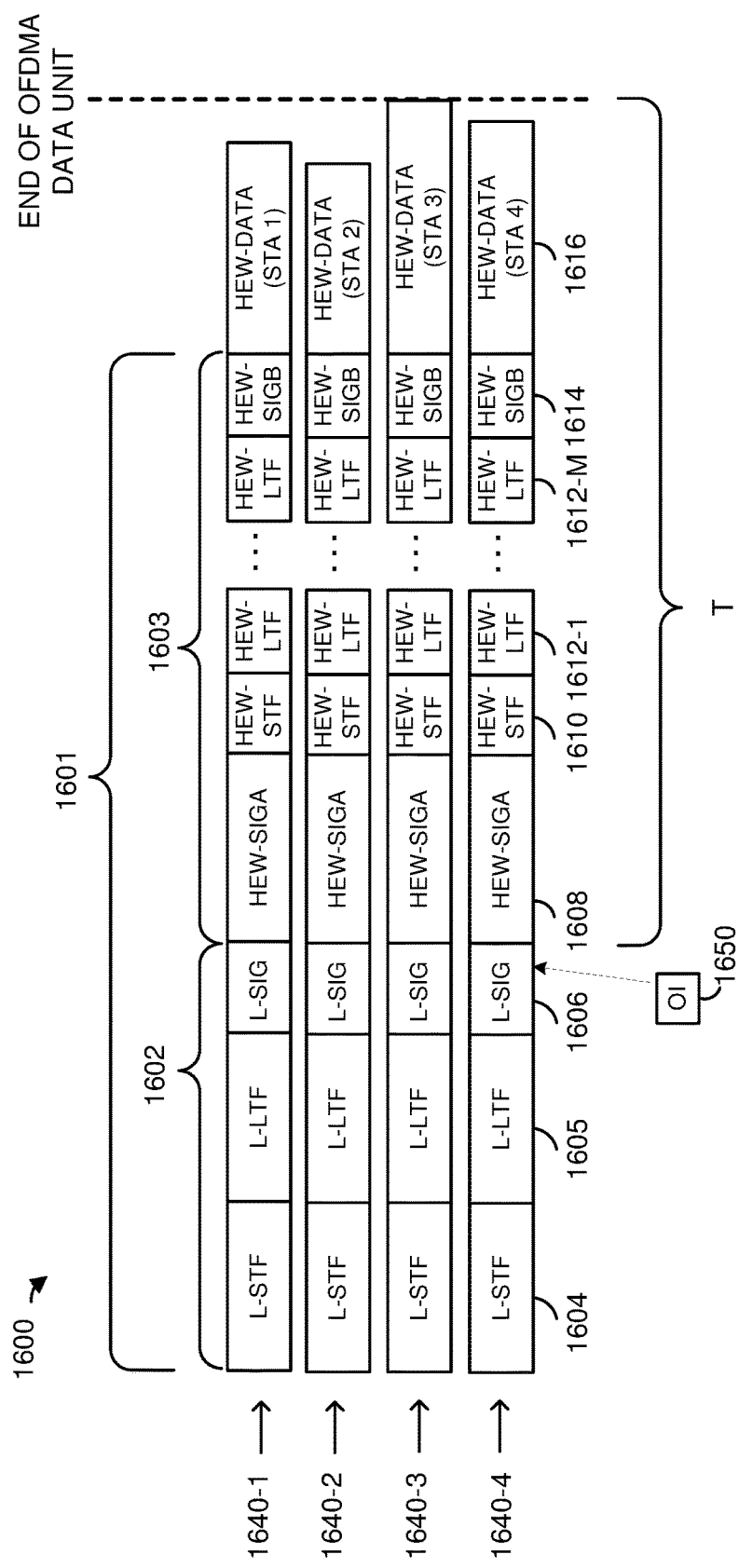
FIG. 16 is a block diagram of an example downlink OFDMA data unit, according to an embodiment.

FIG. 16 is a block diagram of an example OFDMA data unit 1600 that the AP 14 is configured to transmit over a communication channel to a plurality of client stations via OFDM modulation, according to an embodiment. The AP 14 partitions the communication channel into a plurality of OFDM tone blocks and assigns the OFDM tone blocks to a plurality of client stations as described above with respect to FIGS. 7A, 7B, and 7C, in an embodiment. The OFDMA data unit 1600 conforms to the first communication protocol. OFDMA data units that conform to the first communication protocol similar to the OFDMA data unit 1600 may occupy bandwidths such as 20 MHz, 40 MHz, 80 MHz, 160 MHz, 320 MHz, 640 MHz, for example, or other suitable bandwidths, in other embodiments. In the embodiment of FIG. 16, the communication channel spans a bandwidth of 80 MHz and is partitioned into four equal-width OFDM tone blocks of 20 MHz, which are assigned by the AP 14 to four client stations (e.g., STA 1, STA 2, STA 3, and STA 4). In other embodiments, two or more OFDM tone blocks are assigned to a same client device using a channel bonding technique, as described above with respect to FIGS. 11, 12, 13, 14A, 14B, 15A, and 15B. In some embodiments, the OFDM tone blocks span different sub-bands within a communication channel, such as 2.5 MHz, 5 MHz, 10 MHz, 20 MHz, 40 MHz, 80 MHz, 160 MHz sub-bands, or other suitable sub-bands.

The OFDMA data unit 1600 includes OFDM data units 1640 corresponding to each assigned OFDM tone block, in an embodiment. The OFDMA data unit 1600 is suitable for "mixed mode" situations, i.e., when the WLAN 10 includes a client station (e.g., the legacy client station 25-4) that conforms to a legacy communication protocol, but not the first communication protocol. The OFDMA data unit 1600 is utilized in other situations as well, in some embodiments. In some embodiments, the OFDM data units 1640 have PHY formats substantially similar to an IEEE 802.11 standard, such as IEEE 802.11a, IEEE 802.11g, and/or IEEE 802.11n. In an embodiment, each OFDM data unit 1640 has a same PHY format. In another embodiment, the OFDMA data unit 1600 includes OFDM data units having different PHY formats.

The OFDMA data unit 1600, and thus each OFDM data unit 1640, includes a preamble portion 1601 and a data portion 1616 (e.g., a data field for the corresponding client station), in an embodiment. In other embodiments, the OFDM data unit 1640 omits the data portion 1616. The preamble portion 1601 of each OFDM data unit 1640 includes at least a legacy portion 1602 and a non-legacy portion 1603, in an embodiment. The legacy portion 1602 includes a legacy short training field (L-STF) 1604, a legacy long training field (L-LTF) 1605, and a legacy signal (L-SIG) field 1606, in an embodiment. Accordingly, each of the L-STF 1604, the L-LTF 1605, and the L-SIG 1606 are repeated over a corresponding number of 20 MHz sub-bands of the whole bandwidth of the OFDMA data unit 1600, in an embodiment. In one embodiment, each OFDM tone block 1640 in FIG. 16 has a width of 20 MHz. In another embodiment, each OFDM tone block 1640 in FIG. 16 has a width of 40 MHz. According to an embodiment, if an OFDM tone block has a width of 40 MHz, the legacy portion 1602 (i.e., L-STF, L-LTF, and L-SIG) is duplicated at upper and lower 20 MHz halves, with the sub-channels in the upper 20 MHz phase shifted by 90 degrees with respect to the sub-channels in the lower 20 MHz.

The non-legacy portion 1603 includes an HEW signal (HEW-SIGA) field 1608, an HEW short training field (HEW-STF) 1610, M HEW long training fields (HEW-LTFs) 1612, where M is an integer, and a third HEW signal field (HEW-SIGB) 1614. Each of the L-STF 1604, the L-LTF 1605, the L-SIG 1606, the HEW-SIGA 1608, the HEW-STF 1610, the M HEW-LTFs 1612, and the HEW-SIGB 1614 comprises an integer number of one or more OFDM symbols. For example, in an embodiment, the HEW-SIGA 1608 comprises two OFDM symbols. In another embodiment, for example, the non-legacy portion 1603 of the preamble portion 1601 includes additional OFDM symbols for the HEW signal field 1608. In some embodiments, the HEW-SIGB field 1614 is omitted.

The legacy portion 1602 of the preamble portion 1601 (i.e., L-STF, L-LTF, and L-SIG) is identical in all of the OFDM data units 1640, according to an embodiment. In another embodiment, at least the L-SIG field is different in at least some of the OFDM data units 1640, for example, where at least some of the OFDM data units 1640 have different durations. For the non-legacy portion 1603 of the preamble portion 1601 (i.e., starting with HEW-SIGA), the content of the OFDM data units 1640 can be variant for different client stations depending on factors such as data rate, data quantity, configuration (e.g., number of antennas, number of supported multiple input, multiple output (MIMO) data streams, etc.) of different client stations. In some embodiments and/or scenarios, the non-legacy portion 1603 and/or the data portion 1616 are generated to include at least one padding OFDM symbol.

In an embodiment, the AP utilizes zero padding within the data portion 1616 to ensure that each OFDM data unit 1640 has a same duration and/or number of OFDM symbols (i.e., the duration of the longest OFDM data unit). In one embodiment, a MAC unit of the AP zero pads one or more MAC service data units (MSDUs) that are included in a MAC protocol data unit (MPDU), which is in turn included in a PHY protocol data unit (PPDU). By zero padding an MSDU, for example, the lengths of the MPDU and the PPDU are increased.

In some embodiments, the AP inserts additional HEW long training fields into the non-legacy portion 1603. In an embodiment, the AP generates the OFDMA data unit such that each OFDM tone block has a same number of HEW-LTF fields. For example, in an embodiment, the AP generates the OFDMA data unit such that each OFDM data unit uses a same number of spatial streams. In another embodiment where the number of spatial streams are different for at least some OFDM tone blocks, the AP generates the OFDMA data unit with additional HEW-LTF fields such that each OFDM data unit has the same number (i.e., a maximum number) of HEW-LTF fields.

In an embodiment, the AP determines a number of padding OFDM symbols to be included in the OFDM data unit 1640-2 as a difference between a total number of OFDM symbols of the OFDM data unit 1640-3 and a total number of OFDM symbols of the OFDM data unit 1640-2. For example, in an embodiment, at least one of the OFDM data units 1640 (i.e., the data units 1640-1, 1640-2, and 1640-4) includes padding such that a total length of the non-legacy portion 1603 and the OFDM data unit 1616 is equal to a total length of the non-legacy portion 1603 and the data portion 1616 of the OFDM data unit 1640-3.

In another embodiment, the AP generates the OFDM data unit 1640-2 to include at least one padding OFDM symbol such that a sum of a number of OFDM symbols in the non-legacy portion 1603 and a number of OFDM symbols of the OFDM data unit 1616 of the OFDM data unit 1640-2 is equal to a sum of a number of OFDM symbols of the non-legacy portion 1603 and a number of OFDM symbols of the OFDM data unit 1616 of the OFDM data unit 1640-3.

In an embodiment, the AP determines a number of OFDM symbols ($N_{sym,u}$) for each user based on a number data bytes and an MCS value for each user and inserts padding OFDM symbols such that each OFDM data unit 1640 has a number of symbols equal to $N_{sym}=\max(N_{sym,u})$. In some embodiments, the AP determines the number of OFDM symbols based on the non-legacy portion 1603 of the preamble portion 1601, for example, where a number of HEW-LTFs in the OFDM tone blocks is different for at least some OFDM tone blocks (for example, due to different numbers of spatial streams for different users of the OFDMA data unit). In one such embodiment, the AP determines the number of OFDM symbols for each user as $N_{sym,u}=N_{sym,u}$ (Data)+$N_{sym,u}$ (Preamble). In another embodiment, the AP determines the number of OFDM symbols for each user as $N_{sym,u}=N_{sym,u}$ (Data)+Delta_HEWLTF, where Delta_HEWLTF is number of HEW-LTFs of a current user subtracted by the smallest number of HEW-LTFs among all users for the OFDMA data unit 1600. In yet another embodiment, the AP determines the number of OFDM symbols for each user as $N_{sym}$ (Preamble+Data)=max($N_{sym,u}$ (data)+ $N_{HEWLTF,u}$). In some embodiments, the AP determines a number of data field symbols for setting the L-LENGTH field in L-SIG 1606 as the value of $N_{sym}$ (Data) reduced by the added number of HEWLTF symbols or the delta values. In an embodiment, the AP determines the number of padding OFDM symbols for each client station in an uplink OFDMA data unit and sends a sync frame with the determined number of padding OFDM symbols, or another suitable indicator, to inform each client station of the PHY parameters (e.g. $N_{sym}$). Each client station then jointly transmits a portion of the uplink OFDMA data unit according to the PHY parameters included in the sync frame.

In some embodiments, the AP sets an OFDMA indicator (OI) 1650 in the OFDMA data unit 1600 to signal the receiver that the current data unit is a downlink OFDMA data unit. According to an embodiment, the OFDMA indicator 1650 is set to indicate one of (i) the multiple access mode or (ii) the regular mode. In an embodiment, the OFDMA indicator 1650 comprises one bit, wherein a first value of the bit indicates the regular mode and a second value of the bit indicates the multiple access mode. In some embodiments, the OFDMA indicator 1650 is combined with a modulation and coding scheme (MCS) indicator or other suitable sub-field. In an embodiment, for example, the regular mode corresponds to MCS values which are determined to be valid by a legacy receiver device (e.g., in compliance with IEEE 802.11ac protocol), while the multiple access mode corresponds to an MCS value that is determined to be invalid (or not supported) by the legacy receiver device (e.g., not in compliance with IEEE 802.11ac protocol). In other embodiments, the OFDMA indicator 1650 has a plurality of bits that indicate a plurality of regular mode MCS values and a plurality of range extension mode MCS values.

In an embodiment, the OFDMA indicator 1650 is a "reserved bit" in each of the L-SIG fields which the AP sets to "1" (the IEEE 802.11a and 802.11n Standards specify that the "reserved bit" in L-SIG to "0") to signal the receiver that the current data unit is a downlink OFDMA data unit. Additionally, the AP sets the Length and Rate sub-fields in each off the L-SIG fields to correspond to T, the duration of the longest OFDM data unit 1640 and non-legacy portion 1603 (i.e., OFDM data unit 1640-3). According to another embodiment, the OFDMA indicator 1650 is a "reserved bit" in each of the HEW-SIGA fields which the AP sets to "0" to signal the receiver that the current data unit is a downlink OFDMA data unit.

In some embodiments, the OFDMA indicator 1650 includes a group ID sub-field within the HEW-SIGA 1608. In an embodiment, the group ID sub-field identifies an OFDMA group (i.e., a plurality of client stations intended to decode the OFDMA data unit 1600). In one such embodiment, the group ID sub-field includes a group ID value that indicates any of a multi-user (MU) MIMO data unit, an OFDMA data unit, or a single user data unit. In this embodiment, a separate indication field is not needed to distinguish between OFDMA data units and non-OFDMA data units and thus a receiver can determine which type of data unit by parsing the group ID sub-field. In one embodiment, the group ID sub-field indicates that OFDMA and MU-MIMO are used together within a same data unit.

In another embodiment, the OFDMA indicator 1650 includes both an OFDMA indication sub-field (i.e., to indicate that the data unit is an OFDMA data unit) and a group ID sub-field (i.e., to indicate which group of client stations are intended to decode the data unit). In some embodiments, the OFDMA indicator 1650 also includes a user ID sub-field that indicates which client station within an OFDMA group is intended to decode a corresponding OFDM tone block. In an embodiment, the OFDMA indicator 1650 is configured to signal the MCS, number of spatial streams, a coding scheme, space time block coding, or other PHY parameters for decoding each corresponding OFDM tone block. In some embodiments, where the number of HEW-LTFs for all users in different OFDM tone blocks are the same (i.e., insertion of HEW-LTFs for padding or corresponding to a number for the largest $N_{sts}$ among client stations), the OFDMA indicator 1650 signals both the $N_{sts}$ of the current client station and a maximum $N_{sts}$ among all client stations.

In some embodiments, the OFDMA indicator 1650 includes a tone block assignment indication that indicates which OFDM tone blocks have been assigned to a client station. In an embodiment, the tone block assignment indication is a mapping table that maps a user ID to an OFDM tone block ID. In some embodiments, the OFDMA indicator 1650 is different for subsequent OFDMA data units, which allows the AP to dynamically partition and/or assign OFDM tone blocks to client stations on a per-data unit basis. In other embodiments, the tone block assignment indication is omitted, for example, where the OFDM tone block assignment is fixed for a longer duration (e.g., fixed when an OFDMA group is formed or changed after a predetermined data units have been sent).

In other embodiments, the AP signals that a data unit is a downlink OFDMA data unit using techniques other than those described above. For example, according to one embodiment, the AP uses MAC layer signaling to reserve a time period for transmitting a downlink OFDMA data unit. In this embodiment, MAC layer signaling is utilized to specify the duration T of the downlink OFDMA data unit 1600. In another embodiment, MAC layer signaling does not specify the duration T of the downlink OFDMA data unit 1600, but rather specifies different respective times at which respective client stations should send respective acknowledgments of the downlink OFDMA data unit 1600. In another embodiment, the AP or client station utilizes MAC layer signaling to specify a single time at which all client stations corresponding to the downlink OFDMA data unit 1600 should simultaneously transmit respective acknowledgments.

In some embodiments, the L-SIG 1606 and HEW-SIGA 1608 have the same modulation as the modulation of the corresponding field as defined in the IEEE 802.11ac Standard. Accordingly, a first sub-field of the HEW-SIGA 1608 is modulated the same as the L-SIG field. On the other hand, a second sub-field of the HEW-SIGA 1608 is rotated by 90 degrees as compared to the modulation of the L-SIG field. In some embodiments having a third sub-field of the HEW-SIGA 1608, the second sub-field is modulated the same as the L-SIG field and the first sub-field, while the third sub-field is rotated by 90 degrees as compared to the modulation of the L-SIG field, the first sub-field, and the second sub-field.

In an embodiment, because the modulations of the L-SIG 1606 and sub-fields of the HEW-SIGA 1608 of the OFDM data unit 1640 correspond to the modulations of the corresponding fields in a data unit that conforms to the IEEE 802.11ac Standard (e.g., the data unit 500 of FIG. 5), legacy client stations configured to operate according to the IEEE 802.11a Standard and/or the IEEE 802.11n Standard will assume, in at least some circumstances, that the OFDM data unit 1640 conforms to the IEEE 802.11ac Standard and will process the OFDM data unit 1640 accordingly. For example, a client station that conforms to the IEEE 802.11a Standard will recognize the legacy IEEE 802.11a Standard portion of the preamble of the data unit 1640 and will set a duration of the data unit (or the data unit duration) according to a duration indicated in the L-SIG 1606. For example, the legacy client station 25-4 will calculate a duration for the data unit based on a rate and a length (e.g., in number of bytes) indicated in the L-SIG field 1606, according to an embodiment. In an embodiment, the rate and the length in the L-SIG field 1606 are set such that a client station configured to operate according to a legacy communication protocol will calculate, based the rate and the length, a packet duration (T) that corresponds to, or at least approximates, the actual duration of the data unit 1640. For example, the rate is set to indicate a lowest rate defined by the IEEE 802.11a Standard (i.e., 6 Mbps), and the length is set to a value computed such that packet duration computed using the lowest rate at least approximates the actual duration of the data unit 1640, in one embodiment.

In an embodiment, a legacy client station that conforms to the IEEE 802.11a Standard, when receiving the data unit 1640, will compute a packet duration for the data unit 1640, e.g., using a rate field and a length field of L-SIG field 1606, and will wait until the end of the computed packet duration before performing clear channel assessment (CCA), in an embodiment. Thus, in this embodiment, communication medium is protected against access by the legacy client station at least for the duration of the data unit 1640. In an embodiment, the legacy client station will continue decoding the data unit 1640, but will fail an error check (e.g., using a frame check sequence (FCS)) at the end of the data unit 1640.

Similarly, a legacy client station configured to operate according to the IEEE 802.11n Standard, when receiving the data unit 1640, will compute a packet duration (T) of the data unit 1640 based on the rate and the length indicated in the L-SIG 1606 of the data unit 1640, in an embodiment. The legacy client station will detect the modulation of the first sub-field of the HEW signal field (HEW-SIGA) as BPSK and will assume that the data unit 1640 is a legacy data unit that conforms to the IEEE 802.11a Standard. In an embodiment, the legacy client station will continue decoding the data unit 1640, but will fail an error check (e.g., using a frame check sequence (FCS)) at the end of the data unit. In any event, according to the IEEE 802.11n Standard, the legacy client station will wait until the end of a computed packet duration (T) before performing clear channel assessment (CCA), in an embodiment. Thus, communication medium will be protected from access by the legacy client station for the duration of the data unit 1640, in an embodiment.

A legacy client station configured to operate according to the IEEE 802.11ac Standard but not the first communication protocol, when receiving the data unit 1640, will compute a packet duration (T) of the data unit 1640 based on the rate and the length indicated in the L-SIG 1606 of the data unit 1640, in an embodiment. However, the legacy client station will not be able to detect, based on the modulation of the data unit 1640, that the data unit 1640 does not conform to the IEEE 802.11ac Standard, in an embodiment. In some embodiments, one or more sub-fields of the HEW signal field 1608 of the data unit 1640 is/are formatted to intentionally cause the legacy client station to detect an error when decoding the data unit 1640, and to therefore stop decoding (or "drop") the data unit 1640. For example, HEW-SIGA 1608 of the data unit 1640 is formatted to intentionally cause an error when the SIGA field is decoded by a legacy device according to the IEEE 802.11ac Standard, in an embodiment. Further, according to the IEEE 802.11ac Standard, when an error is detected in decoding the VHT-SIGA field, the client station will drop the data unit 1640 and will wait until the end of a computed packet duration (T), calculated, for example, based on a rate and a length indicated in the L-SIG 1606 of the data unit 1640, before performing clear channel assessment (CCA), in an embodiment. Thus, communication medium will be protected from access by the legacy client station for the duration of the OFDM data unit 1640, in an embodiment.

Figures 17A, 17B:
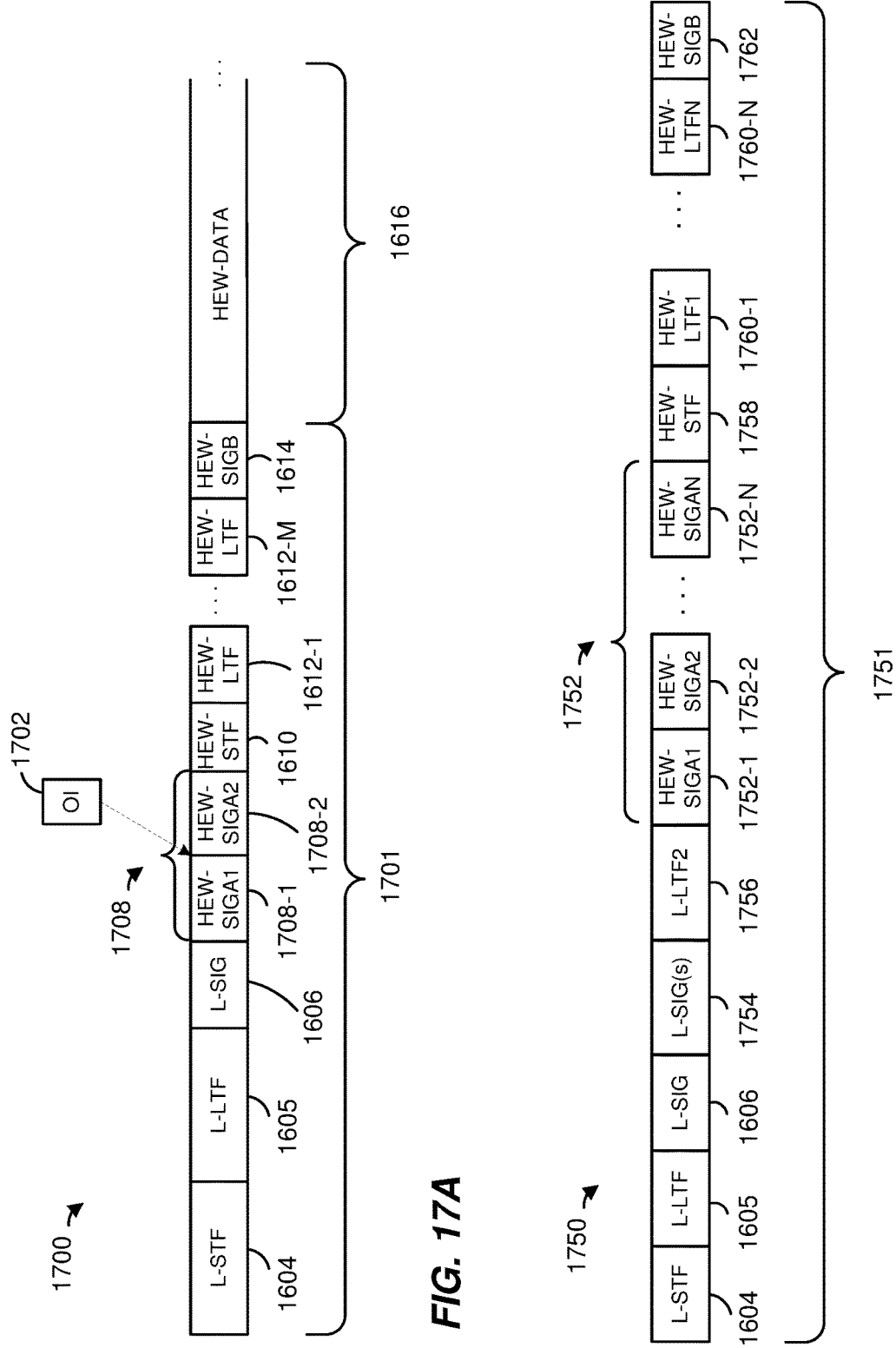
FIG. 17A is a diagram illustrating a regular mode data unit, according to an embodiment.
FIG. 17B is a diagram illustrating a multiple access mode data unit, according to an embodiment.

In some embodiments, a different preamble format is used for the multiple access mode data units as compared to the preamble used for regular mode data units. In such embodiments, a device receiving a data unit can automatically detect whether the data unit is a regular mode data unit or a multiple access mode data unit based on the format of the preamble of the data unit. FIG. 17A is a diagram illustrating a regular mode data unit 1700, according to an embodiment. The regular mode data unit 1700 includes a regular mode preamble 1701. The regular mode preamble 1701 is generally the same as the preamble 1601 of the OFDM data units 1640 of FIG. 16. In an embodiment, the preamble 1701 includes a HEW-SIGA field 1708, which includes a first HEW-SIGA1 field 1708-1 and a second first HEW-SIGA2 field 1708-1. In an embodiment, the HEW-SIGA field 1708 (e.g., the HEW-SIGA1 1708-1 or the HEW-SIGA2 1708-2) of the preamble 1701 includes an OFDMA indication 1702. The OFDMA indication 1702 is set to indicate whether the multiple access mode or the regular mode is used for the data unit 1700, in an embodiment. In an embodiment, the OFDMA indication 1702 comprises one bit, wherein a first value of the bit indicates the regular mode and a second value of the bit indicates the multiple access mode. As will be explained in more detail below, a device receiving the data unit 1700 is able to detect, based on the format of the preamble 1701, that the preamble 1701 is a regular mode preamble, and not a multiple access mode preamble, in an embodiment. Upon detecting that the preamble 1701 is the regular mode preamble, the receiving device determines, based on the OFDMA indication 1702, whether the multiple access mode or the regular mode is used for OFDM symbols of the data portion 1616, and decodes the data portion 1616 accordingly, in an embodiment. In some embodiments, when the OFDMA indication 1702 indicates that the multiple access mode is being utilized, the OFDM symbols of a portion of the preamble 1701 (e.g., the HEW-LTFs and HEW-SIGB), as well as OFDM symbols of the data portion 1616 are generated using OFDM modulation with smaller tone spacing compared to tone spacing used for regular mode OFDM symbols.

FIG. 17B is a diagram illustrating a multiple access mode data unit 1750, according to an embodiment. The multiple access mode data unit 1750 includes a multiple access mode preamble 1751. The data unit 1750 is generally similar to the data unit 1700 of FIG. 17A, except that the preamble 1751 of the data unit 1750 is formatted differently from the preamble 1701 of the data unit 1700. In an embodiment, the preamble 1751 is formatted such that a receiving device that operates according to the HEW communication protocol is able to determine that the preamble 1751 is a multiple access mode preamble rather than a regular mode preamble. In an embodiment, the multiple access mode preamble 1751 includes an L-STF 1604, an L-LTF 1605, and an L-SIG 1606, and one or more first HEW signal fields (HEW-SIGAs) 1752. In an embodiment, the preamble 1750 further includes one or more secondary L-SIG(s) 1754 that follow the L-SIG field 1606. The secondary L-SIG(s) 1754 are followed by a second L-LTF field (L-LTF2) 1756, in some embodiments. In other embodiments, the preamble 1751 omits the L-SIG(s) 1754 and/or the L-LTF2 1756. In some embodiments, the preamble 1751 also includes an HEW-STF 1758, one or more HEW-LTF fields 1760, and a second HEW signal field (HEW-SIGB) 1762. In other embodiments, the preamble 1751 omits the HEW-STF 1758, the HEW-LTF(s) 1760 and/or the HEW-SIGB 1762. In an embodiment, the data unit 1750 also includes a data portion 1616 (not shown in FIG. 17B). In some embodiments, the HEW signal fields (HEW-SIGAs) 1752 are modulated using a same multiple access mode as the data field 1616.

In an embodiment, one or more symbols of the HEW-SIGAs 1752 is modulated using QBPSK instead of BPSK, for example, to allow autodetection between the regular mode and the multiple access mode by the receiving device that operates according to the HEW communication protocol. In an embodiment, for example, where the regular mode preamble includes two BPSK symbols and one Q-BPSK symbol after the L-SIG 1606 field, the multiple access mode preamble includes three BPSK symbols and one Q-BPSK symbol after the L-SIG 1606 field. In some embodiments, for example, where autodetection differentiates the regular mode from the multiple access mode, some bits are omitted from the HEW-SIGAs 1752, such as bits used to indicate signal bandwidth, MCS value, or other suitable bits.

In one embodiment in which the preamble 1751 includes one or more secondary L-SIG(s) 1754, the content of each of the L-SIG(s) 1754 is the same as the content of the L-SIG 1606 of the data unit 1750. In an embodiment, a receiving device receiving the data unit 1750 determines that the preamble 1751 corresponds to a multiple access mode preamble by detecting the repetition(s) of the L-SIG fields 1606, 1754. Further, in an embodiment, both a rate subfield and a length subfield of the L-SIG 1606, and, accordingly, the rate subfield(s) and the length subfield(s) of the secondary L-SIG(s) 1754 are set to fixed (e.g., predetermined) values. In this case, upon detecting the repetition(s) of the L-SIG fields 1606, 1754, the receiving device uses the fixed values in the repeating L-SIG fields as additional training information to improve channel estimation, in an embodiment. In some embodiments, however, at least the length subfield of the L-SIG 1606, and accordingly at least the length fields of the secondary L-SIG(s) 1754, is not set to a fixed value. For example, the length field is instead set to a value determined based on the actual length of the data unit 1750, in an embodiment. In one such embodiment, the receiving device first decodes the L-SIG 1606, and then detects the repetition(s) of the L-SIG fields 1606, 1754 using the value of the length subfield in L-SIG 1606. In another embodiment, the receiving device first detects the repetition(s) of the L-SIG fields 1606, 1754, and then combines the detected multiple L-SIG fields 1606, 1754 to improve decoding reliability of the L-SIG fields 1606, 1754 and/or uses the redundant information in the multiple L-SIG fields 1606, 1754 to improve channel estimation.

In an embodiment in which the preamble 1751 includes L-LTF2 1756, the OFDM symbol(s) of the L-LTF2 1756 are generated using the multiple access mode. In another embodiment in which the preamble 1751 includes L-LTF2 1756, the OFDM symbol(s) of the L-LTF2 1756 are generated using the regular mode. For example, if a double guard interval (DGI) used in the L-LTF 1605 is sufficiently long for the communication channel in which the data unit 1750 travels from the transmitting device to the receiving device, then OFDM symbols of the L-LTF2 1756 are generated using the regular mode or, alternatively, the preamble 1751 omits the L-LTF2 1756, in an embodiment.

Figure 18A:
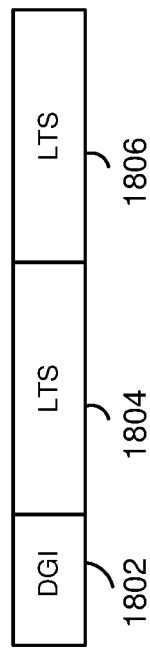
FIGS. 18A-18B are diagrams respectively illustrating two possible formats of a long training field, according to two example embodiments.
Figure 18B:
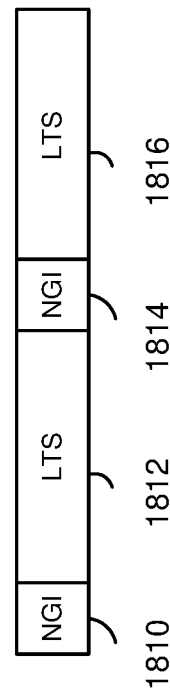

In another embodiment, the preamble 1751 omits the secondary L-SIG(s) 1754, but includes the L-LTF2 1756. In this embodiment, a receiving device detects that the preamble 1751 is the multiple access mode preamble by detecting the presence of the L-LTF2 1756. FIGS. 18A-18B are diagrams illustrating two possible formats of LTFs suitable for use as the L-LTF2 1756 according to two example embodiments. Turning first to FIG. 18A, in a first example embodiment, an L-LTF2 1800 is formatted in the same manner as the L-LTF 1605, i.e., as defined by a legacy communication protocol (e.g., the IEEE 802.11a/n/ac Standards). In particular, in the illustrated embodiment, the L-LTF2 1800 includes a double guard interval (DGI) 1802 followed by two repetitions of a long training sequence 1804, 1806. Turning now to FIG. 18B, in another example embodiment, an L-LTF2 1808 is formatted differently from the L-LTF 1605. In particular, in the illustrated embodiment, the L-LTF2 1808 includes a first normal guard interval 1810, a first repetition of a long training sequence 1812, a second normal guard interval 1814, and a second repetition of the long training sequence 1816.

Referring back to FIG. 17B, in an embodiment, the HEW-SIGA(s) 1752 are generated using the multiple access mode. In an embodiment, the number of the HEW-SIGAs 1752 is the same as the number of the HEW-SIGA(s) 1708 of the regular mode preamble 1701. Similarly, in an embodiment, the content of the HEW-SIGAs 1752 is the same as the content of the HEW-SIGA(s) 1708 of the regular mode preamble 1701. In other embodiments, the number and/or the content of the HEW-SIGAs 1752 is different from the number and/or content of the HEW-SIGA(s) 1708 of the regular mode preamble 1701. A device receiving the data unit 1750 decodes the HEW-SIGA(s) 1752 using the multiple access mode based on detecting that the preamble 1751 corresponds to the multiple access mode preamble and interprets the HEW-SIGA(s) 1752 appropriately as defined for the multiple access mode, in an embodiment.

In an embodiment in which the preamble 1751 omits the L-SIG(s) 1754 and/or L-LTF2 1756, a receiving device determines whether a preamble corresponds to the multiple access mode preamble 1751 or to the normal mode preamble 1701 by detecting whether the HEW-SIGA field in the preamble is generated using the multiple access mode or the regular mode based on auto-correlation of the HEW-SIGA field using the multiple access mode and the regular mode. FIGS. 19A-19B are diagrams of the HEW-SIGA 1708 of the regular mode preamble 1701 and the HEW-SIGA 1752 of the multiple access mode preamble 1751, respectively, according to an embodiment. In the illustrated embodiment, the HEW-SIGA 1708 of the regular mode preamble 1701 includes a first NGI 1902, a first HEW-SIGA field 1904, a second NGI 1906, and a second HEW-SIGA field 1908. On the other hand, the HEW-SIGA 1752 of the multiple access mode preamble 1751 includes a first LGI 1910, a first HEW-SIGA field 1912, a second LGI 1914, and a second HEW-SIGA field 1916. In an embodiment, a receiving device performs a first auto-correlation of the HEW-SIGA field using a normal guard interval structure, such as the structure illustrated in FIG. 19A, performs a second auto-correlation using a long guard interval structure, such as the structure illustrated in FIG. 19B, and performs a comparison of the auto-correlation results. If auto-correlation of the HEW-SIGA field using the long guard interval produces a greater result compared to the result of the auto-correlation of the HEW-SIGA field using the normal guard interval, then the receiving device determines that the preamble corresponds to the multiple access mode preamble 1751, in an embodiment. On the other hand, if auto-correlation of the HEW-SIGA field using the normal guard interval produces a greater result compared to the result of auto-correlation of the HEW-SIGA field with the long guard interval, then the receiving device determines that the preamble corresponds to the regular mode preamble 1701, in an embodiment.

Referring again to FIG. 17B, in an embodiment, the preamble 1751 is formatted such that a legacy client station can determine a duration of the data unit 1750 and/or that the data unit does not conform to a legacy communication protocol. Additionally, the preamble 1751 is formatted such that a client station that operates according to the HEW protocol is able to determine that the data unit conforms to the HEW communication protocol, in an embodiment. For example, at least two OFDM symbols immediately following the L-SIG 1606 of the preamble 1751, such as the L-SIG(s) 1754 and/or the L-LTF2 1756 and/or the HEW-SIGA(s) 1752, are modulated using BPSK modulation. In this case, a legacy client station will treat the data unit 1750 as a legacy data unit, will determine a duration of the data unit based on the L-SIG 1606, and will refrain from accessing the medium for the determined duration, in an embodiment. Further, one or more other OFDM symbols of the preamble 1751, such as one or more of the HEW-SIG(s) 1752 are modulated using Q-BPSK modulation, allowing a client station operating according to the HEW communication protocol to detect that the data unit 1750 conforms to the HEW communication protocol, in an embodiment.

In some embodiments, the HEW communication protocol allows beamforming and/or multi user MIMO (MU-MIMO) transmission. With continued reference to FIG. 17B, in an embodiment in which the preamble 1751 includes the HEW-STF 1758 and the HEW-LTF(s) 1760, the AP 14 applies beamforming and/or multi-user transmission beginning with the HEW-STF 1758. In other words, the fields of the preamble 1751 precede the HEW-STF 1758 are omni-directional and, in multi-user mode, are intended to be received by all intended recipients of the data unit 1750, while the HEW-STF field 1758, as well as the preamble fields that follow the HEW-STF field 1758 and the data portion that follows the preamble 1751, are beam-formed and/or include different portions intended to be received by different intended recipients of the data unit 1750, in an embodiment. In an embodiment, the HEW-SIGB field 1762 includes user-specific information for the intended recipients of the data unit 1750 in MU-MIMO mode. The HEW-SIGB field 1762 is generated using the regular mode or the multiple access mode, depending on an embodiment. Similarly, the HEW-STF 1758 is generated using the regular mode or the multiple access mode, depending on an embodiment. In an embodiment, the training sequence used on the HEW-STF 1758 is the sequence defined in a legacy communication protocol, such as in the IEEE 802.11ac protocol.

In some embodiments, a receiver device uses the HEW-STF field 1758 to re-start an automatic gain control (AGC) process for receiving the data portion 716. The HEW-STF has a same duration as the VHT-STF (i.e., 4 microseconds), in an embodiment. In other embodiments, the HEW-STF has a longer duration than the VHT-STF. In an embodiment, the HEW-STF has a same time-domain periodicity as the VHT-STF, such that in the frequency domain there are one non-zero tones every 4 tones and using a same tone spacing as IEEE 802.11ac. In other embodiments having a 1/N tone spacing, the HEW-STF has one non-zero tone in every 4*N tones. In embodiments where the overall bandwidth for the data unit is greater than 20 MHz, (e.g., 40 MHz, 80 MHz, etc.), the HEW-STF uses the same wider bandwidth VHT-STF as in IEEE 802.11ac (i.e., a duplication of the 20 MHz VHT-STF for overall bandwidth of 40 MHz, 80 MHz, 160 MHz, etc.).

Figures 20A, 20B, 20C:
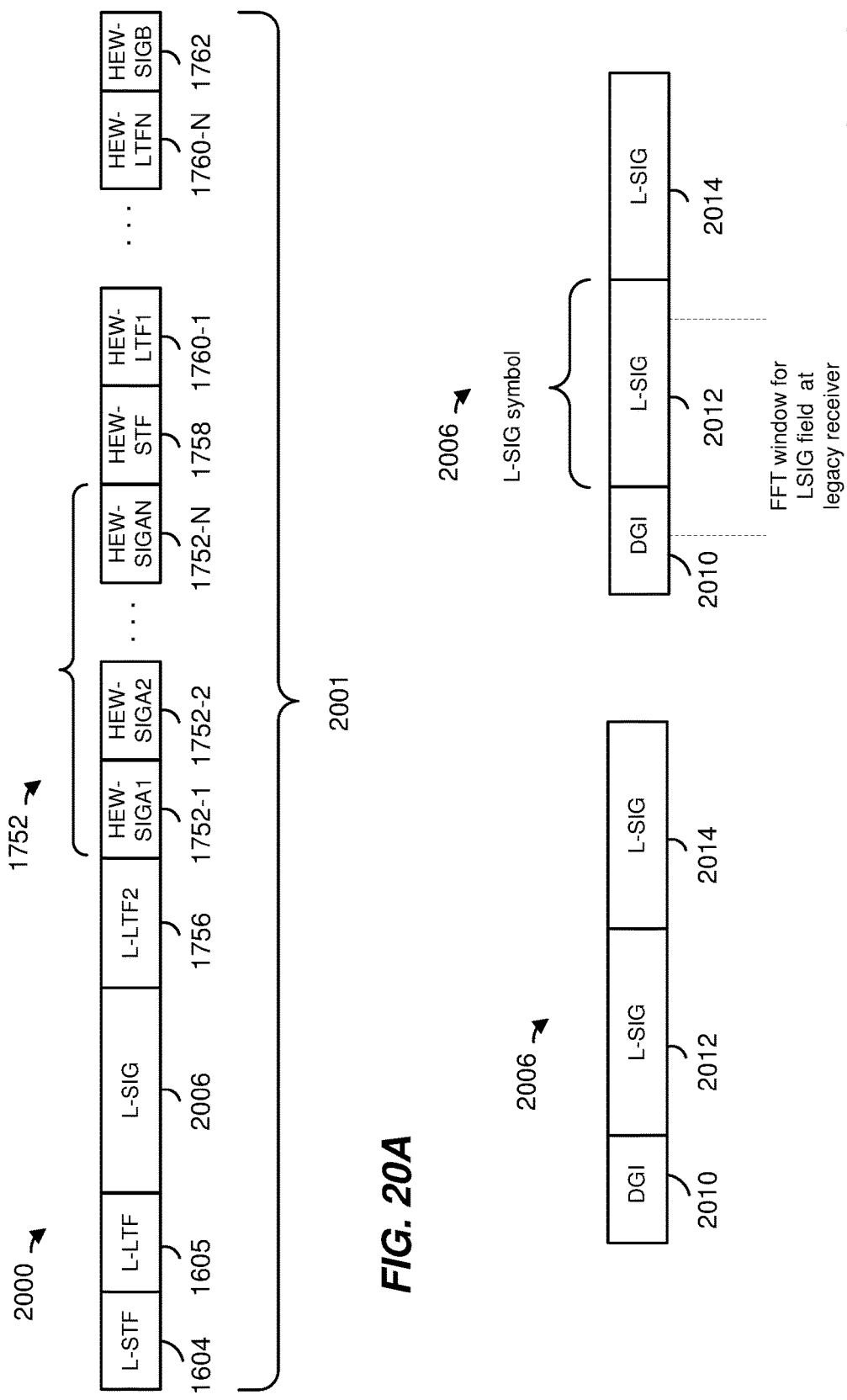
FIG. 20A is a block diagram illustrating a multiple access mode data unit, according to an embodiment.
FIG. 20B is a diagram illustrating a legacy signal field of the multiple access mode data unit of FIG. 20A, according to one embodiment.
FIG. 20C is a diagram illustrating a Fast Fourier Transform (FFT) window for the legacy signal field of FIG. 14B at the legacy receiving device, according to an embodiment.

FIG. 20A is a block diagram illustrating a multiple access mode data unit 2000, according to an embodiment. The data unit 2000 includes a multiple access mode preamble 2001. The multiple access mode preamble 2001 is generally similar to the multiple access mode preamble 1751 of FIG. 17B, except that the L-SIG 1606 and the secondary L-SIG 1754 of the preamble 1751 are combined into a single L-SIG field 2006 in the preamble 2001. FIG. 20B is a diagram illustrating the L-SIG field 2006 according to one embodiment. In the embodiment of FIG. 20B, the L-SIG field 2006 includes a double guard interval 2010, a first L-SIG field 2012, which includes contents of L-SIG field 1606 of the preamble 1751, and a second L-SIG field 2014, which includes contents of the secondary L-SIG2 field 1754 of the preamble 1751. In various embodiments, L-SIG field 2006 includes a length subfield set to a fixed value or set to a variable value, as discussed above with respect to the L-SIG fields 1606, 1754 of FIG. 17B. In various embodiments, redundant (repeated) bits in L-SIG field 2006 are used for improved channel estimation as discussed above with respect to L-SIG fields 1606, 1754 of FIG. 17B.

In an embodiment, a legacy client station receiving the data unit 2000 assumes that the L-SIG field 2006 includes a normal guard interval. As illustrated in FIG. 20C, the FFT window for L-SIG information bits assumed at the legacy client station is shifted compared to the actual L-SIG field 2012, in this embodiment. In an embodiment, to ensure that constellation points within the FFT window correspond to BPSK modulation, as expected by the legacy client station, and thus to allow the legacy client station to properly decode the L-SIG field 2012, modulation of the L-SIG field 2012 is phase-shifted relative to regular BPSK modulation. For example, in a 20 MHz OFDM symbol, if the normal guard interval is 0.8 µs, and the double guard interval is 1.6 µs, then modulation of an OFDM tone k of the L-SIG field 2012 is shifted with respect to the corresponding OFDM tone k of the original L-SIG as can be seen from:

$$S_{LSIG}^{(k)} = S_{SLSIG\text{-}LSIG}^{(k)} e^{-j \cdot 2\pi \cdot 0.8 \cdot 20/64} = S_{SLSIG\text{-}LSIG}^{(k)}.$$
$$(-j)$$
(Equation 1)

Accordingly, in an embodiment, L-SIG field 2012 is modulated using reverse Q-BPSK rather than regular BPSK. Thus, for example, a bit of value 1 is modulated onto −j, and a bit of value 0 is modulated onto j, resulting in {j, −j} modulation rather than the regular {1, −1} BPSK modulation, in an embodiment. In an embodiment, due to the reverse Q-BPSK modulation of the L-SIG field 2012, a legacy client station can properly decode the L-SIG field 2012 and determine the duration of the data unit 2000 based on the L-SIG 2012 field, in an embodiment. A client station that operates according to the HEW protocol, on the other hand, can auto-detect that the preamble 2001 is a multiple access mode preamble by detecting the repetition of the L-SIG field 2012 or by detecting the reverse Q-BPSK modulation of the L-SIG field within the FFT window of the legacy client station, in an embodiment. Alternatively, in other embodiments, a client station that operates according to the HEW protocol detects that the preamble 2001 is a multiple access mode preamble using other detection methods discussed above, such as based on modulation or format of the HEW-SIGA field(s) 1752.

Referring FIGS. 17A-17B and 20A, long guard interval is used for initial OFDM symbols of both a regular mode preamble (e.g., the preamble 1701) and a multiple access mode preamble (e.g., the preamble 1751 or the preamble 2001), in some embodiments. For example, referring to FIGS. 17A-17B, the L-STF field 1604, the L-LTF field 1605 and the L-SIG field 1606, 1754, and HEW-SIGA field 1752 is each generated using the long guard interval, in an embodiment. Similarly, referring to FIG. 20A, the L-STF field 1604, the L-LTF field 1605, the L-SIG field 2006, and the HEW-SIGA(s) 1752 are generated using the long guard interval, in an embodiment. In an embodiment, a receiving device can determine whether a preamble corresponds to the regular mode preamble or the multiple access mode preamble based on modulation of the HEW-SIGA field 1752 (e.g., Q-BPSK) or based on an indication included in the HEW-SIGA field 1752, in various embodiments. Further, similar to the preamble 1751 of FIG. 17B, the preamble 2001 of FIG. 20A includes or omits the second L-LTF2 field 1756, depending on the embodiment and/or scenario.

Figure 21:
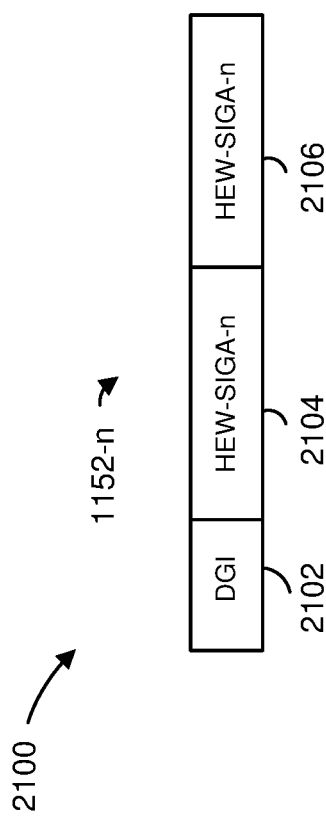
FIG. 21 is a block diagram illustrating format of a non-legacy signal field, according to an embodiment.

FIG. 21 is a block diagram illustrating a format of an HEW-SIGA field 2100, according to an embodiment. In some embodiments, the HEW-SIGA field(s) 1752 of the data unit 1750 or the data unit 2000 are formatted as the HEW-SIGA field 2100. In some embodiments, the HEW-SIGA field(s) 1708 are formatted as the HEW-SIGA field 2100. The HEW-SIGA field 2100 includes a double guard interval 2102, a first repetition of a HEW-SIGA field 2104 and a second repetition of a HEW-SIGA field 2106. In an example embodiment, the DGI is 1.8 µs and each repetition of HEW-SIGA is 3.2 µs. In an embodiment, the repeated bits in the HEW-SIGA field 2100 are used to increase reliability of decoding of the HEW-SIGA field 2100. In an embodiment, the format of the HEW-SIGA field 2100 is used to auto-detect a multiple access mode preamble based on a comparison between auto-correlation of the HEW-SIGA field of the preamble using the format of the HEW-SIGA field 2100 and auto-correlation of the HEW-SIGA field of the preamble using the regular HEW-SIGA field format used in the regular mode.

Figure 22:
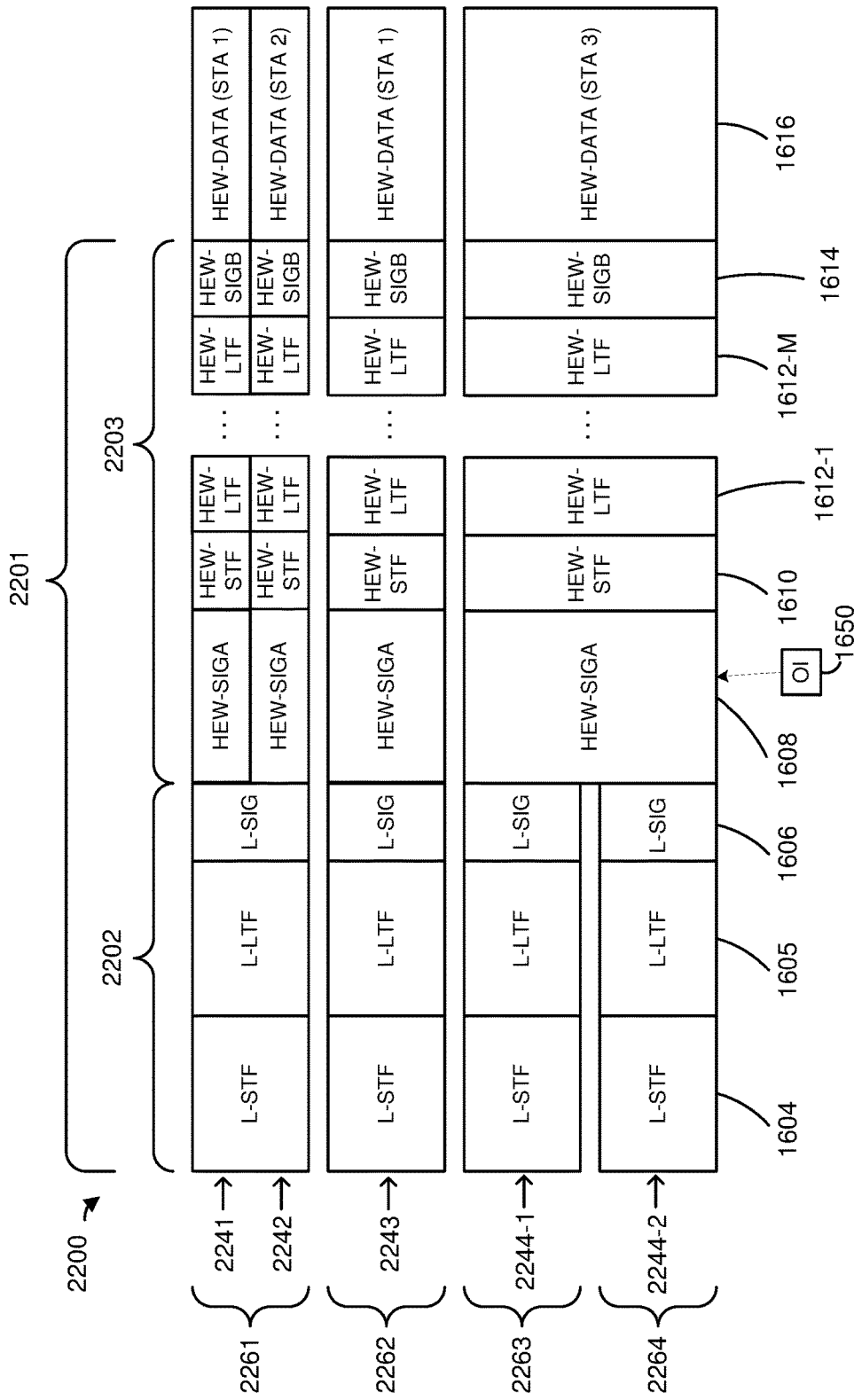
FIG. 22 is a block diagram of an example downlink OFDMA data unit, according to another embodiment.

FIG. 22 is a block diagram of an example downlink OFDMA data unit 2200, according to another embodiment. In FIG. 22, an 80 MHz communication channel is partitioned into four contiguous OFDM tone blocks 2241, 2242, 2243, and 2244, according to an embodiment. The OFDM tone block 2241 and OFDM tone block 2242 are adjacent and each have a bandwidth of 10 MHz, thus together the OFDM tone block 2241 and OFDM tone block 2242 span a bandwidth equal to a smallest channel bandwidth of a legacy WLAN communication protocol (i.e., a legacy tone block of 20 MHz). The OFDM tone block 2243 has a bandwidth of 20 MHz. The OFDM tone block 2244 spans a bandwidth of 40 MHz. The OFDM tone blocks 2242 and 2244 are assigned to, and include independent data streams for, two client stations STA 2 and STA 3, respectively. The OFDM tone blocks 2241 and 2243, which are separated in frequency by the OFDM tone block 2242, are assigned to and include portions of a data stream for client station STA 1 and use a channel bonding technique, as described herein.

The OFDMA data unit 2200, and thus each OFDM data unit 2241, 2242, 2243, and 2244, includes a preamble portion 2201 and a data portion 1616 (e.g., a data field for the corresponding client station), in an embodiment. In other embodiments, at least some of the OFDM data units omit the data portion 1616. The preamble portion 2201 of each OFDM data unit includes at least a legacy portion 2202 and a non-legacy portion 2203, in an embodiment. The legacy portion 2202 and non-legacy portion 2203 are generally the same as the legacy portion 1602 and non-legacy portion 1603, respectively, of the OFDM data units 1640 of FIG. 16.

In an embodiment, each 20 MHz sub-band (i.e., a legacy tone block) of the communication channel includes a legacy portion 2202 having an L-STF 1604, L-LTF 1605, and L-SIG 1606 such that a legacy client station can properly decode the L-SIG field 1606 for the 20 MHz sub-band. In the embodiment of FIG. 22, a first legacy tone block 2261 spans the OFDM tone blocks 2241 and 2242, a second legacy tone block 2262 spans the OFDM tone block 2243, a third legacy tone block 2263 spans a portion 2244-1 of the OFDM tone block 2244, and a fourth legacy tone block 2264 spans a portion 2244-2 of the OFDM tone block 2244. In an embodiment, the legacy portion 2202 of the OFDM data units 2241 and 2242 span a same 20 MHz sub-band (i.e., the legacy tone block 2261) and thus overlap in frequency. In this embodiment, the OFDM data units 2241 and 2242 use a same legacy portion 2202.

The L-SIG field 1606 corresponding to each legacy tone block 2261, 2262, 2263, and 2264 indicates a duration for OFDM data units within the respective legacy tone block, in an embodiment. In some embodiments, the L-SIG fields 1606 corresponding to each legacy tone block of the OFDMA data unit 2200 have identical values, for example, where the corresponding OFDM data units have a same duration (e.g., due to OFDM symbol padding). In other embodiments, the L-SIG fields 1606 of the legacy tone blocks have at least some different values. In an embodiment where channel bonding is used and a client station is assigned multiple OFDM tone blocks, the L-SIG fields corresponding to different 20 MHz sub-bands that contain the OFDM tone blocks assigned to the same client station have a same L-LENGTH value such that each L-LENGTH value decoded by the client station indicates a same packet duration. For example, in the embodiment of FIG. 22, an L-LENGTH value of the L-SIG field 1606 of OFDM data units 2241 and 2243 indicate a same value.

In some embodiments, at least the legacy portion 2202 of the legacy tone blocks 2261, 2262, 2263, and 2264 is modulated using a legacy tone plan. In an embodiment, the non-legacy portion 2203 and data portion 1616 of at least one OFDM tone block of the OFDMA data unit 2200 are modulated using a non-legacy tone plan (i.e., a tone plan different from the legacy tone plan). For example, in an embodiment, the non-legacy portion 2203 and data portion 1616 corresponding to an OFDM tone block that spans a bandwidth smaller than 20 MHz is modulated using a non-legacy tone plan. In the embodiment of FIG. 22, the OFDM tone block 2241 and the OFDM tone block 2242 each span a bandwidth of 10 MHz and thus the corresponding non-legacy portions 2203 and data portions 1616 are modulated using a non-legacy tone plan, such as the tone plan 800 described with respect to FIG. 8. In other embodiments, the legacy portion 2202 and non-legacy portion 2203 are modulated using the legacy tone plan while the data portion 1616 is modulated using the non-legacy tone plan. In an embodiment, at least some OFDM symbols of the HEW-SIGA field 1608 of the non-legacy portion 2203 are modulated using the legacy tone plan and thus the HEW-SIGA field 1608 is shared by the OFDM data units corresponding to the OFDM tone blocks 2241 and 2242.

Figure 23:
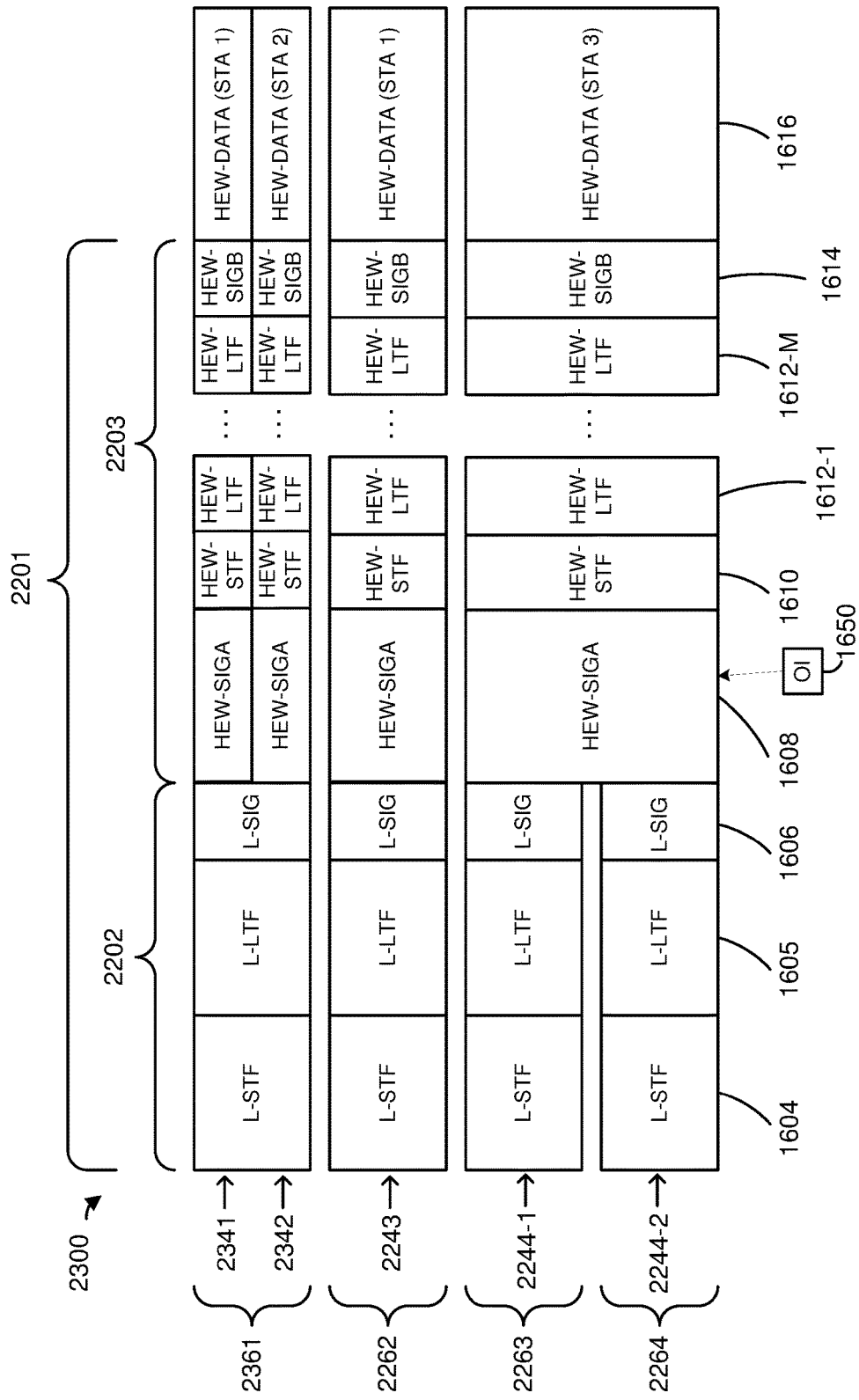
FIG. 23 is a block diagram of an example downlink OFDMA data unit using reduced tone spacing, according to an embodiment.

FIG. 23 is a block diagram of an example downlink OFDMA data unit 2300 using reduced tone spacing, according to an embodiment. The tone spacing is a spacing between sub-carrier frequencies of the OFDM tone block. The OFDMA data unit 2300 is generally the same as the OFDMA data unit 2200, however at least some OFDM tone blocks use a reduced tone spacing for at least a portion of the corresponding OFDM data unit, in an embodiment. In the embodiment of FIG. 23, a first OFDM tone block 2341 and a second OFDM tone block 2342 (in place of the OFDM tone block 2241 and OFDM tone block 2242) use a reduced tone spacing. In other embodiments, the OFDMA data unit 2300 uses a reduced tone spacing for each OFDM tone block for at least a portion of the OFDMA data unit 2300.

In the embodiment of FIG. 23, a first legacy tone block 2361 spans the OFDM tone block 2341 and the OFDM tone block 2342. In some embodiments, at least the legacy portion 2202 of the legacy tone blocks 2361, 2362, 2263, and 2264 is modulated using a legacy tone spacing (i.e., a spacing of 312.5 kHz between tones), for example, according to IEEE 802.11ac. In an embodiment, the non-legacy portion 2203 and data portion 1616 of at least one OFDM tone block of the OFDMA data unit 2200 are modulated using a reduced tone spacing as compared to the legacy tone spacing. In an embodiment, at least some OFDM symbols of the non-legacy portion 2203, such as the HEW-SIGA field 1608 and/or HEW-STF 1610, are modulated using the legacy tone spacing and thus the HEW-SIGA field 1608 is shared by the OFDM data units corresponding to the OFDM tone block 2341 and the OFDM tone block 2242. In some embodiments, the OFDM data units corresponding to the OFDM tone block 2341 and 2342 use a non-legacy tone plan, as described above with respect to FIG. 22, in combination with the non-legacy tone spacing.

In some embodiments, for example, whereas the regular mode for a legacy tone block (i.e., 20 MHz) uses a 64-point discrete Fourier transform (DFT), resulting in 64 OFDM tones (e.g., tone indices −32 to +31), at least some OFDM tone blocks in the OFDMA data unit 2300 use a 128-point DFT for at least some OFDM symbols in the legacy tone block, resulting in 128 OFDM tones (e.g., indices −64 to +63) in the same bandwidth. In this case, tone spacing is reduced by a factor of two (½) compared to regular mode OFDM symbols while using a same tone plan. As another example, whereas the regular mode for a legacy tone block uses a 64-point discrete Fourier transform (DFT) resulting in 64 OFDM tones, the OFDMA data unit 2300 uses a 256-point DFT for at least some OFDM symbols in the legacy tone block resulting in 256 OFDM tones in the same bandwidth. In this case, tone spacing is reduced by a factor of four (¼) compared to the regular mode OFDM symbols. In such embodiments, long guard interval durations of, for example, 1.6 μs is used. However, the duration of the information portion of the multiple access mode OFDM symbol is increased (e.g., from 3.2 μs to 6.4 μs), and the percentage of the guard interval portion duration to the total OFDM symbols duration remains the same, in an embodiment. Thus, in this case, loss of efficiency due to a longer guard interval symbol is avoided, in at least some embodiments. In various embodiments, the term "long guard interval" as used herein encompasses an increased duration of a guard interval as well as a decreased OFDM tone spacing that effectively increases duration of the guard interval. In other embodiments, other multiples such as 4×, 8×, or other suitable values are used for reduced tone spacing.

In some embodiments, the OFDMA data unit 2300 uses the reduced tone spacing in combination with a range extension mode. In an embodiment, the range extension mode is used with communication channels characterized by relatively longer channel delay spreads (e.g., outdoor communication channels) or generally lower SNR values. In an embodiment, the range extension mode corresponds to a range extension coding scheme (e.g., block encoding, bit-wise replication, or symbol replication), a signal modulation scheme (e.g., phase shift keying or quadrature amplitude modulation), or both a range extension coding scheme and signal modulation scheme. The range extension mode is configured to increase a range and/or reduce a signal-to-noise (SNR) ratio, as compared to the second mode (e.g., a regular mode using a regular coding scheme), at which successful decoding of PHY data units conforming to the range extension mode is performed. In various embodiments, the range extension mode reduces a data rate of transmission as compared to the regular mode to achieve successful decoding with increased range and/or reduced SNR ratio.

The OFDMA data unit 2300 supports any of the regular mode, the multiple access mode, and the range extension mode, in some embodiments. In an embodiment, the OFDMA data unit 2300 supports any of the regular mode, the multiple access mode, the range extension mode, and the range extension mode in combination with the multiple access mode. In an embodiment, at least some modes supported by the OFDMA data unit 2300 are indicated to a receiving device by a mode indicator, such as the OFDMA indicator 1650 as described above with respect to FIG. 16. In another embodiment, at least some modes are indicated to the receiving device by a different format of the preamble portion 2201, as described above with respect to FIGS. 17A, 17B, 18A, 18B, 19A, 19B, 20A, 20B, 20C, or 21.

Figure 24:
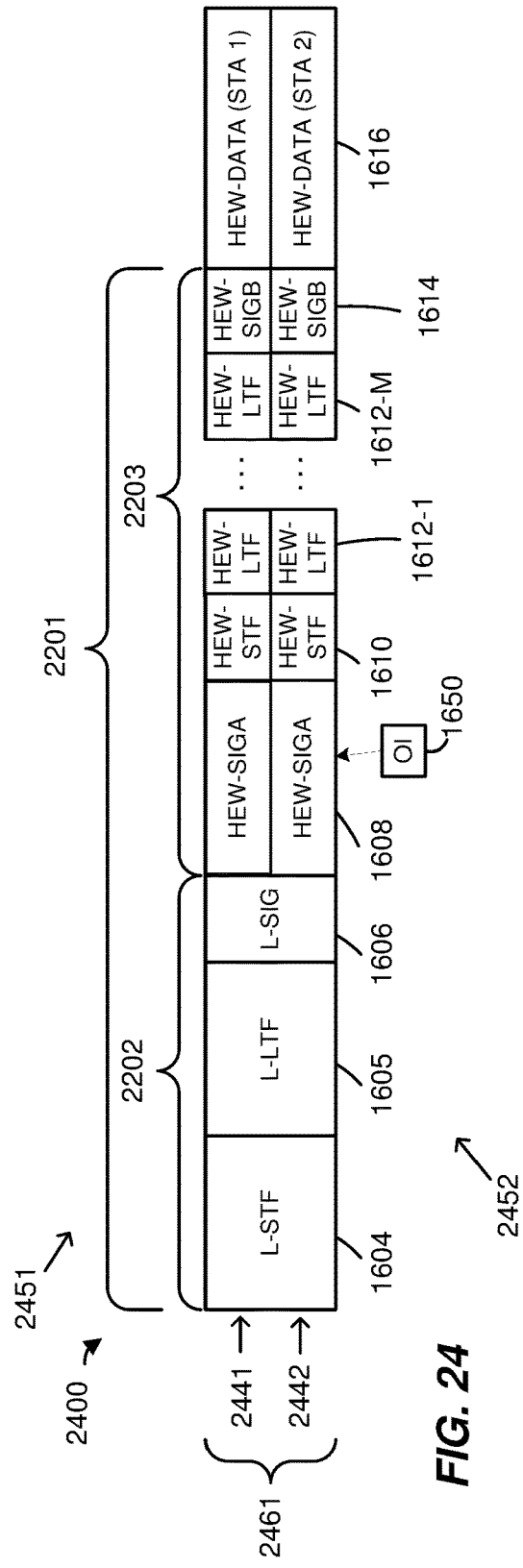
FIG. 24 is a block diagram of an example uplink OFDMA data unit, according to an embodiment.

FIG. 24 is a block diagram of an example uplink OFDMA data unit 2400, according to an embodiment. The OFDMA data unit 2400 is generally the same as the OFDMA data unit 2200, however a first portion 2451 of the OFDMA data unit 2400 is generated and transmitted by a first client station and a second portion 2452 of the OFDMA data unit 2400 is generated and transmitted by a second client station for receipt by an access point, in an embodiment. In some embodiments, the OFDMA indicator 1650 and/or other sub-fields within the HEW-SIGA field 1608 are omitted, for example, where the AP has already determined corresponding PHY parameters.

In the embodiment shown in FIG. 24, a communication channel spans a legacy tone block 2461 (i.e., 20 MHz) and is partitioned into two contiguous OFDM tone blocks 2441 and 2442, each spanning a sub-band of 10 MHz. The OFDM tone block 2441 is assigned (i.e., by the AP 14) to and includes portions of a data stream from a client station STA 1 (e.g., client 25-1) and the OFDM tone block 2442 is assigned to and includes portions of a data stream from a client station STA 2 (e.g., client 25-2), in an embodiment. For example, in an embodiment, the client 25-1 and client 25-2 are members of an OFDMA group, as described above with respect to FIG. 16. In other embodiments, the communication channel has a bandwidth of 40 MHz, 80 MHz, 160 MHz, or other suitable bandwidth and is partitioned for a suitable number of client stations, as described above with respect to FIG. 7A, 7B, 7C, 9A, 9B, 14A, or 14B.

In an embodiment, each client station of the OFDMA group determines a corresponding assigned OFDM tone block. In some embodiments, the client station determines the corresponding assigned OFDM tone block based on a sync frame received from the AP 14 that includes PHY parameters, such as an indication of which OFDM tone blocks are assigned to a particular client station. In an embodiment, each client station of the OFDMA group transmits the corresponding portion of the OFDMA data unit 2400 after a short interframe space (SIFS) following receipt of the sync frame.

FIG. 25A is a block diagram of an example uplink OFDM data unit portion, such as the first portion 2451 of the OFDMA data unit 2400. In some embodiments, the client station 25-1 includes a PHY processing unit, such as the PHY processing units 1000, 1100, 1200, 1300, 1500, and/or 1550 described above with respect to FIGS. 10, 11, 12, 13, 14A, 14B, 15A, and 15B, for generating and transmitting the first portion 2451 of the OFDMA data unit 2400. FIG. 25B is a block diagram of another example uplink OFDM data unit portion, such as the second portion 1452 of the OFDMA data unit 2400, according to an embodiment. In some embodiments, the client station 25-2 includes a PHY processing unit, such as the PHY processing units 1000, 1100, 1200, 1300, 1500, and/or 1550 described above with respect to FIGS. 10, 11, 12, 13, 14A, 14B, 15A, and 15B, for generating and transmitting the second portion 2452 of the OFDMA data unit 2400.

In some embodiments, the client station 25-1 generates the first portion 2451 for transmission on the communication channel using data tones and pilot tones within the first OFDM tone block 2441 and the client station 25-2 generates the second portion 2452 for transmission on the communication channel using data tones and pilot tones within the second OFDM tone block 2442. In an embodiment, the client station 25-1 generates and transmits the first portion 2451 using data tones and pilot tones within the first OFDM tone block 2441 and the second OFDM tone block 2442. For example, in an embodiment, the client station 25-1 generates and transmits the legacy portion 2402 using the first OFDM tone block 2441 and the second OFDM tone block 2442 and generates and transmits the non-legacy portion 2403 and the data portion 1616 using only the first OFDM tone block 2441. In an embodiment, the client station 25-2 generates and transmits the second portion 2452 using data tones and pilot tones within the first OFDM tone block 2441 and the second OFDM tone block 2442. For example, in an embodiment, the client station 25-2 generates and transmits the legacy portion 2402 using the first OFDM tone block 2441 and the second OFDM tone block 2442 and generates and transmits the non-legacy portion 2403 and the data portion 1616 using only the second OFDM tone block 2442.

Each of the first portion 2451 and second portion 2452 include a legacy portion 2402 that spans both the first OFDM tone block 2441 and the second OFDM tone block 2442 and thus overlap in frequency, in an embodiment. In an embodiment, the legacy portions 2402 of the first portion 2451 and the second portion 2452 are identical such that the AP 14 receives a substantially same signal when the client station 25-1 and client station 25-2 transmit the respective legacy portions 2402. The non-legacy preamble 2403 and data portion 1616 of the first portion 1451 span only the first OFDM tone block 2441 and the non-legacy preamble 2403 and data portion 1616 of the second portion 1452 span only the second OFDM tone block 2442 and thus do not overlap in frequency, in an embodiment.

In an embodiment, the client station 25-1 is configured to transmit the legacy portion 2402, the non-legacy portion 2403, and the data portion 1616 with a same per-tone transmission power. In one such embodiment, a total power of the legacy portion 2402 is approximately two times a total power of the non-legacy portion 2403 and the data portion 1616. In some embodiments, the client station 25-1 is configured to transmit the legacy portion 2402, the non-legacy portion 2403, and the data portion 1616 with a same total transmission power. In one such embodiment, the per-tone power of the non-legacy portion 2403 and the data portion 1616 is approximately two times the per-tone power of the legacy portion 2402 (i.e., due to using half as many tones). In this embodiment, the AP 14 (or other suitable receiving device) compensates for the difference in per-tone power before demodulation of the OFDMA data unit 2400, for example, where L-LTF based channel estimation is used to demodulate an amplitude modulated signal (i.e., a greenfield transmission that omits a HEW-LTF field).

Figure 26A:
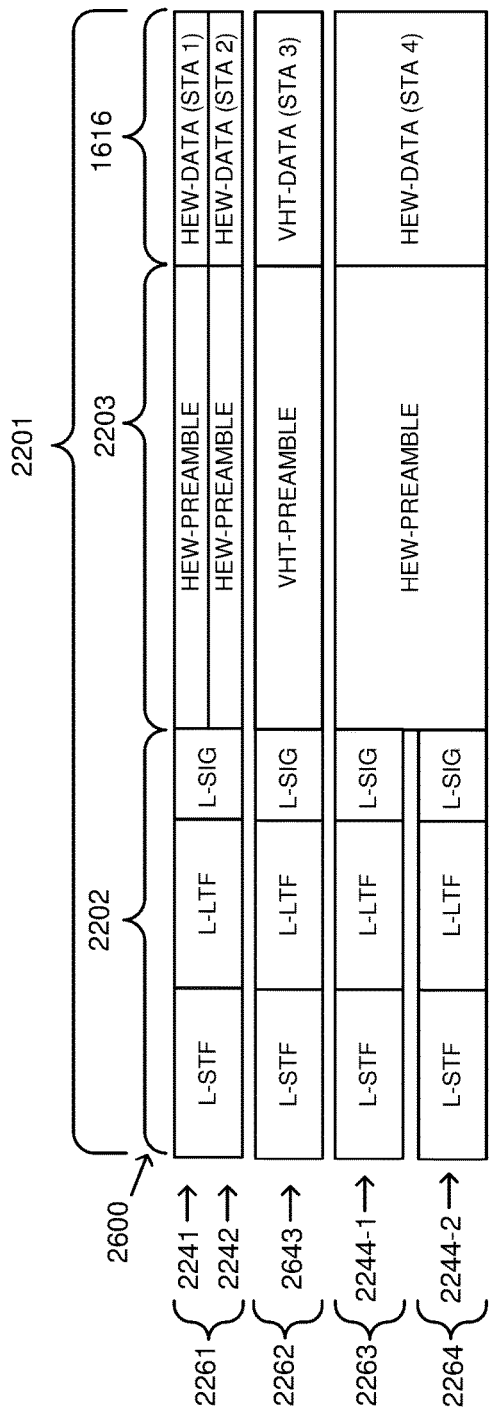
FIG. 26A is a block diagram of an example OFDMA data unit that includes a legacy OFDM signal, according to an embodiment.

FIG. 26A is a block diagram of an example OFDMA data unit 2600 that includes a legacy data unit 2643, according to an embodiment. The OFDMA data unit 2600 is generally the same as the OFDMA data unit 2200, however the OFDM tone block 2262 corresponds to the legacy OFDM data unit 2643 instead of the OFDM data unit 2243, in an embodiment. For clarity, the non-legacy portion 2203 is shown as a single preamble portion. The legacy OFDM data unit 2643 substantially conforms to a legacy communication protocol, such as IEEE 802.11ac, in an embodiment. In some embodiments, the data portion 1616 includes padding OFDM symbols such that the legacy OFDM data unit 2643 has a same number of OFDM symbols as the OFDM data units 2241, 2242, and 2244.

Figure 26B:
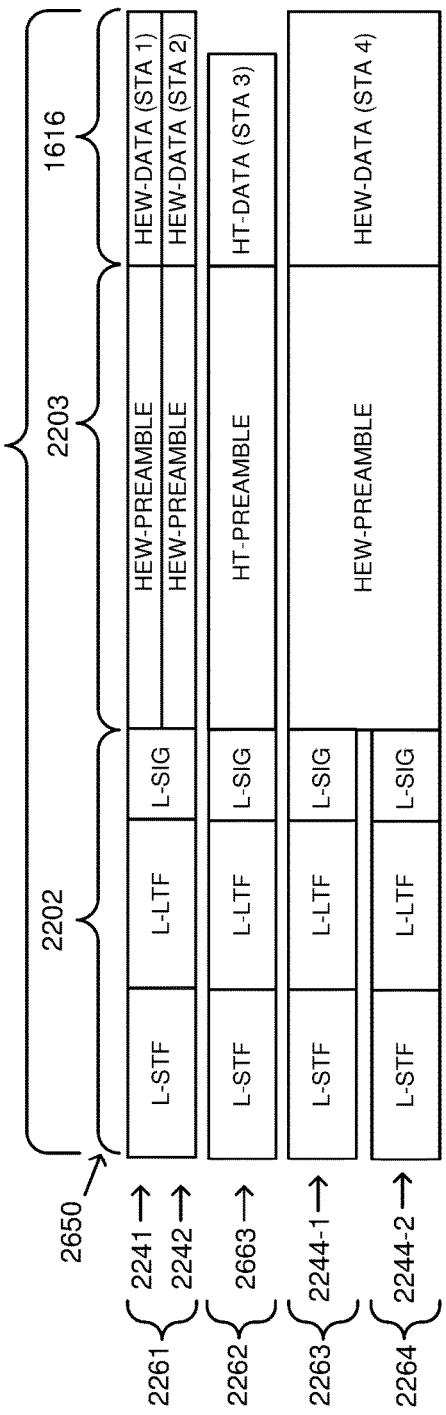
FIG. 26B is a block diagram of an example OFDMA data unit that includes a legacy OFDM signal, according to another embodiment.

FIG. 26B is a block diagram of an example OFDMA data unit 2650 that includes a legacy data unit 2663, according to another embodiment. The OFDMA data unit 2650 is generally the same as the OFDMA data unit 2200, however the OFDM tone block 2262 corresponds to the legacy OFDM data unit 2663 instead of the OFDM data unit 2243, in an embodiment. For clarity, the non-legacy portion 2203 is shown as a single preamble portion. The legacy OFDM data unit 2663 substantially conforms to a legacy communication protocol, such as IEEE 802.11a or IEEE 802.11n, in an embodiment. In some embodiments, the data portion 1616 does not include padding OFDM symbols because the legacy communication protocol does not support symbol padding.

FIGS. 27A, 27B, 27C, and 27D are example diagrams of short training sequences for OFDMA data units, according to various embodiments. In an embodiment, a short training sequence 2701 is a training sequence for a HEW-STF 1610 that spans a 20 MHz sub-band, such as the HEW-STF 1610 of OFDM data unit 2243. In an embodiment, a HEW-STF 1610 that spans a sub-band smaller than 20 MHz, such as the HEW-STFs 1610 corresponding to OFDM tone blocks 2441 and 2442 of FIG. 25A, uses only the corresponding tones of the short training sequence 2701 (i.e., the "upper" tones for the OFDM tone block 2441 and "lower" tone blocks for OFDM tone block 2442). In an embodiment, a short training sequence 2702 is a training sequence for a HEW-STF 1610 that spans a 40 MHz sub-band, such as the HEW-STF 1610 of OFDM data unit 2244. In an embodiment, a short training sequence 2703 is a training sequence for a HEW-STF 1610 that spans an 80 MHz sub-band. In an embodiment, a short training sequence 2704 is a training sequence for a HEW-STF 1610 that spans a 160 MHz sub-band.

Figure 28:
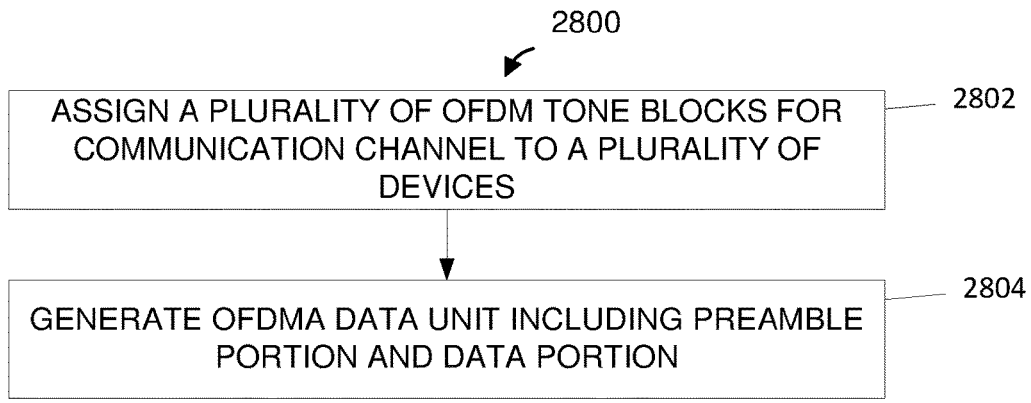
FIG. 28 is a flow diagram of an example method for generating an OFDMA data unit, according to an embodiment.

FIG. 28 is a flow diagram of an example method 2800 for generating an OFDMA data unit, according to an embodiment. With reference to FIG. 1, the method 2800 is implemented by the network interface 16, in an embodiment. For example, in one such embodiment, the PHY processing unit 20 is configured to implement the method 2800. According to another embodiment, the MAC processing 18 is also configured to implement at least a part of the method 2800.

With continued reference to FIG. 1, in yet another embodiment, the method 2800 is implemented by the network interface 27 (e.g., the PHY processing unit 29 and/or the MAC processing unit 28). In other embodiments, the method 2800 is implemented by other suitable network interfaces.

At block 2802, a plurality of different orthogonal frequency division multiplex (OFDM) tone blocks for a wireless local area network (WLAN) communication channel are assigned to a plurality of devices including a first device and second device. In an embodiment, the plurality of different OFDM tone blocks includes at least a first OFDM tone block assigned to the first device and a second OFDM tone block assigned to the second device. The second OFDM tone block is adjacent to the first OFDM tone block, in an embodiment. The first OFDM tone block and the second OFDM tone block together span a bandwidth equal to a smallest channel bandwidth of a legacy WLAN communication protocol, in an embodiment. As merely an illustrative example, in an embodiment, the first OFDM tone block and the second OFDM tone block together span 20 MHz. In some embodiments, the WLAN communication channel corresponds to the communication channels described above with respect to FIGS. 7A, 7B, 7C, or other suitable communication channels.

At block 2804, an orthogonal frequency division multiple access (OFDMA) data unit is generated for the WLAN communication channel. The OFDMA unit includes a preamble portion and a data portion, the preamble portion having i) at least a legacy portion that spans the entire WLAN communication channel, ii) a first non-legacy portion that spans the first OFDM tone block, and iii) a second non-legacy portion that spans the second OFDM tone block, in an embodiment. In some embodiments, the OFDMA data unit corresponds to the OFDMA data unit described above with respect to FIGS. 16, 17A, 17B, 20A, 22, 23, 24, 26A, 26B, or other suitable OFDMA data units.

In an embodiment, generating the OFDMA data unit includes generating i) a first OFDM data unit of the data portion using first data received for the first device and ii) a second OFDM data unit of the data portion using second data received for the second device. In this embodiment, generating the OFDMA data unit also includes modulating i) the first OFDM data unit on tones in the first OFDM tone block and ii) the second OFDM data unit on tones in the second OFDM tone block. In an embodiment, the first data is independent of the second data.

In an embodiment, modulating the first OFDM data unit and the second OFDM data unit includes modulating i) the first OFDM data unit on tones in the first OFDM tone block using a first tone plan and ii) the second OFDM data unit on tones in the second OFDM tone block using a second tone plan. In some embodiments, the legacy portion is modulated using a legacy tone plan that is different from at least the first tone plan (e.g., the tone plan 800 of FIG. 8). In an embodiment, one or more of the first non-legacy tone plan or the second non-legacy tone plan corresponds to a fast Fourier transform (FFT) width that is less than a FFT width of the WLAN communication channel. In some embodiments, generating the OFDMA data unit for the WLAN communication channel includes modulating the OFDMA data unit to span an entire bandwidth of the WLAN communication channel. In another embodiment, modulating the first OFDM data unit and the second OFDM data unit includes modulating i) the first OFDM data unit using a same bandwidth as the first OFDM tone block with an integer multiple of tones and corresponding reduced tone spacing and ii) the second OFDM data unit using a same bandwidth as the second OFDM tone block with the integer multiple of tones and corresponding reduced tone spacing.

In another embodiment, generating the first OFDM data unit and the second OFDM data unit includes generating first data tones using the first data and first pilot tones for the first OFDM tone block, separately generating second data tones using the second data and second pilot tones for the second OFDM tone block, and jointly performing an inverse fast Fourier transform (IFFT) on the first data tones, the first pilot tones, the second data tones, and the second pilot tones.

In yet another embodiment, generating the first OFDM data unit and the second OFDM data unit includes generating the second OFDM data unit to include at least one padding OFDM symbol such that the first OFDM data unit and the second OFDM data unit have a same number of OFDM symbols. In an embodiment, a number of padding OFDM symbols to be included in the second OFDM data unit is determined as a difference between a total number of OFDM symbols of the first OFDM data unit and a total number of OFDM symbols of the second OFDM data unit.

In an embodiment, generating the first OFDM data unit and the second OFDM data unit includes generating the second OFDM data unit to include at least one padding OFDM symbol such that a sum of a number of OFDM symbols in the first non-legacy portion and a number of OFDM symbols of the first OFDM data unit is equal to a sum of a number of OFDM symbols of the second non-legacy portion and a number of OFDM symbols of the second OFDM data unit.

In an embodiment, the first non-legacy portion and the second non-legacy portion comprise non-legacy signal fields having respective group identifier (ID) sub-fields that indicate whether the corresponding OFDM data units are any of i) a single user data unit, ii) a multi-user multiple-input multiple-output data unit to be decoded by an indicated device of the plurality of devices, or iii) a portion of the OFDMA data unit to be decoded by an indicated device of the plurality of devices.

In another embodiment, the first non-legacy portion and the second non-legacy portion include non-legacy signal fields having respective tone block allocation identifiers that indicate the assignment of the first OFDM tone block to the first device and the assignment of the second OFDM tone block to the second device.

Figure 29:
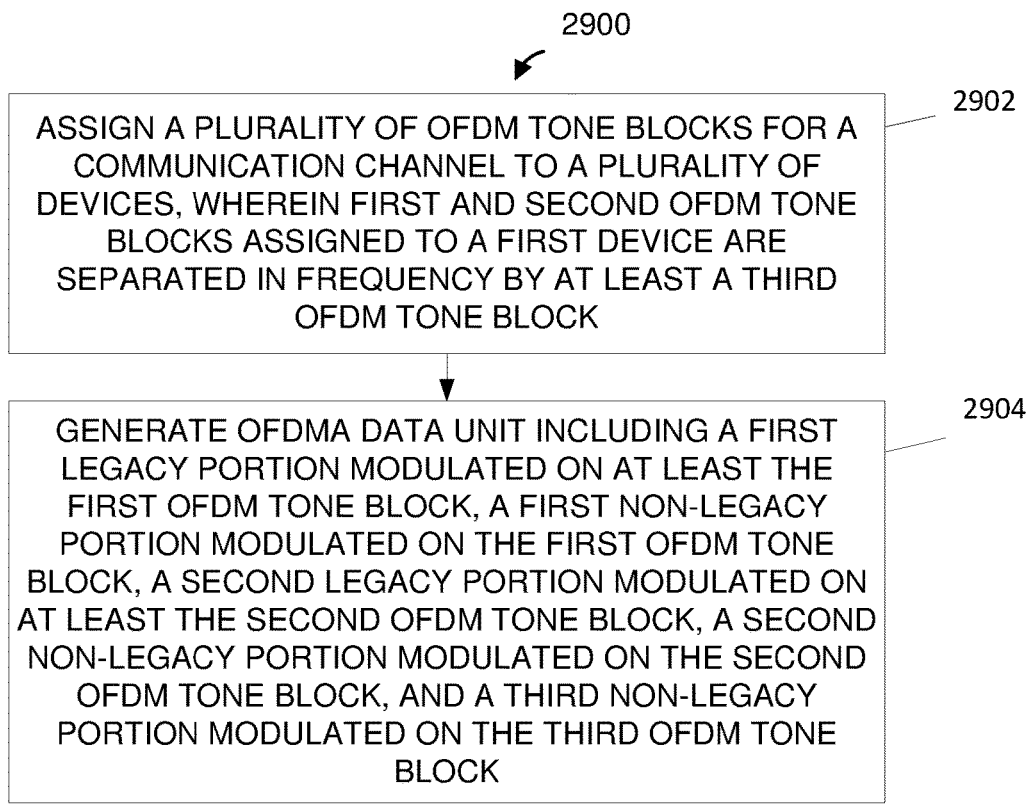
FIG. 29 is a flow diagram of an example method for generating an OFDMA data unit, according to another embodiment.

FIG. 29 is a flow diagram of an example method 2900 for generating an OFDMA data unit, according to another embodiment. With reference to FIG. 1, the method 2900 is implemented by the network interface 16, in an embodiment. For example, in one such embodiment, the PHY processing unit 20 is configured to implement the method 2900. According to another embodiment, the MAC processing 18 is also configured to implement at least a part of the method 2900. With continued reference to FIG. 1, in yet another embodiment, the method 2900 is implemented by the network interface 27 (e.g., the PHY processing unit 29 and/or the MAC processing unit 28). In other embodiments, the method 2900 is implemented by other suitable network interfaces.

At block 2902, a plurality of different orthogonal frequency division multiplex (OFDM) tone blocks for a wireless local area network (WLAN) communication channel are assigned to a plurality of devices including a first device and second device, in an embodiment. The plurality of different OFDM tone blocks includes at least a first OFDM tone block and a second OFDM tone block assigned to the first device and a third OFDM tone block assigned to the second device, in an embodiment. The first OFDM tone block and the second OFDM tone block are separated in frequency by at least the third OFDM tone block. In some embodiments, the WLAN communication channel corresponds to the communication channels described above with respect to FIGS. 7A, 7B, 7C, or other suitable communication channels.

At block 2904, an orthogonal frequency division multiple access (OFDMA) data unit is generated for the WLAN communication channel. The OFDMA unit includes a preamble portion and a data portion. In an embodiment, the preamble portion includes at least i) a first legacy portion that corresponds to at least the first OFDM tone block, ii) a second legacy portion that corresponds to the second OFDM tone block, iii) a first non-legacy portion that corresponds to the first OFDM tone block, iv) a second non-legacy portion that corresponds to the second OFDM tone block, and v) a third non-legacy portion that corresponds to the third OFDM tone block. In this embodiment, the first legacy portion is modulated on at least the first OFDM tone block, the first non-legacy portion is modulated on the first OFDM tone block, the second legacy portion is modulated on at least the second OFDM tone block, the second non-legacy portion is modulated on the second OFDM tone block, and the third non-legacy portion is modulated on the third OFDM tone block. In some embodiments, the OFDMA data unit corresponds to the OFDMA data unit described above with respect to FIGS. 16, 17A, 17B, 20A, 22, 23, 24, 26A, 26B, or other suitable OFDMA data units.

In an embodiment, the first OFDM tone block and the third OFDM tone block together span a bandwidth equal to a smallest channel bandwidth of a legacy WLAN communication protocol. In another embodiment, the first legacy portion is modulated on a legacy tone block corresponding to a smallest channel bandwidth of a legacy WLAN communication protocol. In this embodiment, the legacy tone block i) overlaps in frequency with the first OFDM tone block and ii) has a bandwidth larger than a bandwidth of the first OFDM tone block. In a further embodiment, the legacy tone block includes the first OFDM tone block assigned to the first device and the third OFDM tone block assigned to the second device. In this embodiment, the first legacy portion is modulated on at least the first OFDM tone block and the third OFDM tone block. In a further embodiment, the data portion includes a first OFDM data unit, for the first device, modulated on the first OFDM tone block and a second OFDM data unit, for the second device, modulated on the third OFDM tone block. In this embodiment, at least one of the first OFDM data unit and the second OFDM data unit includes padding such that a total length of the first non-legacy portion and the first OFDM data unit is equal to a total length of the third non-legacy portion and the second OFDM data unit.

In another embodiment, the data portion includes a first OFDM data unit, for the first device, modulated on the first OFDM tone block and a second OFDM data unit, for the first device, modulated on the second OFDM tone block. In this embodiment, the first legacy portion and the second legacy portion comprise legacy signal fields that indicate a same total duration for i) the first non-legacy portion and the first OFDM data unit and ii) the second non-legacy portion and the second OFDM data unit.

In yet another embodiment, the first OFDM tone block and the second OFDM tone block use a same modulation and coding scheme. In an embodiment, the first OFDM tone block uses a modulation and coding scheme (MCS) different from the second OFDM tone block. In a further embodiment, the first OFDM tone block and the second OFDM tone block use a same number of space-time streams. In another embodiment, the first OFDM tone block and the second OFDM tone block use different numbers of space-time streams.

In an embodiment, generating the OFDMA data unit for the WLAN communication channel includes encoding first data for the first OFDM tone block separately from second data for the second OFDM tone block. In another embodiment, generating the OFDMA data unit for the WLAN communication channel includes encoding and interleaving first data for the first OFDM tone block together with second data for the second OFDM tone block.

Figure 30:
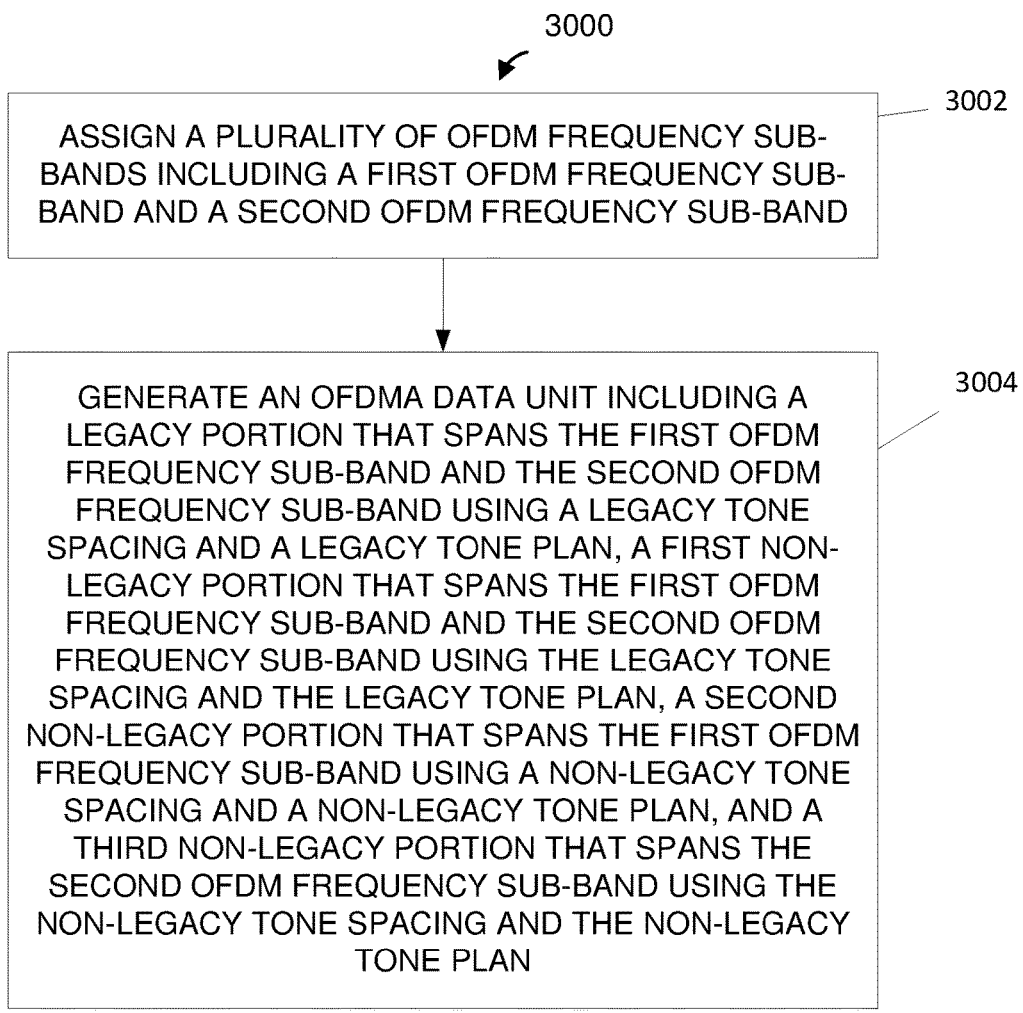
FIG. 30 is a flow diagram of an example method for generating an OFDMA data unit, according to an embodiment.

FIG. 30 is a flow diagram of an example method 3000 for generating an OFDMA data unit, according to an embodiment. With reference to FIG. 1, the method 3000 is implemented by the network interface 16, in an embodiment. For example, in one such embodiment, the PHY processing unit 20 is configured to implement the method 3000. According to another embodiment, the MAC processing 18 is also configured to implement at least a part of the method 3000. With continued reference to FIG. 1, in yet another embodiment, the method 3000 is implemented by the network interface 27 (e.g., the PHY processing unit 29 and/or the MAC processing unit 28). In other embodiments, the method 3000 is implemented by other suitable network interfaces.

At block 3002, a plurality of different orthogonal frequency division multiplex (OFDM) frequency sub-bands for a wireless local area network (WLAN) communication channel are assigned to a plurality of devices including a first device and second device. The plurality of different OFDM frequency sub-bands includes at least a first OFDM frequency sub-band assigned to the first device and a second OFDM frequency sub-band assigned to the second device. In some embodiments, the WLAN communication channel corresponds to the communication channels described above with respect to FIGS. 7A, 7B, 7C, or other suitable communication channels.

At block 3004, an orthogonal frequency division multiple access (OFDMA) data unit is generated for the WLAN communication channel. The OFDMA unit including a preamble portion and a data portion, the preamble portion including: a legacy portion that spans the first OFDM frequency sub-band and the second OFDM frequency sub-band using a legacy tone spacing and a legacy tone plan; a first non-legacy portion that spans the first OFDM frequency sub-band and the second OFDM frequency sub-band using the legacy tone spacing and the legacy tone plan; a second non-legacy portion that spans the first OFDM frequency sub-band using a non-legacy tone spacing and a non-legacy tone plan; and a third non-legacy portion that spans the second OFDM frequency sub-band using the non-legacy tone spacing and the non-legacy tone plan. In some embodiments, the OFDMA data unit corresponds to the OFDMA data unit described above with respect to FIGS. 16, 17A, 17B, 20A, 22, 23, 24, 26A, 26B, or other suitable OFDMA data units. In some embodiments, the legacy tone spacing is an integer multiple of the non-legacy tone spacing.

In an embodiment, generating the OFDMA data unit for the WLAN communication channel includes generating i) a first OFDM data unit of the data portion using first data received for the first device and ii) a second OFDM data unit of the data portion using second data received for the second device, wherein the first data is independent of the second data. In this embodiment, generating the OFDMA data unit further includes modulating i) the first OFDM data unit using the non-legacy tone plan of the first OFDM frequency sub-band and ii) the second OFDM data unit using the non-legacy tone plan of the second OFDM frequency sub-band.

Figure 31:
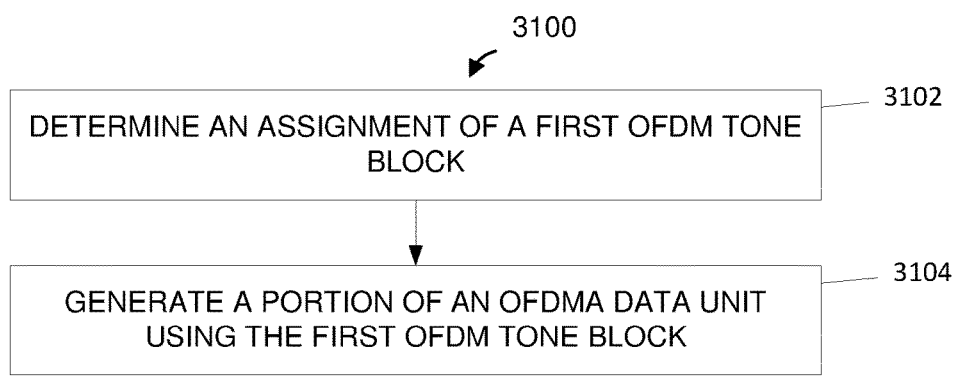
FIG. 31 is a flow diagram of an example method for generating a portion of an OFDMA data unit, according to an embodiment.

FIG. 31 is a flow diagram of an example method 3100 for generating a portion of an OFDMA data unit, according to an embodiment. With reference to FIG. 1, the method 3100 is implemented by the network interface 16, in an embodiment. For example, in one such embodiment, the PHY processing unit 20 is configured to implement the method 3100. According to another embodiment, the MAC processing 18 is also configured to implement at least a part of the method 3100. With continued reference to FIG. 1, in yet another embodiment, the method 3100 is implemented by the network interface 27 (e.g., the PHY processing unit 29 and/or the MAC processing unit 28). In other embodiments, the method 3100 is implemented by other suitable network interfaces.

At block 3102, an assignment of a first orthogonal frequency division multiplex (OFDM) tone block within a wireless local area network (WLAN) communication channel is determined. The first OFDM tone block has a bandwidth that is less than a smallest bandwidth of a legacy WLAN communication protocol, in an embodiment. In some embodiments, the WLAN communication channel corresponds to the communication channels described above with respect to FIGS. 9A, 9B, or other suitable communication channels.

At block 3104, a first communication device generates a first portion of an orthogonal frequency division multiple access (OFDMA) data unit for transmission on the WLAN communication channel using data tones and pilot tones within the first OFDM tone block. In some embodiments, the portion of the OFDMA data unit corresponds to the portion of the OFDMA data unit described above with respect to FIGS. 24, 25A, 25B, or another suitable OFDMA data unit.

In an embodiment, generating the first portion of the OFDMA data unit includes performing an inverse fast Fourier transform (IFFT) for the first portion of the OFDMA data unit with an FFT size equal to the first OFDM tone block.

In another embodiment, generating the first portion of the OFDMA data unit includes performing an IFFT for the first portion of the OFDMA data unit with an FFT size equal to the WLAN communication channel using zero values for data tones and pilot tones that are not within the first OFDM tone block.

In an embodiment, the first communication device transmits the first portion of the OFDMA data unit on the WLAN communication channel concurrently with a transmission of a second portion of the OFDMA data unit on the WLAN communication channel by a second communication device. In this embodiment, the second portion of the OFDMA data unit spans a second OFDM tone block within the WLAN communication channel. In a further example, the first communication device transmits a legacy portion of a preamble portion of the OFDMA data unit using the first OFDM tone block and the second OFDM tone block, concurrently with a transmission of the legacy portion of the preamble portion by the second communication device that uses the first OFDM tone block and the second OFDM tone block.

In an embodiment, transmitting the first portion of the OFDMA data unit includes transmitting, by the first communication device, a first OFDM data unit using only the first OFDM tone block, concurrently with a transmission of a second OFDM data unit using only the second OFDM tone block by the second communication device. In some embodiments, the legacy portion and the first OFDM data unit are transmitted by the first communication device with a same total power. In other embodiments, the legacy portion and the first OFDM data unit are transmitted by the first communication device with a same per-tone power.

Figure 32:
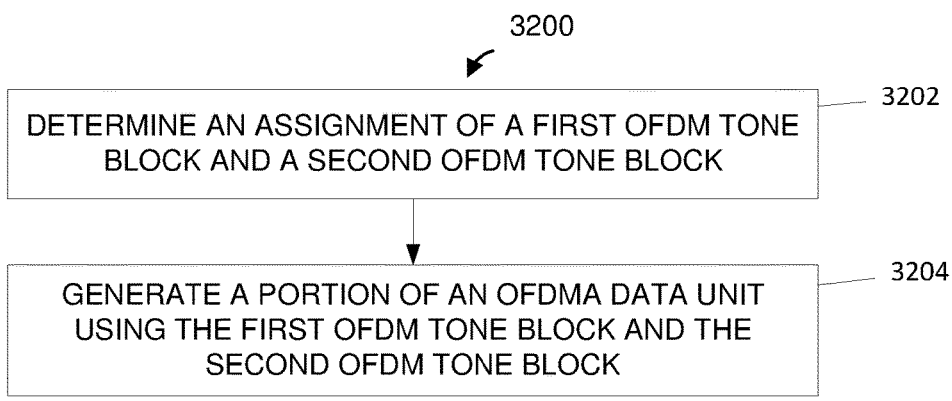
FIG. 32 is a flow diagram of an example method for generating a portion of an OFDMA data unit, according to another embodiment.

FIG. 32 is a flow diagram of an example method 3200 for generating a portion of an OFDMA data unit, according to another embodiment. With reference to FIG. 1, the method 3200 is implemented by the network interface 16, in an embodiment. For example, in one such embodiment, the PHY processing unit 20 is configured to implement the method 3200. According to another embodiment, the MAC processing 18 is also configured to implement at least a part of the method 3200. With continued reference to FIG. 1, in yet another embodiment, the method 3200 is implemented by the network interface 27 (e.g., the PHY processing unit 29 and/or the MAC processing unit 28). In other embodiments, the method 3200 is implemented by other suitable network interfaces.

At block 3202, an assignment of a first orthogonal frequency division multiplex (OFDM) tone block and a second OFDM tone block for a wireless local area network (WLAN) communication channel is determined. The first OFDM tone block corresponds to a first fast Fourier transform (FFT) size that is less than an FFT size corresponding to the WLAN communication channel, the second OFDM tone block corresponds to a second FFT size that is less than the FFT size corresponding to the WLAN communication channel, and the first OFDM tone block and the second OFDM tone block are separated in frequency by at least a third OFDM tone block, in an embodiment. In some embodiments, the WLAN communication channel corresponds to the communication channels described above with respect to FIGS. 14A, 14B, or other suitable communication channels.

At block 3204, a first communication device generates a portion of an orthogonal frequency division multiple access (OFDMA) data unit for transmission on the WLAN communication channel using data tones and pilot tones within the first OFDM tone block and the second OFDM tone block. In some embodiments, the portion of the OFDMA data unit corresponds to the portion of the OFDMA data unit described above with respect to FIGS. 24, 25A, 25B, or another suitable OFDMA data unit.

In an embodiment, generating the portion of the OFDMA data unit includes performing i) an inverse fast Fourier transform (IFFT) for a first OFDM data unit of the OFDMA data unit with the first FFT size and ii) an IFFT for a second OFDM data unit of the OFDMA data unit with the second FFT size. In this embodiment, generating the portion of the OFDMA data unit further includes filtering and transmitting the first OFDM data unit and the second OFDM data unit from separate radio transmitters of the first communication device.

In another embodiment, generating the portion of the OFDMA data unit includes: performing i) an inverse fast Fourier transform (IFFT) for a first OFDM data unit of the OFDMA data unit with an IFFT size corresponding to the first FFT size and ii) an IFFT for a second OFDM data unit of the OFDMA data unit with an IFFT size corresponding to the second FFT size; filtering and shifting the first OFDM data unit and the second OFDM data unit; and combining and transmitting the first OFDM data unit and the second OFDM data unit.

In an embodiment, generating the portion of the OFDMA data unit includes performing an IFFT for the portion of the OFDMA data unit with an FFT size corresponding to the WLAN communication channel using zero values for data tones and pilot tones that are not within the first OFDM tone block or the second OFDM tone block.

In some embodiments, the first communication device transmits the portion of the OFDMA data unit on the WLAN communication channel concurrently with a transmission of another portion of OFDMA data unit on the WLAN communication channel by a second communication device. In one such embodiment, the other portion of the OFDMA data unit spans the third OFDM tone block of the WLAN communication channel.

Further aspects of the present invention relate to one or more of the following clauses.

In an embodiment, a method includes assigning a plurality of different orthogonal frequency division multiplex (OFDM) tone blocks for a wireless local area network (WLAN) communication channel to a plurality of devices including a first device and second device, wherein the plurality of different OFDM tone blocks includes at least a first OFDM tone block assigned to the first device and a second OFDM tone block assigned to the second device, and the first OFDM tone block and the second OFDM tone block together span a bandwidth equal to a smallest channel bandwidth of a legacy WLAN communication protocol. The method further includes generating an orthogonal frequency division multiple access (OFDMA) data unit for the WLAN communication channel, the OFDMA unit including a preamble portion and a data portion, the preamble portion having i) at least a legacy portion that spans the entire WLAN communication channel, ii) a first non-legacy portion that spans the first OFDM tone block, and iii) a second non-legacy portion that spans the second OFDM tone block.

In other embodiments, the method includes any suitable combination of one or more of the following features.

Generating the OFDMA data unit for the WLAN communication channel includes: generating i) a first OFDM data unit of the data portion using first data received for the first device and ii) a second OFDM data unit of the data portion using second data received for the second device, wherein the first data is independent of the second data; and modulating i) the first OFDM data unit on tones in the first OFDM tone block and ii) the second OFDM data unit on tones in the second OFDM tone block.

Generating the OFDMA data unit for the WLAN communication channel includes modulating the OFDMA data unit to span an entire bandwidth of the WLAN communication channel.

Modulating the first OFDM data unit and the second OFDM data unit includes modulating i) the first OFDM data unit on tones in the first OFDM tone block using a first tone plan and ii) the second OFDM data unit on tones in the second OFDM tone block using a second tone plan, wherein the legacy portion is modulated using a legacy tone plan that is different from at least the first tone plan.

In some embodiments, one or more of the first non-legacy tone plan or the second non-legacy tone plan corresponds to a fast Fourier transform (FFT) width that is less than a FFT width of the WLAN communication channel.

Generating the first OFDM data unit and the second OFDM data unit includes: generating first data tones using the first data and first pilot tones for the first OFDM tone block; separately generating second data tones using the second data and second pilot tones for the second OFDM tone block; jointly performing an inverse fast Fourier transform (IFFT) on the first data tones, the first pilot tones, the second data tones, and the second pilot tones.

Generating the first OFDM data unit and the second OFDM data unit includes: generating the second OFDM data unit to include at least one padding OFDM symbol such that the first OFDM data unit and the second OFDM data unit have a same number of OFDM symbols.

The method further includes determining a number of padding OFDM symbols to be included in the second OFDM data unit as a difference between a total number of OFDM symbols of the first OFDM data unit and a total number of OFDM symbols of the second OFDM data unit.

Generating the first OFDM data unit and the second OFDM data unit includes generating the second OFDM data unit to include at least one padding OFDM symbol such that a sum of a number of OFDM symbols in the first non-legacy portion and a number of OFDM symbols of the first OFDM data unit is equal to a sum of a number of OFDM symbols of the second non-legacy portion and a number of OFDM symbols of the second OFDM data unit.

In some embodiments, the first non-legacy portion and the second non-legacy portion include non-legacy signal fields having respective group identifier (ID) sub-fields that indicate whether the corresponding OFDM data units are any of i) a single user data unit, ii) a multi-user multiple-input multiple-output data unit to be decoded by an indicated device of the plurality of devices, or iii) a portion of the OFDMA data unit to be decoded by an indicated device of the plurality of devices.

In some embodiments, the first non-legacy portion and the second non-legacy portion include non-legacy signal fields having respective tone block allocation identifiers that indicate the assignment of the first OFDM tone block to the first device and the assignment of the second OFDM tone block to the second device.

Modulating the first OFDM data unit and the second OFDM data unit includes modulating i) the first OFDM data unit using a same bandwidth as the first OFDM tone block with an integer multiple of tones and corresponding reduced tone spacing and ii) the second OFDM data unit using a same bandwidth as the second OFDM tone block with the integer multiple of tones and corresponding reduced tone spacing.

In another embodiment, an apparatus includes a network interface device having one or more integrated circuits configured to: assign a plurality of different orthogonal frequency division multiplex (OFDM) tone blocks for a wireless local area network (WLAN) communication channel to a plurality of devices including a first device and second device, wherein the plurality of different OFDM tone blocks includes at least a first OFDM tone block assigned to the first device and a second OFDM tone block assigned to the second device, and the first OFDM tone block and the second OFDM tone block together span a bandwidth equal to a smallest channel bandwidth of a legacy WLAN communication protocol; and wherein the one or more integrated circuits are further configured to generate an orthogonal frequency division multiple access (OFDMA) data unit for the WLAN communication channel, the OFDMA unit including a preamble portion and a data portion, the preamble portion having i) at least a legacy portion that spans the entire WLAN communication channel, ii) a first non-legacy portion that spans the first OFDM tone block, and iii) a second non-legacy portion that spans the second OFDM tone block.

In other embodiments, the apparatus includes any suitable combination of one or more of the following features.

The one or more integrated circuits are configured to: generate i) a first OFDM data unit of the data portion using first data received for the first device and ii) a second OFDM data unit of the data portion using second data received for the second device, wherein the first data is independent of the second data, and modulate i) the first OFDM data unit on tones in the first OFDM tone block and ii) the second OFDM data unit on tones in the second OFDM tone block.

The OFDMA data unit spans an entire bandwidth of the WLAN communication channel.

The one or more integrated circuits are configured to modulate i) the first OFDM data unit on tones in the first OFDM tone block using a first tone plan and ii) the second OFDM data unit on tones in the second OFDM tone block using a second tone plan, wherein the legacy portion is modulated using a legacy tone plan that is different from at least the first tone plan.

One or more of the first non-legacy tone plan or the second non-legacy tone plan corresponds to a fast Fourier transform (FFT) width that is less than a FFT width of the WLAN communication channel.

The one or more integrated circuits are configured to: generate first data tones using the first data and first pilot tones for the first OFDM tone block, separately generate second data tones using the second data and second pilot tones for the second OFDM tone block, and jointly perform an inverse fast Fourier transform (IFFT) on the first data tones, the first pilot tones, the second data tones, and the second pilot tones.

The one or more integrated circuits are configured to generate the second OFDM data unit to include at least one padding OFDM symbol such that the first OFDM data unit and the second OFDM data unit have a same number of OFDM symbols.

The first non-legacy portion and the second non-legacy portion include non-legacy signal fields having respective group identifier (ID) sub-fields that indicate whether the corresponding OFDM data units are any of i) a single user data unit, ii) a multi-user multiple-input multiple-output data unit to be decoded by an indicated device of the plurality of devices, or iii) a portion of the OFDMA data unit to be decoded by an indicated device of the plurality of devices.

In an embodiment, a method includes: determining an assignment of a first orthogonal frequency division multiplex (OFDM) tone block within a wireless local area network (WLAN) communication channel, wherein a bandwidth of the first OFDM tone block is less than a smallest bandwidth of a legacy WLAN communication protocol; generating, at a first communication device, a first portion of an orthogonal frequency division multiple access (OFDMA) data unit for transmission on the WLAN communication channel using data tones and pilot tones within the first OFDM tone block.

In other embodiments, the method includes any suitable combination of one or more of the following features.

Generating the first portion of the OFDMA data unit includes performing an inverse fast Fourier transform (IFFT) for the first portion of the OFDMA data unit with an FFT size equal to the first OFDM tone block.

Generating the first portion of the OFDMA data unit includes performing an IFFT for the first portion of the OFDMA data unit with an FFT size equal to the WLAN communication channel using zero values for data tones and pilot tones that are not within the first OFDM tone block.

The method further includes transmitting, by the first communication device, the first portion of the OFDMA data unit on the WLAN communication channel concurrently with a transmission of a second portion of the OFDMA data unit on the WLAN communication channel by a second communication device, wherein the second portion of the OFDMA data unit spans a second OFDM tone block within the WLAN communication channel.

The method further includes transmitting, by the first communication device, a legacy portion of a preamble portion of the OFDMA data unit using the first OFDM tone block and the second OFDM tone block, concurrently with a transmission of the legacy portion of the preamble portion by the second communication device that uses the first OFDM tone block and the second OFDM tone block.

Transmitting the first portion of the OFDMA data unit includes transmitting, by the first communication device, a first OFDM data unit using only the first OFDM tone block, concurrently with a transmission of a second OFDM data unit using only the second OFDM tone block by the second communication device.

The legacy portion and the first OFDM data unit are transmitted by the first communication device with a same total power.

The legacy portion and the first OFDM data unit are transmitted by the first communication device with a same per-tone power.

In yet another embodiment, a first communication device includes a network interface device having one or more integrated circuits configured to: determine an assignment of a first orthogonal frequency division multiplex (OFDM) tone block within a wireless local area network (WLAN) communication channel, wherein a bandwidth of the first OFDM tone block is less than a smallest bandwidth of a legacy WLAN communication protocol; wherein the one or more integrated circuits are further configured to generate, at a first communication device, a first portion of an orthogonal frequency division multiple access (OFDMA) data unit for transmission on the WLAN communication channel using data tones and pilot tones within the first OFDM tone block.

In other embodiments, the device includes any suitable combination of one or more of the following features.

The one or more integrated circuits are configured to generate the first portion of the OFDMA data unit includes performing an inverse fast Fourier transform (IFFT) for the first portion of the OFDMA data unit with an FFT size equal to the first OFDM tone block.

The one or more integrated circuits are configured to generate the first portion of the OFDMA data unit includes performing an IFFT for the first portion of the OFDMA data unit with an FFT size equal to the WLAN communication channel using zero values for data tones and pilot tones that are not within the first OFDM tone block.

The one or more integrated circuits are configured to transmit, by the first communication device, the first portion of the OFDMA data unit on the WLAN communication channel concurrently with a transmission of a second portion of the OFDMA data unit on the WLAN communication channel by a second communication device, wherein the second portion of the OFDMA data unit spans a second OFDM tone block within the WLAN communication channel.

The one or more integrated circuits are configured to transmit a legacy portion of a preamble portion of the OFDMA data unit using the first OFDM tone block and the second OFDM tone block, concurrently with a transmission of the legacy portion of the preamble portion by the second communication device that uses the first OFDM tone block and the second OFDM tone block.

In an embodiment, a method includes: assigning a plurality of different orthogonal frequency division multiplex (OFDM) tone blocks for a wireless local area network (WLAN) communication channel to a plurality of devices including a first device and second device, wherein the plurality of different OFDM tone blocks includes at least a first OFDM tone block and a second OFDM tone block assigned to the first device and a third OFDM tone block assigned to the second device, wherein the first OFDM tone block and the second OFDM tone block are separated in frequency by at least the third OFDM tone block; and generating an orthogonal frequency division multiple access (OFDMA) data unit for the WLAN communication channel, the OFDMA unit including a preamble portion and a data portion, the preamble portion having at least i) a first legacy portion that corresponds to at least the first OFDM tone block, ii) a second legacy portion that corresponds to the second OFDM tone block, iii) a first non-legacy portion that corresponds to the first OFDM tone block, iv) a second non-legacy portion that corresponds to the second OFDM tone block, and v) a third non-legacy portion that corresponds to the third OFDM tone block, wherein the first legacy portion is modulated on at least the first OFDM tone block, the first non-legacy portion is modulated on the first OFDM tone block, the second legacy portion is modulated on at least the second OFDM tone block, the second non-legacy portion is modulated on the second OFDM tone block, and the third non-legacy portion is modulated on the third OFDM tone block.

In other embodiments, the method includes any suitable combination of one or more of the following features.

The first OFDM tone block and the third OFDM tone block together span a bandwidth equal to a smallest channel bandwidth of a legacy WLAN communication protocol.

The first legacy portion is modulated on a legacy tone block corresponding to a smallest channel bandwidth of a legacy WLAN communication protocol, wherein the legacy tone block i) overlaps in frequency with the first OFDM tone block and ii) has a bandwidth larger than a bandwidth of the first OFDM tone block.

The legacy tone block includes the first OFDM tone block assigned to the first device and the third OFDM tone block assigned to the second device, wherein the first legacy portion is modulated on at least the first OFDM tone block and the third OFDM tone block.

The data portion includes a first OFDM data unit, for the first device, modulated on the first OFDM tone block and a second OFDM data unit, for the second device, modulated on the third OFDM tone block; wherein at least one of the first OFDM data unit and the second OFDM data unit includes padding such that a total length of the first non-legacy portion and the first OFDM data unit is equal to a total length of the third non-legacy portion and the second OFDM data unit.

The data portion includes a first OFDM data unit, for the first device, modulated on the first OFDM tone block and a second OFDM data unit, for the first device, modulated on the second OFDM tone block; wherein the first legacy portion and the second legacy portion include legacy signal fields that indicate a same total duration for i) the first non-legacy portion and the first OFDM data unit and ii) the second non-legacy portion and the second OFDM data unit.

The first OFDM tone block and the second OFDM tone block use a same modulation and coding scheme.

The first OFDM tone block uses a modulation and coding scheme (MCS) different from the second OFDM tone block.

The first OFDM tone block and the second OFDM tone block use a same number of space-time streams.

The first OFDM tone block and the second OFDM tone block use different numbers of space-time streams.

Generating the OFDMA data unit for the WLAN communication channel includes encoding first data for the first OFDM tone block separately from second data for the second OFDM tone block.

Generating the OFDMA data unit for the WLAN communication channel includes encoding and interleaving first data for the first OFDM tone block together with second data for the second OFDM tone block.

In another embodiment, an apparatus includes a network interface device having one or more integrated circuits configured to: assign a plurality of different orthogonal frequency division multiplex (OFDM) tone blocks for a wireless local area network (WLAN) communication channel to a plurality of devices including a first device and second device, wherein the plurality of different OFDM tone blocks includes at least a first OFDM tone block and a second OFDM tone block assigned to the first device and a third OFDM tone block assigned to the second device, wherein the first OFDM tone block and the second OFDM tone block are separated in frequency by at least the third OFDM tone block, and generate an orthogonal frequency division multiple access (OFDMA) data unit for the WLAN communication channel, the OFDMA unit including a preamble portion and a data portion, the preamble portion having at least i) a first legacy portion that corresponds to at least the first OFDM tone block, ii) a second legacy portion that corresponds to the second OFDM tone block, iii) a first non-legacy portion that corresponds to the first OFDM tone block, iv) a second non-legacy portion that corresponds to the second OFDM tone block, and v) a third non-legacy portion that corresponds to the third OFDM tone block, wherein the first legacy portion is modulated on at least the first OFDM tone block, the first non-legacy portion is modulated on the first OFDM tone block, the second legacy portion is modulated on at least the second OFDM tone block, the second non-legacy portion is modulated on the second OFDM tone block, and the third non-legacy portion is modulated on the third OFDM tone block.

In other embodiments, the device includes any suitable combination of one or more of the following features.

The first OFDM tone block and the third OFDM tone block together span a bandwidth equal to a smallest channel bandwidth of a legacy WLAN communication protocol.

The first legacy portion is modulated on a legacy tone block corresponding to a smallest channel bandwidth of a legacy WLAN communication protocol, wherein the legacy tone block i) overlaps in frequency with the first OFDM tone block and ii) has a bandwidth larger than a bandwidth of the first OFDM tone block.

The legacy tone block includes the first OFDM tone block assigned to the first device and the third OFDM tone block assigned to the second device, wherein the first legacy portion is modulated on at least the first OFDM tone block and the third OFDM tone block.

The data portion includes a first OFDM data unit, for the first device, modulated on the first OFDM tone block and a second OFDM data unit, for the second device, modulated on the third OFDM tone block; and at least one of the first OFDM data unit and the second OFDM data unit includes padding such that a total length of the first non-legacy portion and the first OFDM data unit is equal to a total length of the third non-legacy portion and the second OFDM data unit.

The one or more integrated circuits are configured to encode first data for the first OFDM tone block separately from second data for the second OFDM tone block.

In an embodiment, a method includes: determining an assignment of a first orthogonal frequency division multiplex (OFDM) tone block and a second OFDM tone block for a wireless local area network (WLAN) communication channel, wherein the first OFDM tone block corresponds to a first fast Fourier transform (FFT) size that is less than an FFT size corresponding to the WLAN communication channel, the second OFDM tone block corresponds to a second FFT size that is less than the FFT size corresponding to the WLAN communication channel, and the first OFDM tone block and the second OFDM tone block are separated in frequency by at least a third OFDM tone block; and generating, at a first communication device, a portion of an orthogonal frequency division multiple access (OFDMA) data unit for transmission on the WLAN communication channel using data tones and pilot tones within the first OFDM tone block and the second OFDM tone block.

In other embodiments, the method includes any suitable combination of one or more of the following features.

Generating the portion of the OFDMA data unit includes performing i) an inverse fast Fourier transform (IFFT) for a first OFDM data unit of the OFDMA data unit with the first FFT size and ii) an IFFT for a second OFDM data unit of the OFDMA data unit with the second FFT size; and filtering and transmitting the first OFDM data unit and the second OFDM data unit from separate radio transmitters of the first communication device.

Generating the portion of the OFDMA data unit includes performing i) an inverse fast Fourier transform (IFFT) for a first OFDM data unit of the OFDMA data unit with an IFFT size corresponding to the first FFT size and ii) an IFFT for a second OFDM data unit of the OFDMA data unit with an IFFT size corresponding to the second FFT size; filtering and shifting the first OFDM data unit and the second OFDM data unit; and combining and transmitting the first OFDM data unit and the second OFDM data unit.

Generating the portion of the OFDMA data unit includes performing an IFFT for the portion of the OFDMA data unit with an FFT size corresponding to the WLAN communication channel using zero values for data tones and pilot tones that are not within the first OFDM tone block or the second OFDM tone block.

The method further includes transmitting, by the first communication device, the portion of the OFDMA data unit on the WLAN communication channel concurrently with a transmission of another portion of OFDMA data unit on the WLAN communication channel by a second communication device, wherein the other portion of the OFDMA data unit spans the third OFDM tone block of the WLAN communication channel.

In an embodiment, a method includes assigning a plurality of different orthogonal frequency division multiplex (OFDM) frequency sub-bands for a wireless local area network (WLAN) communication channel to a plurality of devices including a first device and second device, wherein the plurality of different OFDM frequency sub-bands includes at least a first OFDM frequency sub-band assigned to the first device and a second OFDM frequency sub-band assigned to the second device; and generating an orthogonal frequency division multiple access (OFDMA) data unit for the WLAN communication channel, the OFDMA unit including a preamble portion and a data portion, the preamble portion including a legacy portion that spans the first OFDM frequency sub-band and the second OFDM frequency sub-band using a legacy tone spacing and a legacy tone plan, a first non-legacy portion that spans the first OFDM frequency sub-band and the second OFDM frequency sub-band using the legacy tone spacing and the legacy tone plan, a second non-legacy portion that spans the first OFDM frequency sub-band using a non-legacy tone spacing and a non-legacy tone plan, and a third non-legacy portion that spans the second OFDM frequency sub-band using the non-legacy tone spacing and the non-legacy tone plan.

In other embodiments, the method includes any suitable combination of one or more of the following features.

Generating the OFDMA data unit for the WLAN communication channel includes generating i) a first OFDM data unit of the data portion using first data received for the first device and ii) a second OFDM data unit of the data portion using second data received for the second device, wherein the first data is independent of the second data; modulating i) the first OFDM data unit using the non-legacy tone plan of the first OFDM frequency sub-band and ii) the second OFDM data unit using the non-legacy tone plan of the second OFDM frequency sub-band.

The legacy tone spacing is an integer multiple of the non-legacy tone spacing.

In another embodiment, an apparatus includes a network interface device having one or more integrated circuits configured to: assign a plurality of different orthogonal frequency division multiplex (OFDM) frequency sub-bands for a wireless local area network (WLAN) communication channel to a plurality of devices including a first device and second device, wherein the plurality of different OFDM frequency sub-bands includes at least a first OFDM frequency sub-band assigned to the first device and a second OFDM frequency sub-band assigned to the second device, and generate an orthogonal frequency division multiple access (OFDMA) data unit for the WLAN communication channel, the OFDMA unit including a preamble portion and a data portion, the preamble portion including a legacy portion that spans the first OFDM frequency sub-band and the second OFDM frequency sub-band using a legacy tone spacing and a legacy tone plan, a first non-legacy portion that spans the first OFDM frequency sub-band and the second OFDM frequency sub-band using the legacy tone spacing and the legacy tone plan, a second non-legacy portion that spans the first OFDM frequency sub-band using a non-legacy tone spacing and a non-legacy tone plan, and a third non-legacy portion that spans the second OFDM frequency sub-band using the non-legacy tone spacing and the non-legacy tone plan.

In other embodiments, the device includes any suitable combination of one or more of the following features.

The one or more integrated circuits are configured to: generate i) a first OFDM data unit of the data portion using first data received for the first device and ii) a second OFDM data unit of the data portion using second data received for the second device, wherein the first data is independent of the second data, and modulate i) the first OFDM data unit using the non-legacy tone plan of the first OFDM frequency sub-band and ii) the second OFDM data unit using the non-legacy tone plan of the second OFDM frequency sub-band.

The legacy tone spacing is an integer multiple of the non-legacy tone spacing.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
    assigning, at a communication device, a plurality of different orthogonal frequency division multiplex (OFDM) tone blocks for a wireless local area network (WLAN) communication channel to a plurality of communication devices, including assigning a first OFDM tone block to a first communication device, assigning a second OFDM tone block to a second communication device, assigning a third OFDM tone block to a third communication device, and assigning a fourth OFDM tone block to a fourth communication device, wherein:
        the first OFDM tone block spans a first frequency bandwidth less than or equal to 10 MHz,
        the first OFDM tone block is within a first subchannel that spans a frequency bandwidth of 20 MHz,
        the second OFDM tone block spans a second frequency bandwidth less than or equal to 10 MHz,
        the second OFDM tone block is within the first subchannel,
        the third OFDM tone block spans a third frequency bandwidth less than or equal to 10 MHz,
        the third OFDM tone block is within a second subchannel that spans a frequency bandwidth of 20 MHz,
        the fourth OFDM tone block spans a fourth frequency bandwidth less than or equal to 10 MHz, and
        the fourth OFDM tone block is within the second subchannel; and
    generating, at the communication device, an orthogonal frequency division multiple access (OFDMA) physical layer (PHY) data unit for transmission in the WLAN communication channel, including:
        generating a PHY preamble portion of the OFDMA PHY data unit that spans at least the first subchannel and the second subchannel, the PHY preamble portion including a legacy preamble portion that spans at least the first subchannel and the second subchannel, wherein the legacy preamble portion includes i) a first instance of a legacy signal field that spans the first subchannel and ii) a second instance of the legacy signal field that spans the second subchannel, and
        generating a data portion of the OFDMA PHY data unit, the data portion including respective independent data for the plurality of devices modulated to respective OFDM tone blocks, including i) first data for the first communication device modulated to the first OFDM tone block within the first subchannel, ii) second data for the second communication device modulated to the second OFDM tone block within the first subchannel, iii) third data for the third communication device modulated to the third OFDM tone block within the second subchannel, and iv) fourth data for the fourth communication device modulated to the fourth OFDM tone block within the second subchannel.

2. The method of claim 1, wherein generating the data portion of the OFDMA PHY data unit includes:
    generating first constellation points corresponding to the first OFDM tone block;
    generating second constellation points corresponding to the second OFDM tone block;
    generating third constellation points corresponding to the third OFDM tone block;
    generating fourth constellation points corresponding to the fourth OFDM tone block; and
    jointly performing an inverse discrete Fourier transform (IDFT) on at least the first constellation points, the second constellation points, the third constellation points, and the fourth constellation points to generate a time-domain signal corresponding to the data portion of the OFDMA PHY data unit.

3. The method of claim 1, wherein generating the PHY preamble portion includes generating the first instance of the legacy signal field and the second instance of the legacy signal field to indicate that the PHY data unit includes respective independent data for multiple communication devices.

4. An apparatus, comprising:
    a wireless network interface device having one or more integrated circuit (IC) devices, wherein the wireless network interface device includes a media access control layer (MAC) processing unit implemented on the one or more IC devices, the MAC processing unit configured to assign a plurality of different orthogonal frequency division multiplex (OFDM) tone blocks for a wireless local area network (WLAN) communication channel to a plurality of communication devices, including assigning a first OFDM tone block to a first communication device, assigning a second OFDM tone block to a second communication device, assigning a third OFDM tone block to a third communication device, and assigning a fourth OFDM tone block to a fourth communication device, wherein:

the first OFDM tone block spans a first frequency bandwidth less than or equal to 10 MHz, the first OFDM tone block is within a first subchannel that spans a frequency bandwidth of 20 MHz, the second OFDM tone block spans a second frequency bandwidth less than or equal to 10 MHz, the second OFDM tone block is within the first subchannel, the third OFDM tone block spans a third frequency bandwidth less than or equal to 10 MHz the third OFDM tone block is within a second subchannel that spans a frequency bandwidth of 20 MHz, the fourth OFDM tone block spans a fourth frequency bandwidth less than or equal to 10 MHz, and the fourth OFDM tone block is within the second subchannel;

wherein the wireless network interface device further comprises a physical layer (PHY) processing unit implemented on the one or more IC devices and coupled to the MAC processing unit, the PHY processing unit configured to generate an orthogonal frequency division multiple access (OFDMA) PHY data unit for transmission in the WLAN communication channel, including:

generating a PHY preamble portion of the OFDMA PHY data unit that spans at least the first subchannel and the second subchannel, the PHY preamble portion including a legacy preamble portion that spans at least the first subchannel and the second subchannel, wherein the legacy preamble portion includes i) a first instance of a legacy signal field that spans the first subchannel and ii) a second instance of the legacy signal field that spans the second subchannel, and generating a data portion of the OFDMA PHY data unit, the data portion including respective independent data for the plurality of devices modulated to respective OFDM tone blocks, including i) first data for the first communication device modulated to the first OFDM tone block within the first subchannel, ii) second data for the second communication device modulated to the second OFDM tone block within the first subchannel, iii) third data for the third communication device modulated to the third OFDM tone block within the second subchannel, and iv) fourth data for the fourth communication device modulated to the fourth OFDM tone block within the second subchannel.

5. The apparatus of claim 4, wherein:
the PHY processing unit is further configured to:
generate first constellation points corresponding to the first OFDM tone block,
generate second constellation points corresponding to the second OFDM tone block,
generate third constellation points corresponding to the third OFDM tone block, and
generate fourth constellation points corresponding to the fourth OFDM tone block; and
the PHY processing unit includes an inverse discrete Fourier transform (IDFT) processors configured to perform an IDFT on at least the first constellation points, the second constellation points, the third constellation points, and the fourth constellation points to generate a time-domain signal corresponding to the data portion of the OFDMA PHY data unit.

6. The apparatus of claim 4, wherein the PHY processing unit is configured to:
generate the first instance of the legacy signal field and the second instance of the legacy signal field to indicate that the PHY data unit includes respective independent data for multiple communication devices.

7. A method, comprising:
determining, at a first communication device, an assignment of a first orthogonal frequency division multiplex (OFDM) tone block within a wireless local area network (WLAN) communication channel to the first communication device for an uplink orthogonal frequency division multiple access (OFDMA) transmission, wherein:
the first OFDM tone block spans a first frequency bandwidth less than or equal to 10 MHz, and
the first OFDM tone block is within a first subchannel that spans a second frequency bandwidth of 20 MHz; and generating, at the first communication device, a first physical layer (PHY) data unit for transmission on the WLAN communication channel using data tones and pilot tones within the first OFDM tone block, including
generating a preamble portion of the first PHY data unit, the preamble portion including a legacy signal field spanning the second frequency bandwidth, and
generating a data portion of the first PHY data unit, the data portion including data modulated to the first OFDM tone block, the data portion of the first PHY data unit spanning only the first frequency bandwidth;

wherein the first PHY data unit is for simultaneous transmission in the WLAN communication channel with
i) a transmission of a second PHY data unit in the WLAN communication channel by a second communication device as part of the uplink OFDMA transmission, wherein a preamble portion of the second PHY data unit spans the first subchannel, and wherein a data portion of the second PHY data unit spans a bandwidth of a second OFDM tone block within the first subchannel, and
ii) a transmission of a third PHY data unit in at least a second subchannel of the WLAN communication channel by a third communication device as part of the uplink OFDMA transmission, wherein a preamble portion of the third PHY data unit at least overlaps with the second subchannel, wherein a data portion of the third PHY data unit at least overlaps with the second subchannel, and wherein the second subchannel spans a third frequency bandwidth of 20 MHz.

8. The method of claim 7, wherein the data portion of the second PHY data unit spans a third frequency bandwidth less than or equal to 10 MHz.

9. The method of claim 7, wherein:
the preamble portion of the third PHY data unit also overlaps with a third subchannel;
the third subchannel spans a fourth frequency bandwidth of 20 MHz;
the data portion of the third PHY data unit also overlaps with the third subchannel; and
the data portion of the third PHY data unit spans a fifth frequency bandwidth of greater than 20 MHz.

10. The method of claim 7, further comprising:
receiving, at the first communication device, a downlink PHY data unit from a WLAN access point, wherein the downlink PHY data unit is configured to prompt a plurality of communication devices to transmit simultaneously as part of the uplink OFDMA transmission, wherein the plurality of communication devices includes the first communication device and the second communication device;

transmitting, at the first communication device, the first PHY data unit a predetermined delay period after the downlink PHY data unit.

11. The method of claim 10, wherein:
the downlink PHY data unit includes a first indication that the first OFDM tone block is assigned, by the WLAN access point, to the first communication device for the uplink OFDMA transmission, and a second indication that the second OFDM tone block is assigned, by the WLAN access point, to the second communication device for the uplink OFDMA transmission; and
the assignment of the first OFDM tone block to the first communication device for the uplink OFDMA transmission is determined by the first communication device using the first indication in the downlink PHY data unit.

12. The method of claim 7, wherein generating the data portion of the first PHY data unit comprises performing an inverse discrete Fourier transform (IDFT) corresponding to a fast Fourier transform (FFT) size corresponding to the second frequency bandwidth of 20 MHz, including performing the IDFT on i) data tones and pilot tones within the first OFDM tone block, and ii) data tones and pilot tones not within the first OFDM tone block set to zero values.

13. The method of claim 7, further comprising:
transmitting, with the first communication device, i) at least the legacy signal field in the preamble of the first data unit and ii) the data portion of the first data unit with a same total power.

14. The method of claim 7, further comprising:
transmitting, with the first communication device, i) at least the legacy signal field in the preamble of the first data unit and ii) the data portion of the first data unit with a same per-tone power.

15. An apparatus, comprising:
a wireless network interface device having one or more integrated circuit (IC) devices, the wireless network interface device associated with a first communication device, wherein the wireless network interface device includes a media access control layer (MAC) processing unit implemented on the one or more IC devices, the MAC processing unit configured to determine an assignment of a first orthogonal frequency division multiplex (OFDM) tone block within a wireless local area network (WLAN) communication channel to the first communication device for an uplink orthogonal frequency division multiple access (OFDMA) transmission, wherein:
the first OFDM tone block spans a first frequency bandwidth less than or equal to 10 MHz, and
the first OFDM tone block is within a first subchannel that spans a second frequency bandwidth of 20 MHz; and
wherein the wireless network interface device further includes a physical layer (PHY) processing unit implemented on the one or more IC devices and coupled to the MAC processing unit, the PHY processing unit configured to generate a first PHY data unit for transmission on the WLAN communication channel using data tones and pilot tones within the first OFDM tone block, including:

generating a preamble portion of the first PHY data unit, the preamble portion including a legacy signal field spanning the second frequency bandwidth, and
generating a data portion of the first PHY data unit, the data portion including data modulated to the first OFDM tone block, the data portion of the first PHY data unit spanning only the first frequency bandwidth;
wherein the PHY processing unit is further configured to transmit the first PHY data unit simultaneously with
i) a transmission of a second PHY data unit in the WLAN communication channel by a second communication device as part of the uplink OFDMA transmission, wherein a preamble portion of the second PHY data unit spans the first subchannel, and wherein a data portion of the second PHY data unit spans a bandwidth of a second OFDM tone block within the first subchannel, and
ii) a transmission of a third PHY data unit in at least a second subchannel of the WLAN communication channel by a third communication device as part of the uplink OFDMA transmission, wherein a preamble portion of the third PHY data unit at least overlaps with the second subchannel, wherein a data portion of the third PHY data unit at least overlaps with the second subchannel, and wherein the second subchannel spans a third frequency bandwidth of 20 MHz.

16. The apparatus of claim 15, wherein the data portion of the second PHY data unit spans a third frequency bandwidth less than or equal to 10 MHz.

17. The apparatus of claim 15, wherein:
the preamble portion of the third PHY data unit also overlaps with a third subchannel;
the third subchannel spans a fourth frequency bandwidth of 20 MHz;
the data portion of the third PHY data unit also overlaps with the third subchannel; and
the data portion of the third PHY data unit spans a fifth frequency bandwidth of greater than 20 MHz.

18. The apparatus of claim 15, wherein the PHY processing unit is further configured to:
receive a downlink PHY data unit from a WLAN access point, wherein the downlink PHY data unit is configured to prompt a plurality of communication devices to transmit simultaneously as part of the uplink OFDMA transmission, wherein the plurality of communication devices includes the first communication device and the second communication device; and
transmit the first PHY data unit a predetermined delay period after the downlink PHY data unit.

19. The apparatus of claim 18, wherein:
the downlink PHY data unit includes a first indication that the first OFDM tone block is assigned, by the WLAN access point, to the first communication device for the uplink OFDMA transmission, and a second indication that the second OFDM tone block is assigned, by the WLAN access point, to the second communication device for the uplink OFDMA transmission; and
the MAC processing unit is configured to determine the assignment of the first OFDM tone block to the first communication device for the uplink OFDMA transmission using the first indication in the downlink PHY data unit.

20. The apparatus of claim 15, wherein:
the PHY processing unit includes an inverse discrete Fourier transform (IDFT) processor; and the PHY processing unit is configured to generate the data portion of the first PHY data unit at least by using the IDFT processor to perform an IDFT corresponding to a fast Fourier transform (FFT) size corresponding to the second frequency bandwidth of 20 MHz, including performing the IDFT on i) data tones and pilot tones within the first OFDM tone block, and ii) data tones and pilot tones not within the first OFDM tone block set to zero values.

21. The apparatus of claim 15, wherein PHY processing unit is configured to:
    transmit i) at least the legacy signal field in the preamble of the first data unit and ii) the data portion of the first data unit with a same total power.

22. The apparatus of claim 15, wherein PHY processing unit is configured to:
    transmit i) at least the legacy signal field in the preamble of the first data unit and ii) the data portion of the first data unit with a same per-tone power.

* * * * *